United States Patent
Seo et al.

(10) Patent No.: US 7,986,846 B2
(45) Date of Patent: Jul. 26, 2011

(54) APPARATUS AND METHOD FOR PROCESSING AN IMAGE SIGNAL IN A DIGITAL BROADCAST RECEIVER

(75) Inventors: Jeong-Wook Seo, Daegu (KR); Dong-Yul Lee, Daegu (KR); Hwan Kim, Gumi-si (KR); Wei-Jin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1602 days.

(21) Appl. No.: 11/259,400

(22) Filed: Oct. 26, 2005

(65) Prior Publication Data
US 2006/0087585 A1 Apr. 27, 2006

(30) Foreign Application Priority Data

Oct. 26, 2004 (KR) .................. 10-2004-0085860
Oct. 24, 2005 (KR) .................. 10-2005-0100299

(51) Int. Cl.
G06K 9/46 (2006.01)
H04N 11/02 (2006.01)
(52) U.S. Cl. .... 382/233; 382/236; 382/250; 375/240.25
(58) Field of Classification Search .......... 382/232–233, 382/236, 246, 250–251; 348/405.1, E5.003; 375/240.03, 240.16, 240.23
See application file for complete search history.

(56) References Cited

U.S. PATENT DOCUMENTS

| 6,061,402 | A | 5/2000 | Boyce et al. |
| 6,118,486 | A | 9/2000 | Reitmeier |
| 6,295,321 | B1 * | 9/2001 | Lyu .................. 375/240.25 |
| 6,330,036 | B1 * | 12/2001 | Murakami et al. .......... 348/555 |
| 6,549,240 | B1 * | 4/2003 | Reitmeier .................. 348/459 |
| 6,788,347 | B1 | 9/2004 | Kim et al. |
| 7,139,594 | B2 * | 11/2006 | Nagatomo ................. 455/566 |
| 7,263,231 | B2 * | 8/2007 | Jiang et al. ................. 382/233 |

(Continued)

FOREIGN PATENT DOCUMENTS

| CN | 1329438 | 1/2002 |
| CN | 1414793 | 4/2003 |
| CN | 1435054 | 8/2003 |

(Continued)

OTHER PUBLICATIONS

Atul Puri et al., "Video Coding Using the H.264/MPEG-4 AVC Compression Standard", Signal Processing: Image Communication, Oct. 1, 2004.

*Primary Examiner* — Daniel G Mariam
(74) *Attorney, Agent, or Firm* — The Farrell Law Firm, P.C.

(57) ABSTRACT

A method and apparatus for decoding a coded video data in a digital broadcast receiver. The method includes: determining a resizing control signal for resizing a received video data; analyzing header information from a decoded video stream and separating and outputting a video data; resizing the separated video data by the resizing control signal and decoding the resized video data into an original pixel data with an original data size by using a variable length table; dequantizing the decoded video data; resizing and converting the dequantized frequency-domain video data into a two dimensional spatial domain video data by the resizing control signal; movement compensating for movement of a movement compensation data corresponding to one of the inverse-transformed video data and the separated video data; and converting outputs of the inverse transform unit and the movement compensation unit into display data for a display unit.

37 Claims, 37 Drawing Sheets

U.S. PATENT DOCUMENTS

| | | |
|---|---|---|
| 7,418,059 B2 * | 8/2008 | Lee .............................. 375/316 |
| 2001/0050692 A1 * | 12/2001 | Suh et al. ...................... 345/670 |
| 2003/0081843 A1 * | 5/2003 | Lee .............................. 382/233 |
| 2003/0095603 A1 * | 5/2003 | Lan et al. ................. 375/240.17 |
| 2004/0136601 A1 | 7/2004 | Natarajan et al. |
| 2004/0158878 A1 | 8/2004 | Ratnakar et al. |
| 2005/0008078 A1 * | 1/2005 | Kurumisawa ........... 375/240.25 |

FOREIGN PATENT DOCUMENTS

| | | |
|---|---|---|
| CN | 1464746 | 12/2003 |
| EP | 1 202 575 | 5/2002 |
| EP | 1 376 379 | 1/2004 |
| WO | WO 01/05159 | 1/2001 |
| WO | WO 02/41638 | 5/2002 |

\* cited by examiner

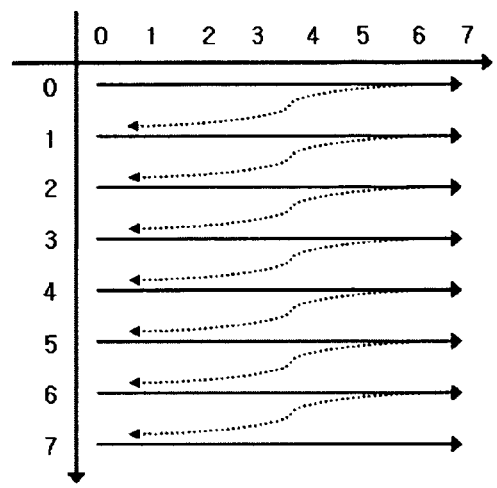
FIG.9A
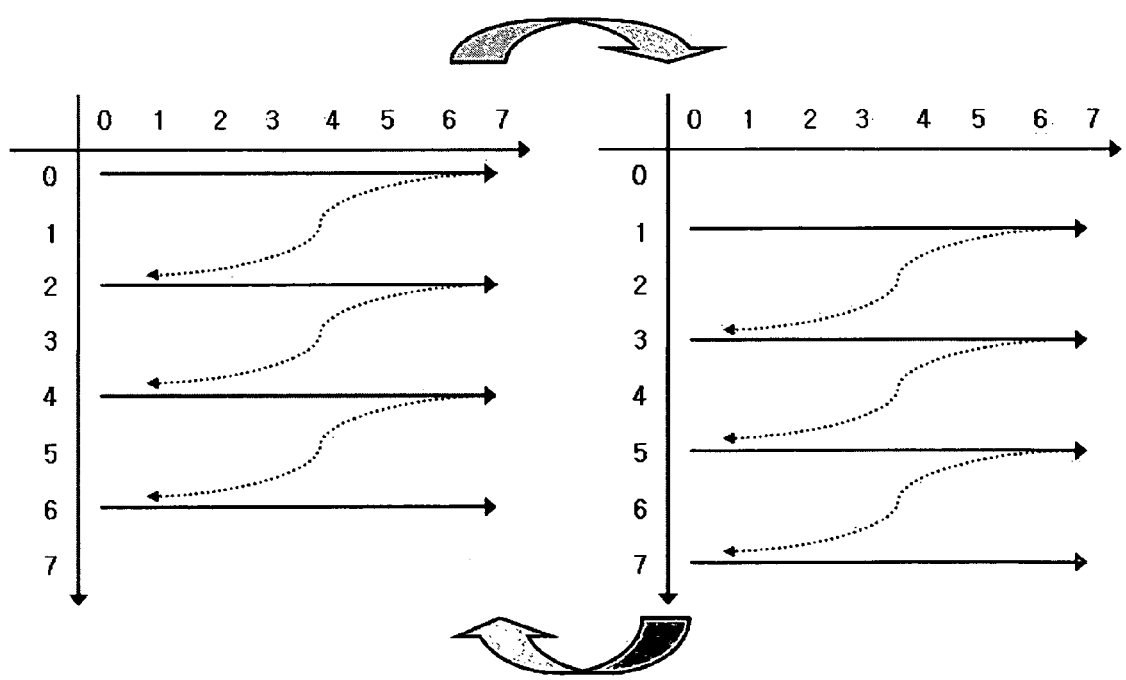
FIG.9B
FIG.9C

APPARATUS AND METHOD FOR PROCESSING AN IMAGE SIGNAL IN A DIGITAL BROADCAST RECEIVER

PRIORITY

This application claims priority to an application entitled "Apparatus and Method For Processing Image Signal In Digital Broadcast Receiver" filed in the Korean Industrial Property Office on Oct. 26, 2004 and assigned Serial No. 2004-85860, and to Korean Patent Application Serial No. 100299/2005 filed in the Korean Industrial Property Office on Oct. 24, 2005, the contents of which are hereby incorporated by reference.

BACKGROUND OF THE INVENTION

1. Field of the Invention

The present invention relates to an apparatus and method for receiving and processing a broadcast signal by a portable terminal.

2. Description of the Related Art

Currently, portable terminals are being equipped with a dedicated processor for multimedia or have an enhanced multimedia function. Further, technologies for mounting a television function to the portable terminals are being released and technologies for mounting a digital broadcast receiver are currently being researched. Therefore, it is necessary for the current portable terminals to provide various multimedia functions, which results in the portable terminals having a more complicated structure and having to perform more complicated processes.

Accordingly, it is necessary for the portable terminals having a camera function and a multimedia function to receive data from various devices and process the received data. However, it is also preferred that such portable terminals have as small a construction as possible for the multimedia function, because the portable terminals are kept and carried by users. Therefore, current research is actively focused on developing portable terminals that can efficiently perform the multimedia function well, but are still small in size.

Currently, standardization for the digital broadcasting is being actively progressed worldwide. The digital broadcasting can be classified into Digital Multimedia Broadcasting (DMB) employed in United States and Digital Video Broadcasting (DVB) employed in Europe.

A portable terminal equipped with a digital broadcast receiver as described above includes a tuner, a demodulator, and a decoder for receiving the digital broadcast. The tuner, demodulator and decoder for receiving the digital broadcast have a construction different from that of a typical RF unit, demodulator, and decoder of a portable terminal, respectively. That is, the digital broadcast receiver uses a frequency different from the communication frequency of the portable terminal and uses different demodulation and decoding schemes. Therefore, it is inevitable for the portable terminal to have a large volume in order to be additionally equipped with a digital broadcast receiver as described above.

Therefore, in implementing a portable terminal equipped with a digital broadcast receiver, it is possible to reduce the size and improve the processing speed of the digital broadcast receiver, if the received digital broadcast is processed in a way proper for the typical characteristics of the portable terminal. For example, the display unit of the portable terminal is small relative to that of a typical image processing unit, so it is limited in the size of the image it can display. Therefore, it is possible to reduce the size and improve the processing speed of the portable terminal if the portable terminal is equipped with a digital broadcast receiver capable of processing the broadcast signal in a way proper for the display unit of the portable terminal.

SUMMARY OF THE INVENTION

Accordingly, the present invention has been designed to solve the above and other problems occurring in the prior art. An object of the present invention is to provide a portable terminal having a digital broadcast reception function and a method for processing a digital broadcast signal received in the portable terminal.

It is another object of the present invention to provide a decoding apparatus and method, which can process a received broadcast signal according to standards of a portable terminal having a digital broadcast reception function.

It is another object of the present invention to provide an apparatus and method for decoding and displaying a received broadcast image signal according to standards of a portable terminal having a digital broadcast reception function.

It is another object of the present invention to provide an apparatus and method, which can select an area of a received broadcast image signal and decode the signal according to the scan type of the signal in a portable terminal having a digital broadcast reception function.

It is another object of the present invention to provide an apparatus and method, which can select an area of a received broadcast image signal and decode the signal according to the scan type of the signal and a display size in a portable terminal having a digital broadcast reception function.

In order to accomplish the above and other objects, there is provided a video decoder of a digital broadcast receiver. The video decoder includes: a resizing control unit for generating a resizing control signal for resizing a received video data; a header analyzer for analyzing header information from a decoded video stream and separating and outputting a video data; a variable length decoder for decoding the video data output from the header analyzer into an original pixel data with an original data size by using a variable length table; a dequantizer for dequantizing the decoded video data; an Inverse Transform (IT) unit for resizing and converting the dequantized frequency-domain video data into a two dimensional spatial domain video data by the resizing control signal; and a movement compensator unit for compensating for movement of a movement compensation data corresponding to one of the inverse-transformed video data and the separated video data.

In accordance with another aspect of the present invention, there is provided a video decoder of a digital broadcast receiver. The video decoder includes: a resizing control unit for generating a resizing control signal for resizing a received video data; a header analyzer for analyzing header information from a decoded video stream and separating and outputting a video data; a variable length decoder for decoding the video data output from the header analyzer into an original pixel data with an original data size by using a variable length table, the variable length decoder including a resizer, a table converter and a buffer, the resizer controlling the table converter to decode data in blocks included in the resizing area set by the resizing control signal and controlling the buffer to store the video data in the resizing area; a dequantizer for dequantizing the decoded video data; an Inverse Transform (IT) unit for resizing and converting the dequantized frequency-domain video data into a two dimensional spatial domain video data by the resizing control signal; a movement compensator unit including movement compensators, one of which is selected by the resizing control signal, a selected movement compensator compensating for movement of a movement compensation data corresponding to one of the inverse-transformed video data and the separated video data; and a color converter for converting outputs of the inverse transform unit and the movement compensator unit into display data.

In accordance with another aspect of the present invention, there is provided a digital broadcast receiver of a portable terminal that includes an RF communication unit for up-converting a transmitted signal to a signal of an RF band and down-converting a received RF signal into a baseband signal and a data processor for demodulating and the decoding the baseband signal. The digital broadcast receiver includes: a control unit for generating a channel selection signal by a user's selection and generating a resizing control signal for resizing a received video data based on a display size of the portable terminal; a tuner for selecting a channel of a received digital broadcast signal according to channel selection signal generated by the control unit; a demodulator for demodulating the selected digital broadcast signal; a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area; a display unit for displaying the decoded video data; and a memory for storing the digital broadcast signal output from the demodulator in a record mode, the memory including buffers for temporarily storing data processed by the decoder.

In accordance with another aspect of the present invention, there is provided a method for decoding a coded video data in a digital broadcast receiver. The method includes the steps of: determining a resizing control signal for resizing a received video data; analyzing header information from a decoded video stream; separating and outputting a video data; resizing the separated video data by the resizing control signal; decoding the resized video data into an original pixel data with an original data size using a variable length table; dequantizing the decoded video data; resizing and converting the dequantized frequency-domain video data into a two dimensional spatial domain video data by the resizing control signal; movement compensating for movement of a movement compensation data corresponding to one of the inverse-transformed video data and the separated video data; and converting the two dimensional spatial domain video data and the movement compensated data into display data for a display unit.

BRIEF DESCRIPTION OF THE DRAWINGS

The above and other objects, features, and advantages of the present invention will be more apparent from the following detailed description taken in conjunction with the accompanying drawings, in which:

FIGS. 9A through 9C are graphs illustrating the characteristic of the interlace scanning;

DETAILED DESCRIPTION OF THE PREFERRED EMBODIMENT

Figure 1:
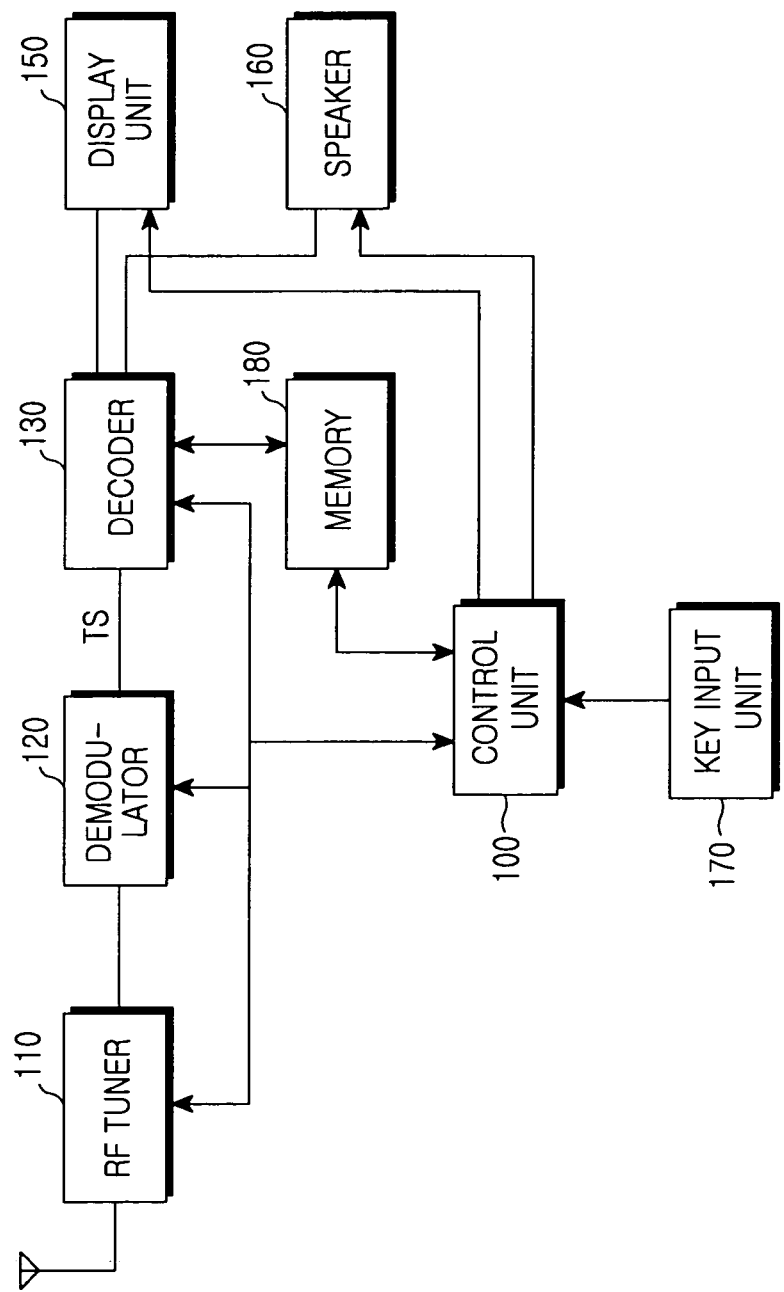
FIG. 1 is a block diagram illustrating a digital broadcast receiver of a portable terminal according to an embodiment of the present invention.

Hereinafter, preferred embodiments of the present invention will be described in detail with reference to the accompanying drawings. In the following description, the same elements will be designated by the same reference numerals although they are shown in different drawings.

Further, various specific definitions found in the following description, such as communication frequencies of a digital broadcast receiver, data structure, etc., are provided only to help general understanding of the present invention, and it is apparent to those skilled in the art that the present invention can be implemented without such definitions.

The present invention provides an apparatus and method, which analyze a display size, etc., of a received signal, resize a decoding area of the signal, and then decode data in the resized area. In the apparatus and method according to the present invention, the decoding area is adaptively resized according to the characteristics of the digital broadcast receiver, instead of decoding all the data received by the digital broadcast receiver. Therefore, the present invention can largely reduce the quantity of decoding operation according to the characteristics of the digital broadcast receiver, thereby reducing the decoding time.

The resizing factors for the decoding area of the digital broadcast signal may include display size, image scan type of the digital broadcast signal, block scan type, decoding quality according to the status of the portable terminal, and communication environment of the digital broadcast receiver (decoding speed of the decoder). By applying one or two of the resizing factors described above, it is possible to generate a control signal for resizing. In the following description, all of the five resizing factors will be considered for the resizing control of the decoder.

The resizing control of the decoder may be applied to a digital broadcast receiver that divides a screen and displays multiple broadcast signals on the screen (for example, Picture in Picture (PIP) or multi-screen display). Further, it is unnecessary or improper for a portable terminal equipped with the digital broadcast receiver to display all the image of the received digital broadcast signal because the portable terminal has a small display unit. Therefore, it is preferred to resize the broadcast signal before decoding, such that the portable terminal can display the signal on its display unit. As described, all the resizing factors may be considered in the resizing.

FIG. 1 is a block diagram illustrating a digital broadcast receiver of a portable terminal according to an embodiment of the present invention. The digital broadcast receiver shown in FIG. 1 includes an RF tuner 110, a demodulator 120, and a decoder 130. The decoder 130 may be embedded in the control unit 100 as software to implement the performance of the decoder of the digital broadcast receiver.

A key input unit 170 includes keys for input of numeral information or character information and function keys for setup of various functions. The function keys include keys for selecting functions, such as channel selection for receiving digital broadcast, broadcast reception mode control, etc.

The control unit 100 performs general control of the portable terminal. For example, according to key input through the key input unit 170, the control unit 100 generates channel selection control data of the digital broadcast receiver, control data for the demodulator 120 and decoder 130, control data for determining the demodulation performance of the demodulator 120, etc.

A memory 180 may include a program memory and a data memory. The program memory stores programs for broadcast reception of the digital broadcast receiver and programs according to embodiments of the present invention. Further, the data memory may be used as an image memory for storing image data received by the digital broadcast receiver under the control of the control unit 100. When the control unit 100 includes another memory for execution of programs, the memory 180 may be an image memory.

A display unit 150 displays an image signal of the digital broadcast receiver processed by the decoder 130 under the control of the control unit 100. A speaker 160 reproduces an audio signal processed by the decoder 130 under the control of the control unit 100.

The RF tuner 110 selects a digital broadcast channel based on the channel control data of the control unit 100 and down-converts the frequency of the broadcast signal of the selected channel to generate an intermediate frequency signal. The demodulator 120 demodulates the modulated digital broadcast signal into the original signal.

The decoder 130 divides the demodulated signal into an image signal and an audio signal and decodes and outputs the divided image and audio signals.

Referring to FIG. 1, the received digital broadcast signal of the portable terminal may be signals of the VHF band (174 MHz~230 MHz; C5~C12) and/or UHF band (470 MHz~862 MHz; C21~C69) and/or L-band signals (1 GHz~2.6 GHz). When the user selects a broadcast channel, the control unit 100 outputs control data corresponding to the selected channel. The RF tuner 110 generates and mixes the RF frequency according to the channel data, thereby generating an intermediate frequency signal of the selected channel. The Intermediate Frequency (IF) may be 36.17 MHz.

The analog IF signal described above is applied to the demodulator 120. Then, the demodulator 120 converts the analog signal to a digital signal, demodulates the digital signal according to a predetermined demodulation scheme, and outputs the demodulated signal. The digital broadcast receiver may use a Coded Orthogonal Frequency Division Multiplexing (CODFM) scheme as a modulation scheme. According to a preferred embodiment of the present invention, the demodulator 120 may use MT352™ manufactured and sold by Zarlink Semiconductor Inc. In this case, the signal demodulated by the demodulator 120 is output as 8 bits of MPEG-2 TS data. That is, the demodulator 120 converts the signal of the selected channel output from the RF tuner 110 into digital data, which is controlled according to the number of carriers and additional symbols and loops along a Fast Fourier Transform (FFT) loop circuit. Further, the FFT signal is reproduced as a final signal through error-correction for reconstructing the order and interval of the signal and the final signal is output as MPEG-2 TS signal.

The MPEG-2 TS signal output from the demodulator 120 is applied to the decoder 130. Then, the decoder 130 divides the received MPEG-2 TS signal into image and audio data, decodes them, and then outputs an image signal and a voice signal. The image signal may be an RGB signal or YUV signal, and the audio signal is output usually as Pulse Code Modulation (PCM) stereo sound. Further, the image signal output from the decoder 130 is output and displayed by the display unit 150 and the audio signal is applied to and reproduced by the speaker 160.

The control unit 100 controls the general operation of the digital broadcast receiver as described above. For such control, the control unit 100 outputs channel control data for user's determination of the frequency area of the selected channel and control data such as carrier mode (e.g. 2 k, 8 k, etc.) to the RF tuner 110. Further, for the demodulator 120, the control unit 100 appoints a code rate, a guard interval, etc., which are different information according to a broadcasting standard of each nation, so that the demodulation can be normally performed. Moreover, for the demodulator 130, the control unit 100 performs initialization for appointing a service actually viewed within a predetermined physical channel, issues commands such as reproduction, stop, recording, screen capture, etc., and receives feedback information during the decoding.

Further, a decoding memory which can be used as an input/output buffer of the digital broadcast signal, another storage space, or a temporary buffer during decoding, is necessary for the decoding in the decoder 130. The control unit 100 and the decoder 130 can share the decoding memory. Further, the decoding memory can be used as an input/output buffer of the image and voice signals and stores the decoded information as a table. The data that can be stored in the table contains various information, including a picture sequence (GOP sequence;. IBBPBBP . . . ), which is used as a standard for determination during the decoding and included in the header information of each frame.

The memory 180 may be used as the decoding memory. However, when the memory 180 is used only as an image memory, a separate memory may be used as the decoding memory.

Figure 2:
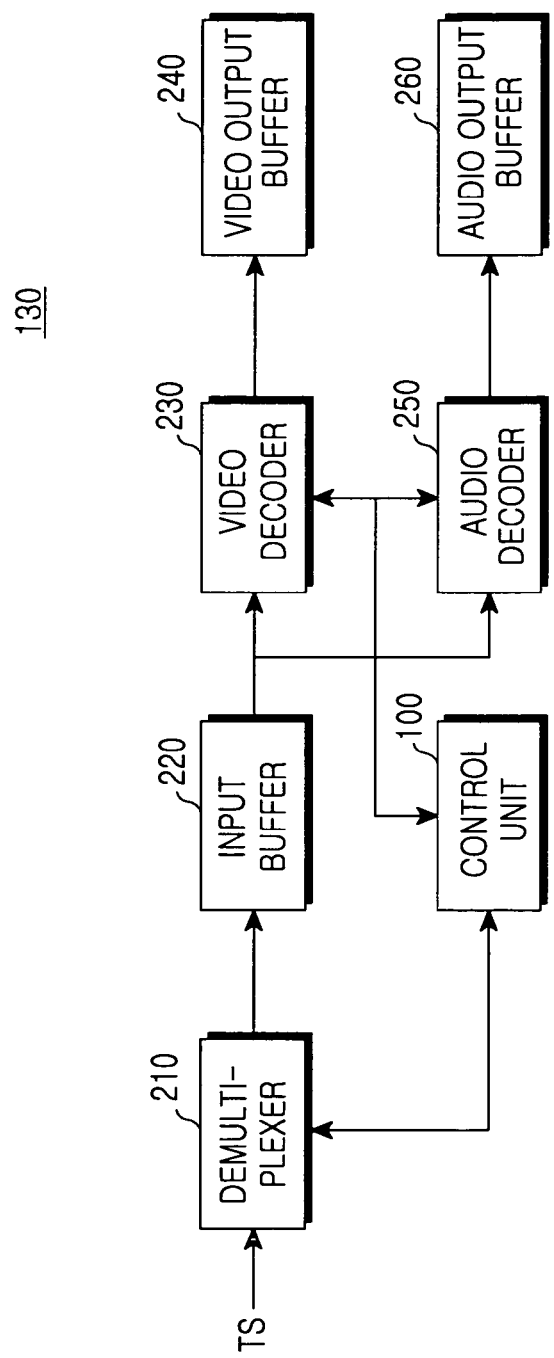
FIG. 2 is a block diagram illustrating the decoder of FIG. 1.

FIG. 2 is a block diagram illustrating the decoder 130. In the decoder 130, a demultiplexer 210 receives the demodulated MPEG-2 TS data output from the demodulator 120 and divides each data into audio data, video data, and other data. From among the divided data, the other data is the data other than the video data and audio data in the digital broadcast signal, which may be program data.

In the following description, a description of other data will be omitted and only the video and audio signals will be described for the broadcast signal.

The control unit 100 selects and reports information, i.e., product ID (PID) or service ID, of the broadcast for the selection by the demultiplexer 210, and the demultiplexer 210 selects a target data from among various data output from the demodulator 120 based on the selected PID and divides the target data into image data and audio data.

The input buffer 220 is a typical queue buffer, which may be a kind of circular buffer having a similar structure to that of a FIFO buffer, and stores the real-time demultiplexed data in an amount that can be processed by the video decoder 230 and the audio decoder 250 behind the input buffer 220. The input buffer 220 may have either an integral structure for storing both the video data and audio data or a structure for separately storing the video data and audio data.

The video decoder 230 decodes the video data.

In broadcasting of the digital broadcast receiver, it is usual to receive an MPEG-2 video Elementary Stream (ES) and convert it to YUV 4:2:0 data. However, according to embodiments of the present invention, the MPEG-2 video ES is converted to the RGB data for output proper for the display unit (LCD) of the portable terminal.

Further, according to the present invention, the decoding of the video signal is selectively performed according to the size of the display unit of the portable terminal. The converted RGB data is stored in the video output buffer 240 and is output at a right output time point.

The audio decoder 250 decodes an audio signal. In the same way as the video decoding, the audio decoder 250 receives an MPEG-2 audio ES and converts it to a PCM audio signal. The converted PCM audio signal is temporarily stored in the audio output buffer 260 and output at the correct output time point.

Figure 3:
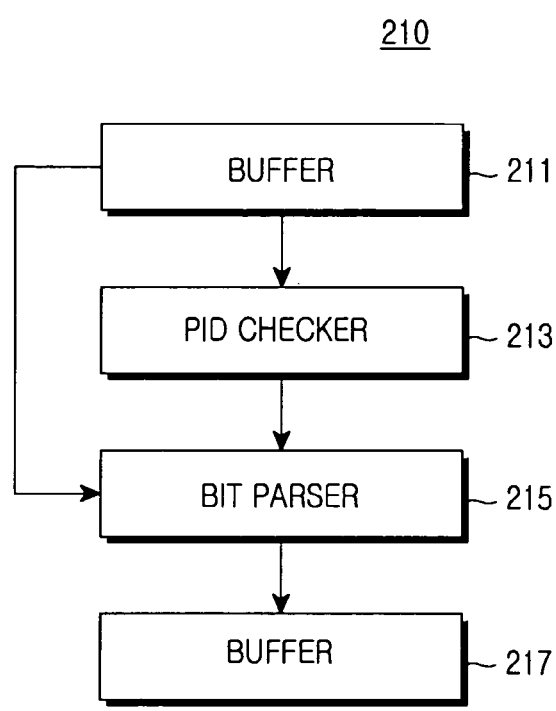
FIG. 3 is a block diagram illustrating the demultiplexer illustrated in FIG. 2.

FIG. 3 is a block diagram illustrating the demultiplexer 210 illustrated in FIG. 2. In the demultiplexer 210, the MPEG-TS signal output from the demodulator 120 is stored in a buffer 211. The buffer 211 stores input data using a high speed data such as a camera interface. It is preferred that the buffer 211 has the structure of a typical queue buffer. A PID checker 213 searches an audio PID or video PID from the header of the MPEG-TS data stream, divides the data into audio and video data based on the PIDs, and checks PIDs of the other data. According to the output of the PID checker 213, a bit parser 215 selects audio data and video data from the TS stream stored in the buffer 211 and stores the selected data in a buffer 217. The buffer 217 may be the input buffer 220 illustrated in FIG. 2.

As described above, the demultiplexer 210 checks the PID in the header information from the TS stream output from the demodulator 120, divides the TS stream into an audio signal and a video signal, demultiplexes the audio signal and video signal in the TS stream, and stores the demultiplexed signals in the input buffer 220.

Figure 4:
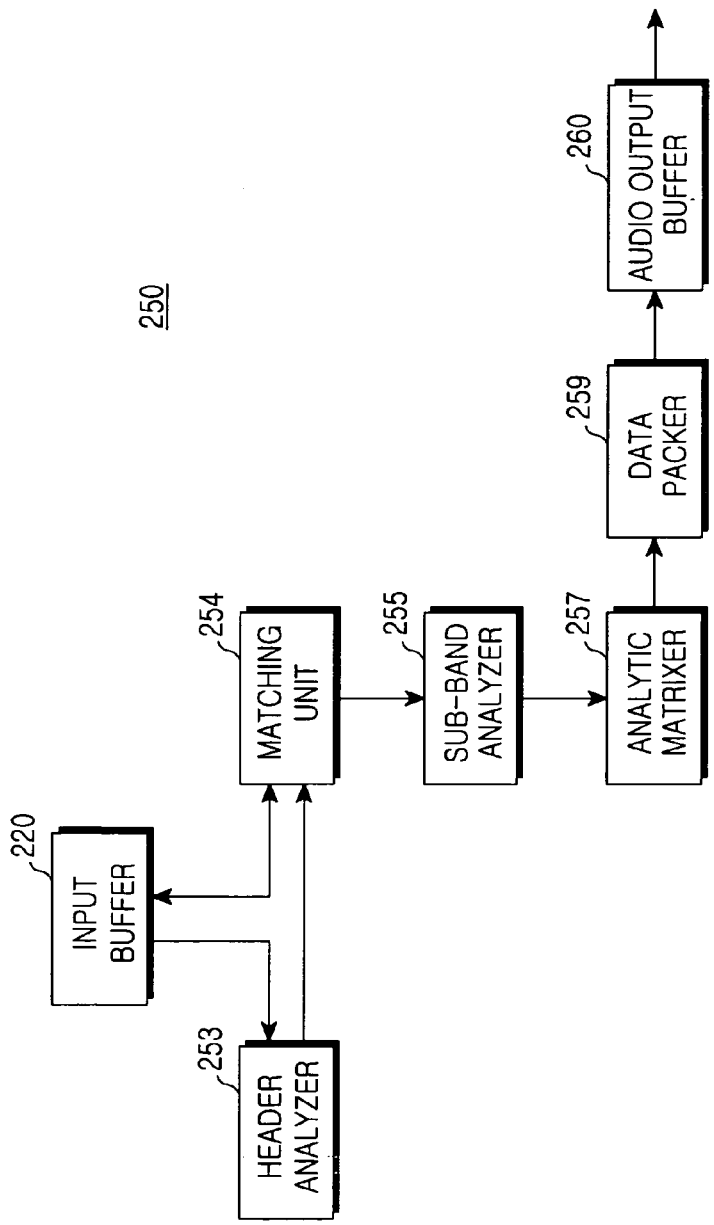
FIG. 4 is a block diagram illustrating the audio decoder illustrated in FIG. 2.

FIG. 4 is a block diagram illustrating the audio decoder 250 illustrated in FIG. 2. The audio decoder 250 has the same structure as that of an MPEG-1 Layer-1/2 decoder. However, in the case of digital broadcasting, e.g., DVB or DMB, the audio decoder may be an AAC+ audio decoder, a BSAC audio decoder, or a WHA audio decoder.

Referring to FIG. 4, when a sufficient quantity of packet data is buffered in the input buffer 220, a header analyzer/unpacker 253 un-packs the data stored in the input buffer 220, analyzes the header, and outputs the result of the header analysis to a matching unit (table constructor) 254. The matching unit (table constructor) 254 has a decoding table and uses the analyzed header information to perform bit parsing by matching the audio data stored in the input buffer 220.

A sub-band analyzer 255 analyzes the sub-band of the bit-parsed audio data, and an analytic matrixer 257 generates a filter matrix through analysis of the sub-band and performs filter calculation. Thereafter, a data packer 259 arranges by time and combines the decoded audio data output from the analytic matrixer 257, and the audio data output from the data packer 259 is stored in an audio output buffer 260.

Figure 5:
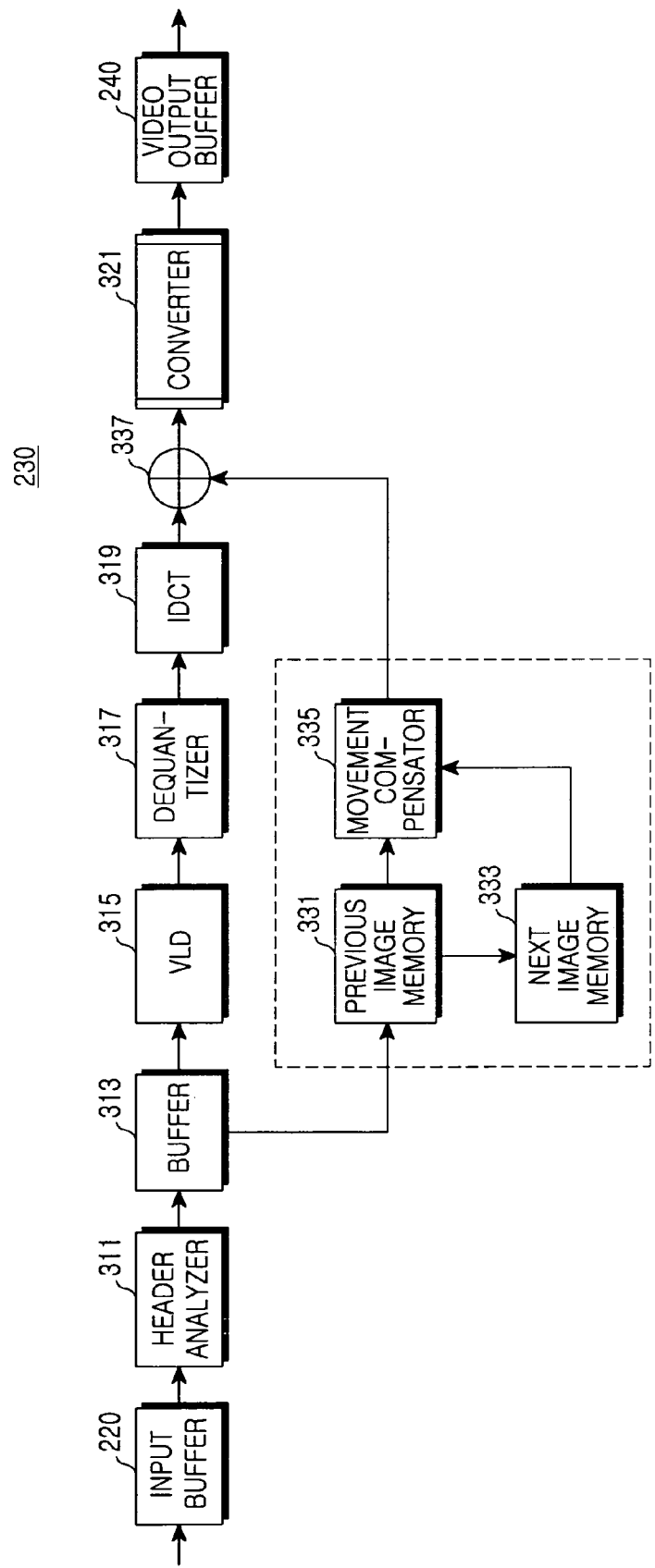
FIG. 5 is a block diagram illustrating the video decoder illustrated in FIG. 2.

FIG. 5 is a block diagram illustrating the video decoder 230 illustrated in FIG. 2. The video decoder 230 illustrated in FIG. 5 has the same structure as that of an MPEG-2 video decoder. An H.264, WMV, or MPEG-4 video decoder has a structure slightly different from that illustrated in FIG. 5. However, the H.264, WMV, and MPEG-4 video decoder have the same basic elements including a Variable Length Decoder (VLD) for decoding a coded data having a variable length into a data having an original length, an inverse converter for converting a data of a two dimensional frequency domain to an image data of a two dimensional spatial domain, and a Movement Compensator (MC) for compensating for movement of the image data. In the case of the video decoder for decoding the MPEG-coded data, the inverse converter may use an Inverse Discrete Cosine Transform (IDCT) scheme. However, when decoding data coded by the H.264 scheme, the inverse converter may use an Inverse Integer Transform (IIT) scheme.

Referring to FIG. 5, the demultiplexed data stored in the input buffer 220 is input to the header analyzer 311. The head analyzer 311 extracts header information for decoding of the video data stream and transfers only the compressed image data to a buffer 313. The buffer 313 buffers information until information for one frame is completely transferred. The frame image buffered in the buffer 313 may be an I frame, P frame, or B frame image. The I frame is an intra frame having a structure similar to that of the JPEG image data, which does not perform movement compensation. However, the P frame and B frame image is a non-intra frame image, which must compensate for movement with reference to the previous frame image and the next frame image. Therefore, when the video signal buffered in the buffer 313 is an I frame signal, the I frame video signal is applied to the variable length decoder for decoding. However, when the video signal buffered in the buffer 313 is a B frame or P frame signal, the movement compensation is performed.

In decoding, a variable length decoder 315 sequentially reads the input data, performs the decoding through the matching table, and transfers the foremost data from among the decoded data to a dequantizer 317. The dequantizer 317 dequantizes the output of the variable length decoder 315, extracts only the DC component from the frequency domain data, and outputs the extracted DC component to an Inverse Discrete Cosine Transformer (IDCT unit) 319. The IDCT unit 319 converts the frequency domain data to special domain data for the other area based on the DC component obtained through dequantization. The converted value has a YUV 4:2:0 format in MPEG-2.

Hereinafter, decoding of P and B frame images requiring movement compensation will be discussed. First, because the P frame requires a previous frame image, the movement compensator unit 335 obtains a movement vector by comparing the previous frame image stored in the previous image memory 331 with the input P frame image, and then compensates for the movement by using the obtained vector. Because the B frame requires a previous frame image and a next frame image, the movement compensator unit 335 obtains a movement vector by comparing the previous frame image stored in the previous image memory 331 and the next frame image stored in the next image memory 333 with the input B frame image, and then compensates for the movement by using the obtained vector. The P and B frame images are applied to the variable length decoder 315 in which they experience the same process as that for decoding the I frame image signal. Further, the movement compensation data output from the movement compensator unit 335 is added to the data extracted through the process from the previous P frame or B frame to the IDCT by the adder 337. The added data also has the YUV 4:2:0 format.

The video data having the YUV 4:2:0 format output as described above needs to be converted for the display characteristic of the display unit 150. It is usual that the display unit 150 of the portable terminal is an LCD. When the display unit 150 is an LCD (TFT LCD), it is necessary to convert the video data having the YUV 4:2:0 format to a data having a 16 bit or 18 bit RGB format.

For a typical Cathode Ray Tube (CRT) monitor, it is necessary to convert the video data having the YUV 4:2:0 format to a data having a 24 bit RGB format. Therefore, the converter 321 converts the video data having the YUV 4:2:0 format to a data having a proper format (e.g. an RGB format) for the output unit. The data having the converted format is buffered in the video output buffer 240.

An RF signal of digital broadcasting received through an antenna has a frequency in the VHF band and UHF band, just as a typical television signal has. Further, each channel has a predetermined bandwidth, e.g., 8 MHz.

Figure 6A:
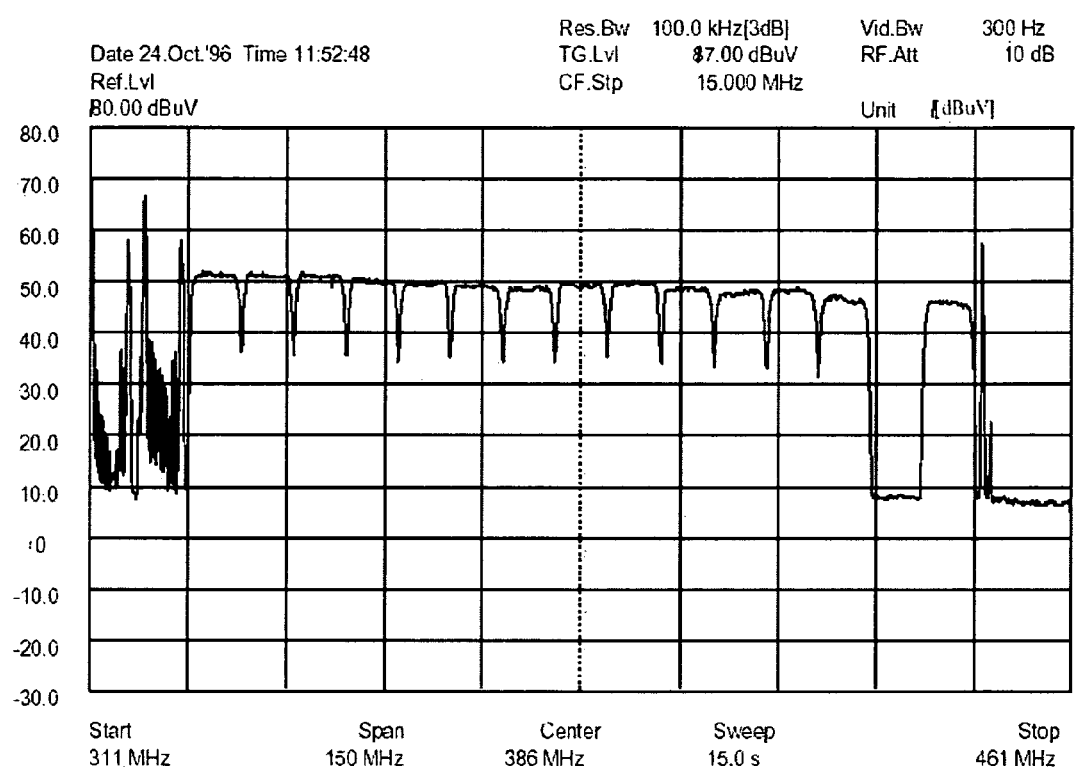
FIG. 6A is a graph illustrating an RF signal characteristic of a digital broadcast receiver, which shows existence of an RF signal in each frequency band centered on 386 MHz.
Figure 6B:
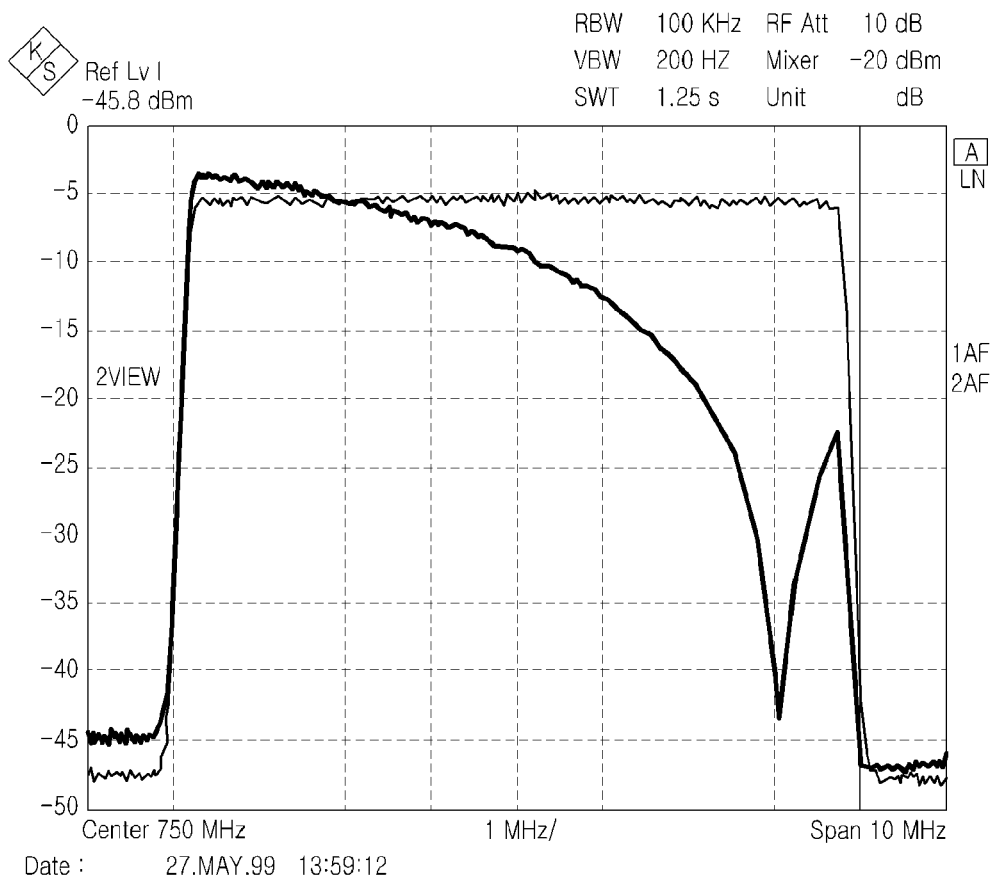
FIG. 6B is a graph illustrating a particular physical channel (8 MHz) in detail from among the RF channels illustrated in FIG. 6A.

FIG. 6A is a graph illustrating an RF signal characteristic of a digital broadcast receiver, which shows existence of an RF signal in each frequency band centered on 386 MHz. FIG. 6B is a graph illustrating a particular physical channel (8 MHz) in detail from among the RF channels illustrated in FIG. 6A. Therefore, when one user selects a particular channel, the control unit 100 transfers control data for channel selection to the RF tuner 110, and the RF tuner 110 generates a channel frequency based on the control data, thereby selecting a signal of the particular selected channel as illustrated in FIG. 6B. The signal output from the RF tuner 110 is subjected to filtering for a preset channel, and the filtered signal is used as an intermediate frequency signal for frequency down conversion of the signal.

Figure 6C:
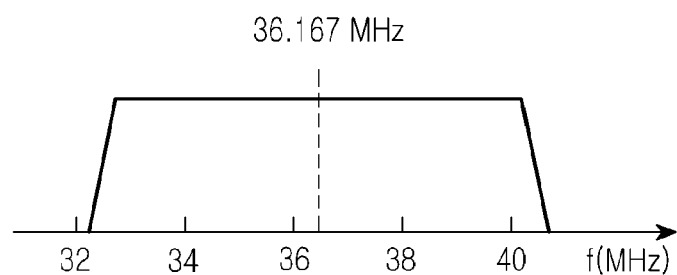
FIG. 6C illustrates a characteristic of an IF filter of a digital broadcast receiver.

FIG. 6C illustrates a converted IF signal obtained by filtering the RF signal of one channel through frequency movement of the center frequency and then mixing the filtered signal centering on 36.167 MHz.

Figure 7A:
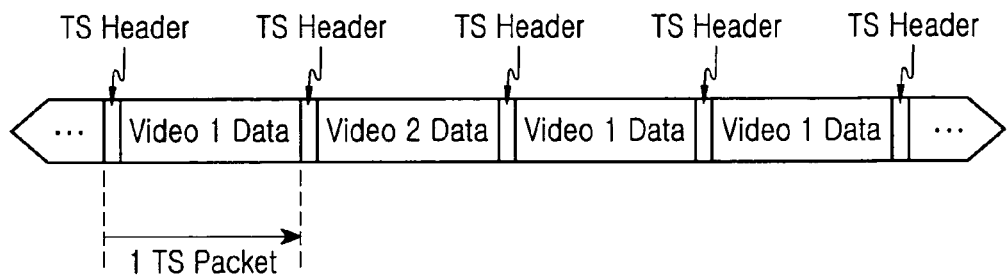
FIG. 7A illustrates a stream of a digital broadcast receiver.

The demodulator 120 converts the input signal to a digital signal and converts the converted IF digital signal to a baseband digital signal. Thereafter, the baseband signal is looped along an FFT loop circuit while it is controlled depending on the number of carriers, additional symbols, etc. Further, the order and interval of the signal output through the FFT loop circuit are reconstructed for error correction and reproduction of the signal into the final signal, and the final signal is then output as MPEG2-TS data. The MPEG2-TS data may have the construction as illustrated in FIG. 7A. In the Transport Stream (TS) of the MPEG2-TS data, 188 bytes constitute one packet (TS packet) and each packet includes a header (TS header) and a data field. The data field may contain either video data or audio data, has an order corresponding to the multiplexed order, and has no regularity. Table 1 shows a structure of the TS header of FIG. 7A.

TABLE 1

| Packet | Description | Bit Allocation |
|---|---|---|
| Sync Byte | 0x47 synchronization code | 8 |
| Error Indicator | Existence or absence of error on TS packet | 1 |
| Payload Start Indicator | Payload start position | 1 |
| Transport Priority | Decoder priority | 1 |
| PID | Packet type identifier | 13 |
| Scrambling Control | Scramble mode | 2 |
| Adaptation Field Control | Adaptation field data/existence of payload | 2 |
| Continuity Counter | 4 bit counter | 4 |

Figure 7B:
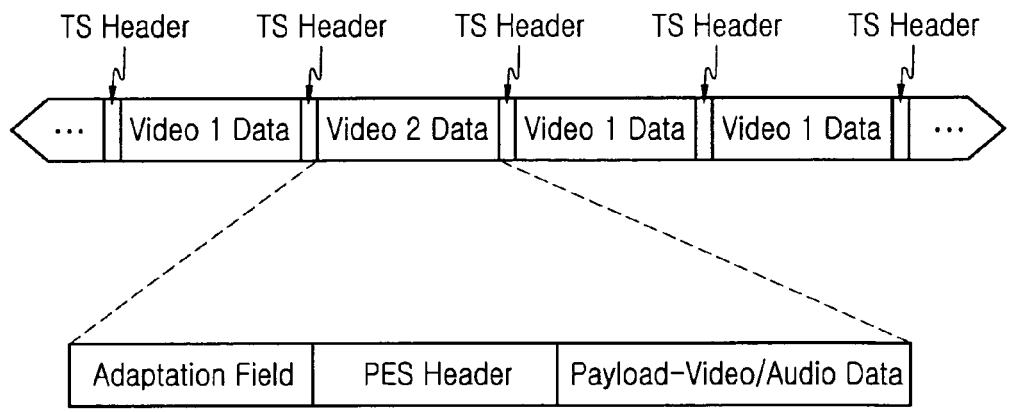
FIG. 7B illustrates a packet structure of a digital broadcast receiver.

FIG. 7B illustrates a data field in the header illustrated in FIG. 7A. Referring to FIG. 7B, the data filed may be a payload field, which includes an adaptation field, a Packetized Elementary Stream (PES) header, and a payload (video/audio data). As used herein, the term 'payload' refers to video/audio/data (herein, the data includes EPG data).

In the payload field, the adaptation field basically contains PCR (clock reference) information and additional information added at the time of manufacture. Further, the PES header field contains information for decoding each packet, and particularly includes time information for synchronization when decoding, such as Presentation Time Stamp (PTS) and Decoding Time Stamp (DTS).

Table 2 below shows the structure of the PES header field in the data field.

Further, the payload field basically includes video or audio data possibly together with additional header data field. The video or audio data may be a video Elementary Stream (ES) usually called MPEG2 dynamic picture or an audio ES, or a binary data for data broadcasting.

TABLE 2

| Packet | Description | Bit Allocation |
|---|---|---|
| Start code | 0x000001 | 24 |
| Stream ID | Stream identifier | 8 |
| PES Packet Length | "10" | 2 |
| PES Scrambling Control | Scramble on/off | 2 |

TABLE 2-continued

| Packet | Description | Bit Allocation |
|---|---|---|
| PES Priority | Decoding priority | 1 |
| Data Alignment Indicator | Decoding order | 1 |
| Copyright | Existence/absence of copyright | 1 |
| Original or Copy | Original/copy | 1 |
| PTS/DTS Flag | Existence/absence of PTS/DTS | 2 |
| Etc. Flag | Flag according to MPEG-2 standard such as ESCR, ES | 6 |
| PES Header Data Length | Total length of PES Packet Header | 8 |
| Additional Header data | Data as much as 'data length - basic allocation' | — |

The decoder 130 for receiving the MPEG2-TS data output from the demodulator 120 includes a demultiplexer 210 for demultiplexing the MPEG2-TS data into video and audio data and an audio decoder 250 and a video decoder 230 for decoding the demultiplexed audio and video data. The video decoder 230 10 decodes the received video data by the frame and outputs the decoded data to the display unit 150. The data transferred from the decoder 130 to the display unit 150 may be various types depending on input types of the display unit 150.

Table 3 below shows examples of the various input types of the display unit 150.

TABLE 3

| Main Usage | Display Size |
|---|---|
| Mobile Phone (Normal Phone) | 128 × 128 |
| | 128 × 160 |
| | 176 × 160 |
| | 176 × 208 |
| | 176 × 220 |
| | 240 × 320 |
| Smart Phone (Smart Phone, PDA) | 128 × 160 |
| | 176 × 208 |
| | 176 × 220 |
| | 240 × 320 |
| | 324 × 354 |
| Mobile A/V (DSC, DVC, PMP, Car TV, etc.) | 320 × 240 |
| | 480 × 234 |
| | 492 × 240 |
| | 561 × 240 |
| | 800 × 480 |
| | 800 × 600 |
| Digital TV | 1280 × 1024 |
| | 1920 × 1080 |

Further, the signal output from the decoder 130 to the speaker 160 usually passes through an audio codec chip. Therefore, the signal is either directly output after being coded into a PCM signal or output as an analog audio signal.

The RF tuner 110 and the demodulator 120 are also called a Network Interface Module (NIM) although they perform different functions and independently operate. The communication method between the control unit 100, the RF tuner 110, and the demodulator 120 may be 12C. Further, based on the control data, the control unit 100 and the video decoder 230 of the decoder 130 exchange control data for broadcast reception start, temporary stop, record, end, frame rate adjustment, screen resizing, and color balance adjustment, and video decoding result. Further, the control unit 100 and the audio decoder 250 of the decoder 130 exchange control data for start, record, equalizer, volume, silence, and frame rate adjustment, and the audio decoding result by the control data.

Table 4 shows input/output signals between the control unit 100 and the decoder 130.

TABLE 4

| Controller → Decoder | |
|---|---|
| Controller → Video Decoder | |
| Controller | Video Decoder |
| Start (reproduction) | Input buffering start |
| Screen capture (temporary stop) | Current image output & temporary storage in memory |
| Record (image storage) | Store input buffer intact in memory |
| End (stop) | Decoding stop |
| Frame rate adjustment | Frame skipping operation & skip frame setup |
| Display size adjustment | Resizer operated & screen output size adjustment |
| RGB Color Balance adjustment | R, G, B factor adjustment (output color adjustment) |
| Controller → Audio Decoder | |
| Controller | Audio Decoder |
| Start (reproduction) | Input buffering start |
| Record (voice storage) | Store intact input buffer in memory |
| Equalizer | Give a weight value to each band |
| Volume control | Volume control |
| Silence | Sound output off (decoding continues) |
| Frame rate adjustment | Frame skipper operation & skip frame setup |
| Audio/Video Decoder → Controller | |
| Decoder | Controller |
| Excessive decoding load | Reduce frame fate |
| Buffer under flow | Temporary stop |
| Buffer overflow | Decoding stop & restart |
| Stream broken | Internal alarm |
| Stream source lost | Temporary stop & user alarm |

Hereinafter, a process of resizing an image screen to be displayed by the video decoder 230, according to a display scheme of the video decoder 230, will be described in detail.

A method for resizing an image screen according to an embodiment of the present invention involves a number of resizing factors, such as a display size, an image scan type, a block scan type, a decoding speed, a decoding quality, etc. In resizing the decoded screen image, it is possible to use either some or all of such resizing factors as described above. Hereinafter, a case of resizing the image screen applied to the display unit 150 by taking all the resizing factors into account will be discussed.

However, prior to describing the resizing process in detail, the operation of the video decoder 230 for the resizing will be discussed in detail.

A video coder of the digital broadcast transmitter may use various image coding schemes such as MPEG2, H.264, and MPEG4. Also, the video decoder of the digital broadcast receiver must use a decoding scheme corresponding to the coding scheme used in the video coder of the digital broadcast transmitter. The present embodiment is based on an assumption that the digital broadcast receiver is a receiver for receiving an MPEG2 image signal. Therefore, the video decoder 230 illustrated in FIG. 5 may be an MPEG2 video decoder. However, the video decoder 230 may also be an H.264 or MPEG-4 video decoder.

Figure 8:
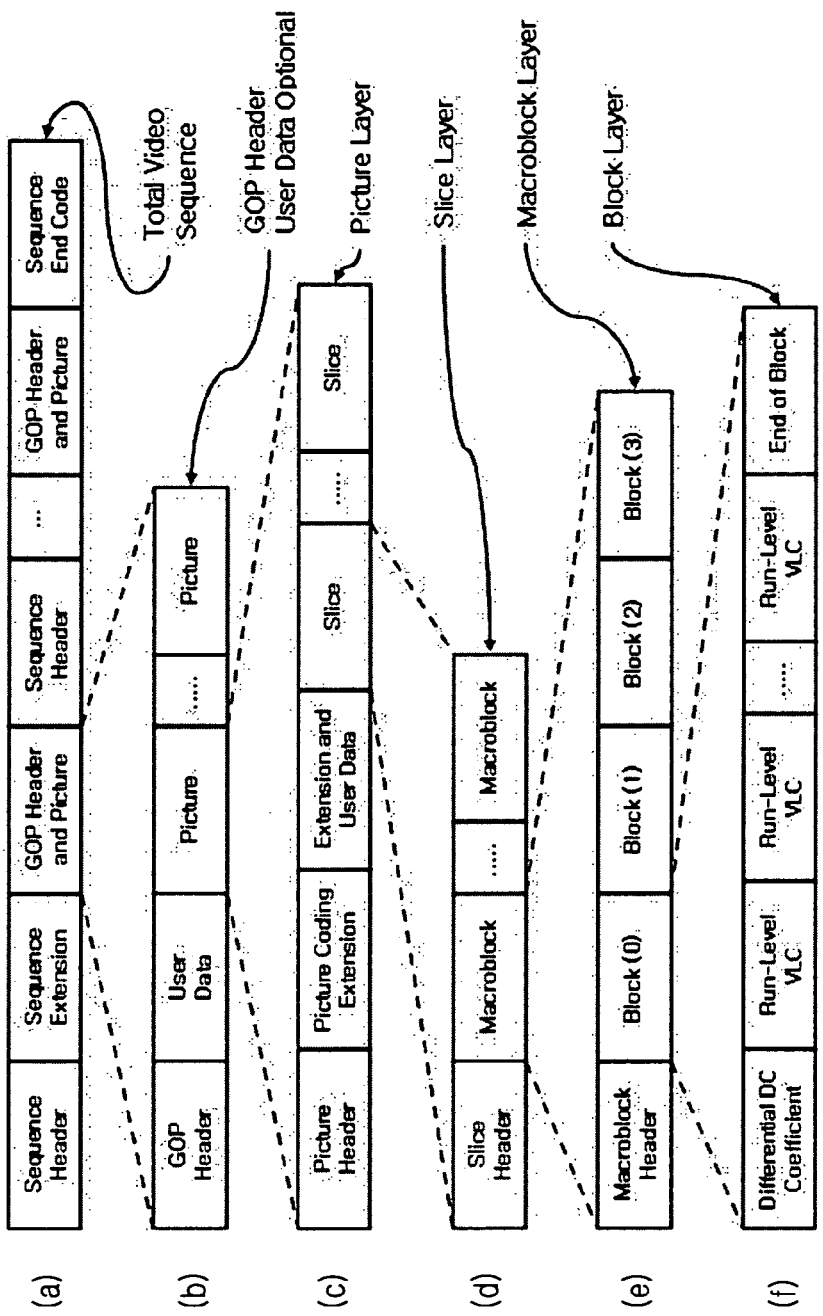
FIG. 8 illustrates a video layer structure of a digital broadcast receiver.

Referring to FIG. 5, the header analyzer 311 divides packets according to each layer of the MPEG2 video ES structure as illustrated in FIG. 8 and analyzes headers of the divided layers. The MPEG2 video layer structure includes six layers, as by (a) through (f) in FIG. 8.

Referring to FIG. 8, the video sequence layer (a) is a screen group having a series of same properties. The sequence header has a main function by which it can enable reproduction from the middle of a bit stream. That is, the sequence header is the portion for containing the most basic and general information in the MPEG2, and the sequence start code is continuously followed by information, such as horizontal display size, vertical display size, a screen aspect ratio, a picture rate, a bit rate, a Video Buffering Verifier (VBV), buffer size, parameter flag, and a flag for loading two quantized matrix.

The Group Of Picture (GOP) layer (b) has information for edition of the screen group which serves as a random access unit and duration from the sequence start, etc. The start code is followed by a plurality of flags such as a time_code flag, a closed_GOP flag, broken_link flag, etc.

The picture layer (c) has a screen coding mode, a picture type, etc., as common characteristics for one screen. The D-picture used in MPEG1 has a screen having only the DC component used for fast forward, fast backward, etc., and the picture types thereof include I, P, and B pictures. The start code is followed by a temporal reference indicating the order of screens among the GOPs, a picture type, a flag indicating if a coder or a movement vector has a unit of integer, a frame interval (F_code) of the movement vector, etc.

A slice layer (d) contains common information for small screens with a predetermined length divided from one large screen, for example, a quantization property. The slice layer (d) is a band of macroblock having a predetermined length, which is the minimum unit among a series of data sequences having the start code, cannot extend over a plurality of pictures. It is impossible to skip the first and last macroblocks. However, in the case of a slice including only one macroblock, it is possible to skip the macroblock. It is not possible to repeat the slices or skip one of the slices. The vertical location of the slice is included in the slice start code itself, and the horizontal location of the first macroblock of the slice is represented by a macroblock address of the macroblock layer.

A macroblock layer (e) is a layer linked to a plurality of block layers (f), usually to four block layers. The macroblock layer (e) contains movement compensation and movement vector values, etc., which are common information for pixel blocks divided from the slice layer. The macroblock layer (e) includes a predetermined number of macroblock stuffing, macroblock escape, macroblock address (MBA), macroblock type, etc., which are sequentially arranged.

The block layer (f) is a minimum unit for transmission and compression, which includes a necessary IDCT coefficient and is ended with End Of Block (EOB). Even when the block layer (f) includes 64 VLCs having such a coefficient, the EOB is provided. The intra DC uses an independent VLC, and the others are expressed by a two dimensional VLC.

Therefore, the header analyzer 311 divides the MPEG2 video ES illustrated in FIG. 8 into packets according to each layer, and analyzes the sequence header, GOP header, picture header, slice header, and macroblock header. Further, based on the result of the header analysis as described above, the header analyzer 311 checks the frame rate, picture size, picture coding type (I frame, P frame, or B frame), GOP sequence (the sequence of the I/P/B frames presented by the MPEG2 standard, such as 'IBBPBBPBBP' or 'IBPBPBPB-PBP'), for use of the result in the future decoding process.

The buffer 313 stores actual data among the data divided as described above by the header analyzer 311. The actual data stored in the buffer 313 includes an index of the block data so that the block data can be extracted in the macroblock mode. The data is the I frame, the data is input to the variable length decoder 315. The variable length decoder 315 performs Variable Length Decoding (VLD) based on the parsing information transferred from the header analyzer 311. It is preferred that the variable length decoding scheme used by the header analyzer 311 is the Hoffman decoding scheme as proposed by the MPEG2 standard, in which each data is read by the bit and is converted based on a predetermined standard table.

A typical variable length decoding method is first executed when the decoding is performed in the macroblock mode. The variable length decoder 315 converts the data compressed and stored according to a Variable Length Coding (VLC) scheme into the original data. The variable length decoder 315 continues decoding until it completely decodes all data of one macroblock.

The value decoded by the variable length decoder 315 is input to the dequantizer 317. The dequantizer 317 extracts the DC value in the DCT, which is the core in compression of the MPEG2 dynamic image. The Inverse Discrete Cosine Transformer (IDCT unit) 319 performs decoding of the IDCT scheme. In the MPEG2, the unit of the IDCT is limited to the 8*8 pixel area, and the transform (8*8 IDCT) can be defined by Equation (1) below.

$$f(x, y) = \frac{1}{4}\sum_{u=0}^{7}\sum_{v=0}^{7} C(u)C(v)F(u, v)\cos\frac{(2x+1)u\pi}{16}\cos\frac{(2y+1)v\pi}{16} \quad (1)$$

The two dimensional transform in Equation (1) is equivalent to a process in which data having been subjected to a transform for the x-axis as in Equation (2) is transposed and is then subjected to the same IDCT for the y-axis. Equation (2) below defines 8-point IDCT for the x-axis and Equation (3) below defines 8-point IDCT for the y-axis.

$$f(x) = \frac{1}{2}\sum_{u=0}^{7} C(u)F(u)\cos\frac{(8x+1)u\pi}{16} \quad (2)$$

$$f(y) = \frac{1}{2}\sum_{v=0}^{7} C(v)F(v)\cos\frac{(2y+1)v\pi}{16} \quad (3)$$

When the data output from the buffer 313 is a non-intra frame, which is not an I frame, but is a P or B frame, a process for movement compensation is necessary. When the data is a P or B frame, an additional process for movement compensation is performed and the result of the process is compared with the final result of the IDCT and is then output.

When the data is a P frame, the movement compensator unit 335 calculates a movement vector by comparing the image data of the previous frame stored in the previous image memory 331 and the input B frame image with each other, and then compensates for the movement by using the calculated vector value. Because the B frame requires a previous frame image and a next frame image, the movement compensator unit 335 obtains a movement vector by comparing the previous frame image stored in the previous image memory 331 and the next frame image stored in the next image memory 333 with the input B frame image, and then compensates for the movement using the calculated vector.

The movement compensation proposed by the MPEG2 standard is interpolated by applying half-pel resolution in order to enhance the correlation between frames. That is, the movement information transmitted through a channel is calculated by half-pel resolution. The movement compensation value calculated as described above is output after being added to the IDCT value previously calculated by the adder 337.

Thereafter, the IDCT-converted signal (I, B, and P frame image) is converted to a signal proper for the display unit 150 by the converter 321 and is then output by the display unit 150. When the display unit 150 is a Liquid Crystal Display (LCD), the converter 321 converts the YUV video signal to an RGB video signal.

The method for scanning a signal to the display unit 150 for a dynamic image, especially a dynamic image for broadcasting, can be classified into two types including a progressive scanning and an interlace scanning.

FIG. 9A is a graph illustrating the characteristic of the progressive scanning and FIGS. 9B through 9C are graphs illustrating the characteristic of the interlace scanning. According to the progressive scanning in FIG. 9A, the output signal is scanned for each line. According to the interlace scanning in FIGS. 9B and 9C, the output signal is scanned for even lines and odd lines, respectively.

Figure 10A:
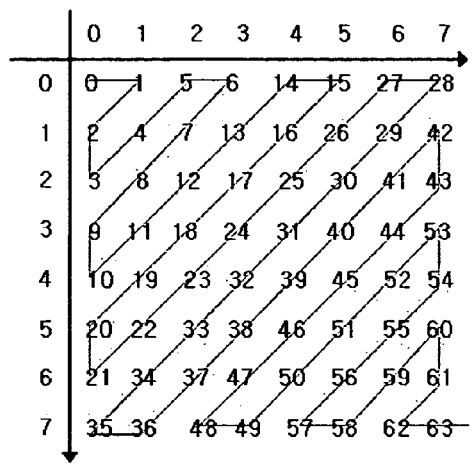
FIGS. 10A and 10B illustrate examples of scannings with different order of pixels based on the positions of the pixels.
Figure 10B:
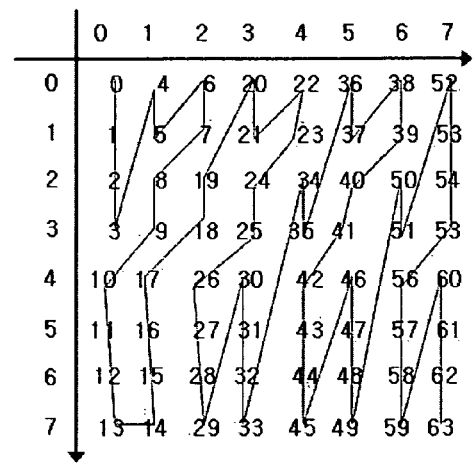

FIG. 10A illustrates a scanning method for compressing 8*8 pixels into one-dimensional pixels in a dynamic image compression method, such as MPEG2. It is necessary to code the DCT coefficients by converting the two dimensional values of the DCT coefficients into one dimensional values. In such coding, it is possible to improve the compression efficiency by grouping the low frequency signals together and the high frequency signals together, respectively. Therefore, such grouping is accomplished by the scanning described above. The scanning includes a zigzag scanning as illustrated in FIG. 10A used in both MPEG1 and MPEG2 and an alternate scanning used only in MPEG2. FIGS. 10A and 10B illustrate examples of scannings with different order of pixels based on the positions of the pixels.

For a portable terminal having a digital broadcast receiver, it is efficient to resize a received image signal. That is, the display unit 150 of a portable terminal has a limited size which is much smaller than that of a display unit of a typical digital broadcast receiver, so it is efficient to resize a received image signal in order to make a display image to have a size proper for the display unit 150 of the portable terminal. Further, for screen display (image scanning) of an image received by a digital broadcast receiver, it is possible to use progressive scanning and interlace scanning as illustrated in FIGS. 9A through 9C. Therefore, it is preferred to resize the received image signal according to the image scanning scheme of the received image signal.

Also, it is possible to resize the image signal by the block scanning schemes as shown in FIGS. 10A and 10B.

A portable terminal has a limited decoding speed because the portable terminal is a minified appliance different from a typical digital broadcast receiver. Therefore, it is preferred to resize the image signal according to the processing speed of the digital broadcast signal received by the portable terminal.

It is possible to resize the image signal according to the decoding quality, which can be displayed by the portable terminal. Therefore, the resizing factors used for a resizing control signal of the video decoder 230 according to an embodiment of the present invention can be expressed as shown in Table 5 below. Of course, factors other than the resizing factors shown in Table 5 can be considered.

TABLE 5

| Factor Name | Factor Description | Factor Values Example |
|---|---|---|
| Display Size | Size of the finally displayed screen | SD, CIF, QCIF |
| Image Scan | Screen display type | Progressive, Interacted |
| Block Scan | Block scan type | Zigzag, Alternative |

TABLE 5-continued

| Factor Name | Factor Description | Factor Values Example |
|---|---|---|
| Decoding Speed | Decoding speed | High speed/low speed |
| Decoding Quality | Decoding quality | High quality/low quality |

From among the resizing factors of the portable terminal, the resizing factor having the largest influence is the size of the display unit 150 of the portable terminal. Therefore, in resizing the display size based on the resizing factors, it is possible to take either all of the resizing factors as shown in Table 5 or at least one selected factor into consideration. The following embodiment of the present invention is based on an assumption that the display size is resized in consideration of all of the resizing factors.

The video decoder 230 resizes the received image by considering the resizing factors as described above. The variable length decoder 315, the IDCT unit 319 and the movement compensator unit 335 in the video decoder 230 can perform the resizing of the image. However, the variable length decoder 315, the IDCT unit 319 and the movement compensator unit 335 in the video decoder 230 may perform the resizing in consideration of different resizing factors.

The resizing control signals according to the resizing factors can be classified as shown in Tables 6 through 8 below.

From among the resizing control signals, the most important signal is the resizing control signal of the IDCT unit 319, by which the resizing control signals of the variable length decoder 315 and the movement compensator unit 335 can be determined.

Table 6 shows the resizing control signals of the IDCT unit 319, in which the description explains the resizing factors such as the display size, the image scan type and the decoding quality, by which the resizing size (control signal) of the IDCT unit 319 is determined.

TABLE 6

| Main Control (IDCT Size) | Description |
|---|---|
| 8 × 8 | SD (720 × 576) Output/No Resized Output |
| 8 × 4 | 360 × 288 Output/Only for Interacted |
| 8 × 2 | 360 × 288 Output/Only for Interacted, Low Quality |
| 4 × 4 | 360 × 288 Output |
| 4 × 2 | 360 × 288 Output/Low Quality |
|  | 180 × 144 Output/Only for Interacted |
| 4 × 2 (Modified) | 360 × 288 Output/Low Quality, Very High Speed |
|  | 180 × 144 Output/High Quality, High Speed |
| 2 × 2 | 180 × 144 Output |

Further, as shown in Tables 7A and 7B below, the resizing control signal of the variable length decoder 315 is determined by the size of the IDCT unit 319 of Table 6. Table 7A shows the zigzag type VLD resizing and its results, and Table 7B shows the zigzag type and alternate type VLD resizing, their results and comparison between their effects.

TABLE 7A

| Main Control | VLD Control | Description |
|---|---|---|
| 8 × 8 | 64 | 100% Load (Full size) |
| 8 × 4 | 50 | 78% |
| 8 × 2 | 37 | 57% |
| 4 × 4 | 25 | 39% |
| 4 × 2 | 12 | 18% |

TABLE 7A-continued

| Main Control | VLD Control | Description |
|---|---|---|
| 4 × 2 (Modified) | 10 | 15% |
| 2 × 2 | 5 | 8% |

TABLE 7B

| Main Control | Zigzag VLD Control | Alternate VLD Control | Description/Zigzag (Alternate) |
|---|---|---|---|
| 8 × 8 | 64 | 64 | 100% Load (Full size) |
| 8 × 4 | 50 | 34 | 78% (53%) |
| 8 × 2 | 37 | 15 | 57% (23%) |
| 4 × 4 | 25 | 26 | 39% (40%) |
| 4 × 2 | 12 | 10 | 18% (15%) |
| 4 × 2 (Modified) | 10 | 9 | 15% (14%) |
| 2 × 2 | 5 | 6 | 8% (9%) |

Further, the resizing control signal of the movement compensator unit 335 is determined by the display size, decoding quality, and decoding speed.

Table 8 below shows the resizing control signal of the movement compensator unit 335.

TABLE 8

| Display size | Quality/Speed | MC Control |
|---|---|---|
| 720 × 576 | — | Half-Pel |
| 360 × 288 | High/— | Quarter-Pel |
| 360 × 288 | Low/— | Half-Pel |
| 180 × 144 | High/— | Octa-Pel |
| 180 × 144 | Low/High | Quarter-Pel |
| 180 × 144 | Low/Low | Half-Pel |

Hereinafter, an operation of the video decoder 230 for resizing an image according to a preferred embodiment of the present invention will be described in detail.

First, a resizing operation using data skip by the variable length decoder 315 according to a preferred embodiment of the present invention will be discussed.

As described above, a standard screen of the DVB-T broadcast, which is a kind of digital broadcast, has a frame size of 720*576 pixels. Further, a screen of a portable terminal has a frame size of 176*208 pixels. Therefore, when a typical digital broadcast receiver processes the digital broadcast signal, it is impossible for the large display unit of the typical digital broadcast receiver to reproduce the signal with a clear screen quality. However, when a portable terminal displays an image from the digital broadcast signal, it is inefficient to decode the signal for the typical digital broadcast receiver intact and it is preferred for the portable terminal to reduce the size of the image by resizing the received broadcast signal before processing the signal. Further, it is efficient to perform the resizing before the signal is compressed.

Although only examples of $\frac{1}{2}^n$ ($\frac{1}{2}$, $\frac{1}{4}$, etc.) resizing are discussed in the following description, it goes without saying that resizing of $\frac{1}{8}$~$\frac{7}{8}$ is also possible in the case of 8*8 block.

Using $\frac{1}{2}^n$ resizing, it is possible to achieve a faster operation by applying a fast IDCT algorithm. Although only the $\frac{1}{2}^n$ resizing is described, all resizing from $\frac{1}{8}$ to $\frac{7}{8}$ is possible. The $\frac{1}{2}^n$ resizing is primarily employed because it is possible to apply a fast algorithm (Butterfly algorithm) to such a resizing. For example, when the horizontal and vertical sizes are reduced to $\frac{1}{2}$, respectively, it is possible to perform IDCT for only the 4*4 area, thereby producing the 4*4 spatial domain data, which is nearly equal to the average of the results obtained from the 8*8 IDCT.

Therefore, it is meaningless to perform additional operations in order to obtain other data than the 4*4 domain data. That is, it is sufficient to obtain the end position of the final block without the process of comparison and analysis of the table through the variable length decoding and to simply perform VLD and IDCT for only the actually decoded area. As a result, it is possible to reduce a large quantity of operation.

It is noted that only the zigzag scanning will be discussed hereinafter, because the alternate scanning has an effect similar to that of the zigzag scanning.

Figure 11A:
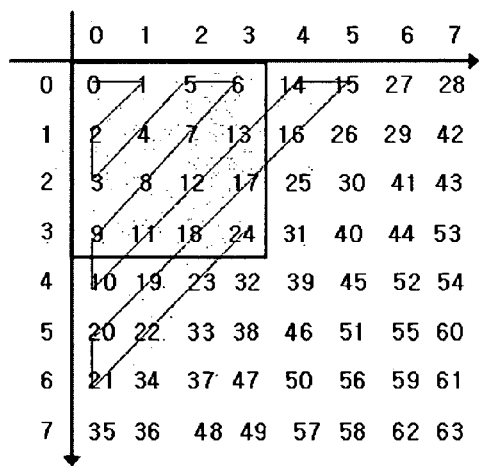
FIGS. 11A through 11D illustrate characteristics of 4*4, 8*2, 4*2, and 4*2 resizing.
Figure 11B:
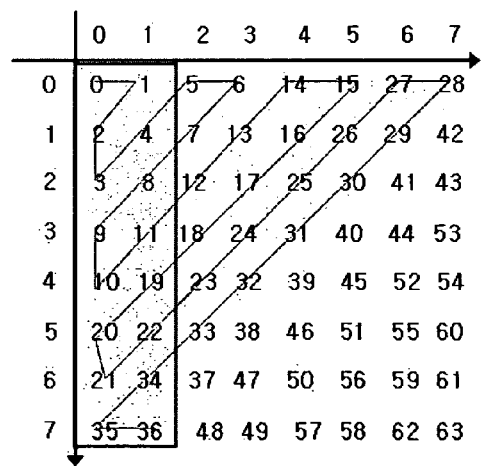

FIG. 11A illustrates a 4*4 scanning when the horizontal and vertical sizes are reduced by $\frac{1}{2}$, respectively. According to the 4*4 scanning as illustrated in FIG. 11A, it is sufficient to extract the indexes up to the 24$^{th}$ index in order to obtain the 4*4 area, which corresponds to reduction of operation to $\frac{25}{64}$. The 4*4 scanning can be applied to the progressive scanning as shown in FIG. 9A. However, when applying the scanning to the interlace scanning as illustrated in FIG. 9B or 9C, the data of the horizontal axis is sufficient but the data of the vertical axis is transferred to only $\frac{1}{2}$ of the entire time. Therefore, in order to obtain a result similar to that of the progressive scanning to 4*4 size, it is preferred to perform the 8*2 resizing as illustrated in FIG. 11B. Also, this method is resulted from the experience and finding that the lower right part shows a smaller quantity of data in a typical natural image and the result of the IDCT.

Figure 11C:
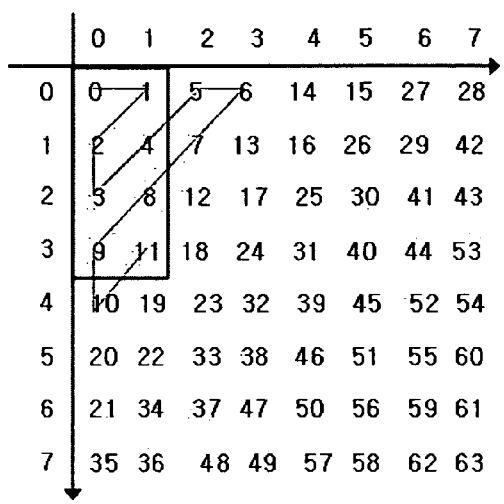

FIG. 11C illustrates a 4*2 resizing by the interlace scanning. Referring to FIG. 11C, the data at the lower right part is found at a lower frequency as described above in the $\frac{1}{4}$ horizontal-to-vertical resizing for the interlace scanning or the $\frac{1}{2}$ horizontal-to-vertical resizing for the progressive scanning, and it is necessary to supplement the vertical axis data in the interlace scanning. Therefore, in FIG. 11C, the data at the lower right part has a lower frequency and the 4*2 scan area supplements the data of the vertical axis in the interlace scanning. The scanning area illustrated in FIG. 11C corresponds to reduction of the operation quantity to $\frac{12}{64}$.

Figure 11D:
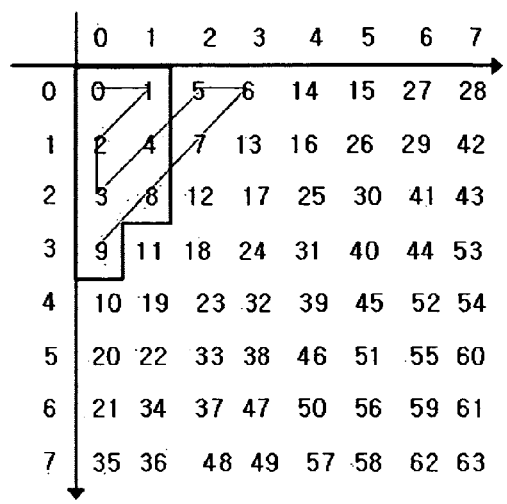

FIG. 11D illustrates a modified 4*2 scanning, which is an optimum method obtained through combination of the above characteristics, and corresponds to reduction of the operation quantity to $\frac{10}{64}$.

Next, a process of resizing by using a zonal filtering of the IDCT unit 319 according to a preferred embodiment of the present invention will be described.

Figure 12:
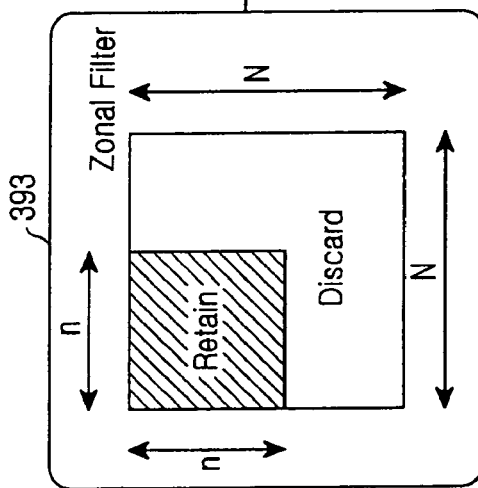
FIG. 12 illustrates a zonal filter of an IDCT unit.

FIG. 12 illustrates a zonal filter 393 of the IDCT unit 319. Referring to FIG. 12, as the variable length decoder 315 performs the variable length decoding by extracting the pixels in only a part of the entire pixel area, that is, by resizing, the IDCT unit 319 also performs IDCT for a selected part of the entire pixel area. In this case, a filter for selecting the partial area (selected area) is referred to as a zonal filter 393. When an n*n area is selected from an N*N area and is processed as illustrated in FIG. 12, which implies the resizing is done from N to n, the IDCT equation for each case can be expressed by Equations (4) through (6). More specifically, Equation (4) corresponds to 2-point IDCT equation, Equation (5) corresponds to 4-point IDCT equation, and Equation (6) corresponds to 8-point IDCT equation.

$$f(x) = \frac{1}{2}\sum_{u=0}^{1} C(u)F(u)\cos\frac{(8x+1)u\pi}{16} \quad (4)$$

-continued $$f(y) = \frac{1}{2}\sum_{v=0}^{3} C(v)F(v)\cos\frac{(4y+1)v\pi}{16} \quad (5)$$

$$f(y) = \frac{1}{2}\sum_{v=0}^{7} C(v)F(v)\cos\frac{(2y+1)v\pi}{16} \quad (6)$$

Equations (4) through (6) are different in that they repeatedly take the sigma two times, four times, and eight times, respectively. However, the actual speed of only the IDCT part becomes faster if the Butterfly Algorithm (fast algorithm) is applied.

Figure 13A:
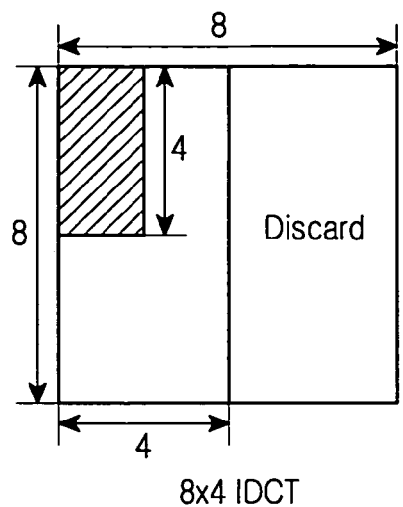
FIGS. 13A through 13C illustrate examples of a resizing area setup by the IDCT unit of FIG. 12.
Figure 13B:
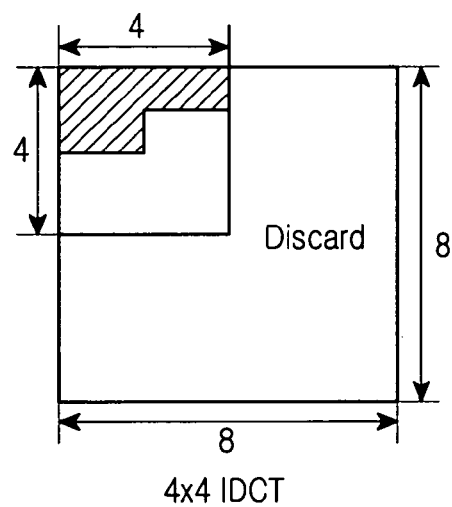
Figure 13C:
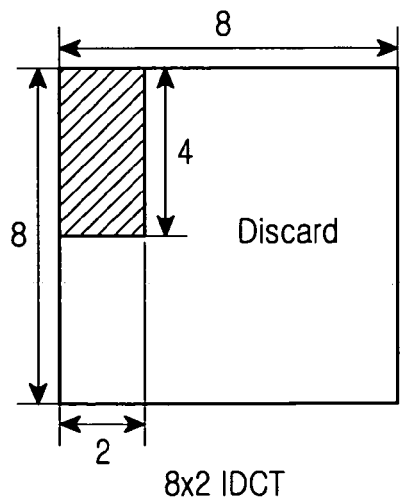

When the DCT is performed in the course of coding, the low frequency components including the DC value gathers in the upper left part. In using this characteristic, most values other than zero in the block exist in the left side. In consideration of this point, by performing operation for only the 8*2 part from among the selected 8*4 area based on an assumption that other coefficients have a value of zero, most of the operations including multiplication, addition, and shift used in the row processing is reduced to ½. Further, by performing operation of only the 4*2 part from among the selected 4*4 area, the operations in the row processing is reduced to ½ just as it is in the process for the 8*4 part. The selected area may have the same effect as the scan areas set up as shown in FIGS. 13A through 13C.

In this case, there is difference between the 8*2 IDCT and the selection of only the 8*2 part in performing the IDCT. That is, when selecting the 8*2 part, 2*1 1-D IDCT is performed eight times for the row processing, and 8*1 1-D IDCT is performed four times for the column processing. However, for 8*2 IDCT, 2*1 1-D IDCT is performed eight times for the row processing, and 8*1 1-D IDCT is performed two times for the column processing.

Table 9 below shows a result of a row IDCT in the 8*4 IDCT and 4*4 IDCT, and Table 10 below shows a result of a row IDCT of the selected area in the 8*4 IDCT and 4*4 IDCT.

TABLE 9 blk [0] = ((x0 + W1 * x1 + W2 * x2 + W3 * x3) >> 8);
blk [1] = ((x0 + W5 * x1 − W2 * x2 − W1 * x3) >> 8);
blk [2] = ((x0 − W7 * x1 − W6 * x2 + W5 * x3) >> 8);
blk [3] = ((x0 − W3 * x1 + W6 * x2 + W7 * x3) >> 8);

TABLE 10 blk [0] = ((x0 + W1 * x1) >> 8);
blk [1] = ((x0 + W5 * x1) >> 8);
blk [2] = ((x0 − W7 * x1) >> 8);
blk [3] = ((x0 − W3 * x1) >> 8);

Referring to Table 10, a row IDCT for the selected 8*4 or 4*4 area is processed and all the IDCT-processed values are then stored in the four blocks. Even when only the 8*2 area is selected, it is not true that the blk[2] or blk[3] is filled with zero. That is, although the part other than the selected area of the block is assumed to be zero in the course of the 8*4 or 4*4 god IDCT processing, all of the 8*4 block is subjected to IDCT in the column processing. When the horizontal component is reduced to ¼ as is in the 8*2 IDCT, too much data is lost in the horizontal direction, so that the converted image shows too large of a difference from the original image even after being interpolated for the displaying. However, by applying this method, it is possible to obtain a gain in the quantity of operation while minimizing the loss in the quality.

The above-described process shows a resizing effect of the IDCT in the video decoder for decoding an image signal using the MPEG coding scheme. However, this method can have a similar effect even when decoding an image signal by using Integer Transform (IT) such as H.264. In the latter case, the video decoder can perform the resizing by using an Inverse Integer Transformer (IIT), the resizing method of which will be described later.

Hereinafter, an operation for resizing by using minimum movement compensation in the movement compensator unit 335 according to a preferred embodiment of the present invention will be described.

Figure 14A:
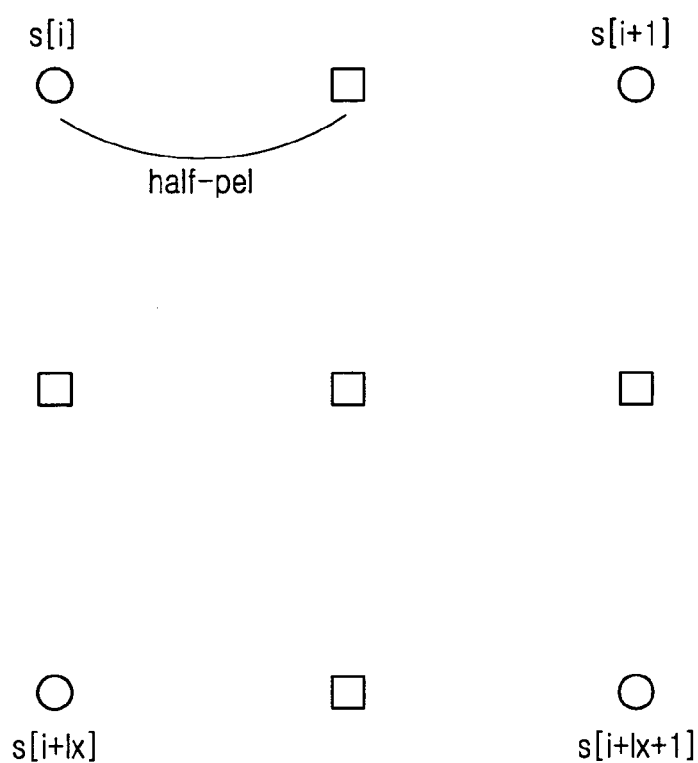
FIGS. 14A through 14D illustrate characteristics of half-pel, quarter-pel, and octa-pel movement compensation by a movement compensator unit.
Figure 14B:
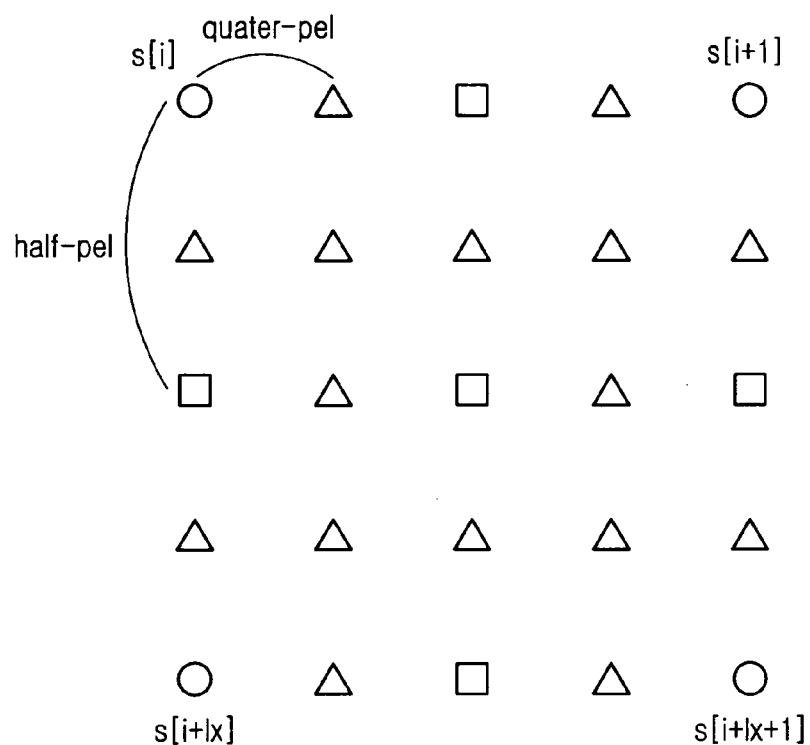

The video compression standard of the MPEG2 defines that the correlation in the movement compensation can be improved through interpolation applying the half-pel resolution. That is, the movement information transmitted through a channel has a half-pel resolution as illustrated in FIG. 14A. When a zonal filter selects an 8*4 or 4*4 area from among the 8*8 block, a decoder according to the present invention, which can output an image reduced to ½ either only horizontally or both horizontally and vertically in accordance with the selection by the zonal filter, can considerably reduce the error in the movement compensation through interpolation to the quarter-pel resolution as illustrated in FIG. 14B from the movement information of the transmitted half-pel resolution.

Figure 14C:
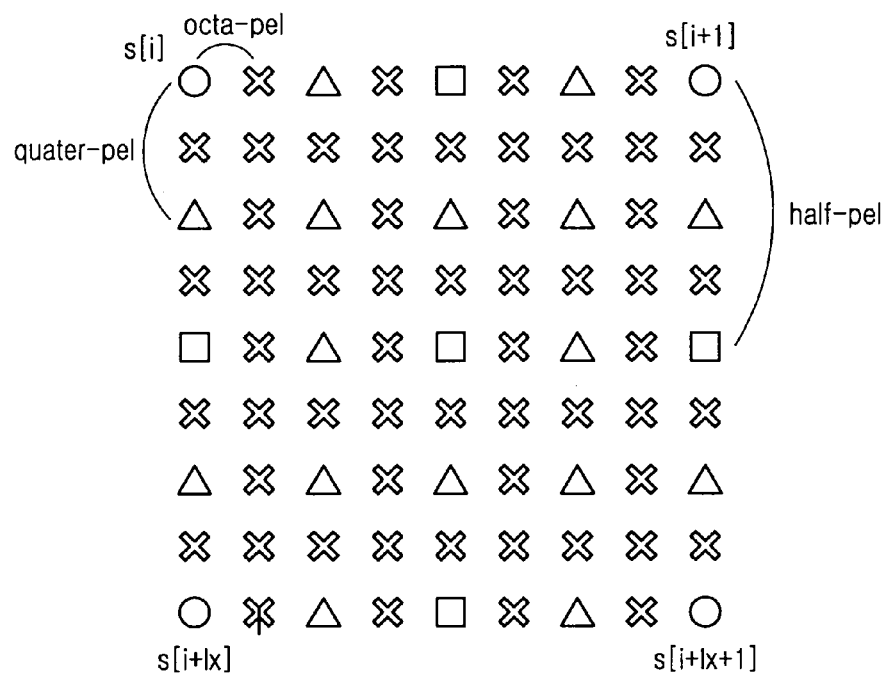

Further, when the zonal filter selects an 8*2 area from among the 8*8 block, a decoder according to the present invention, which can output an image horizontally reduced to ¼ in accordance with the selection by the zonal filter, can considerably reduce the error in the movement compensation through interpolation to the octa-pel resolution as illustrated in FIG. 14C from the movement information of the transmitted half-pel resolution. That is, when the image is reduced to ½, the lowermost two bits of the transmitted six bit movement information can be interpolated to the quarter-pel resolution. When the image is reduced to ¼, the lowermost three bits of the transmitted six bit movement information can be interpolated to the octa-pel resolution.

Figure 14D:
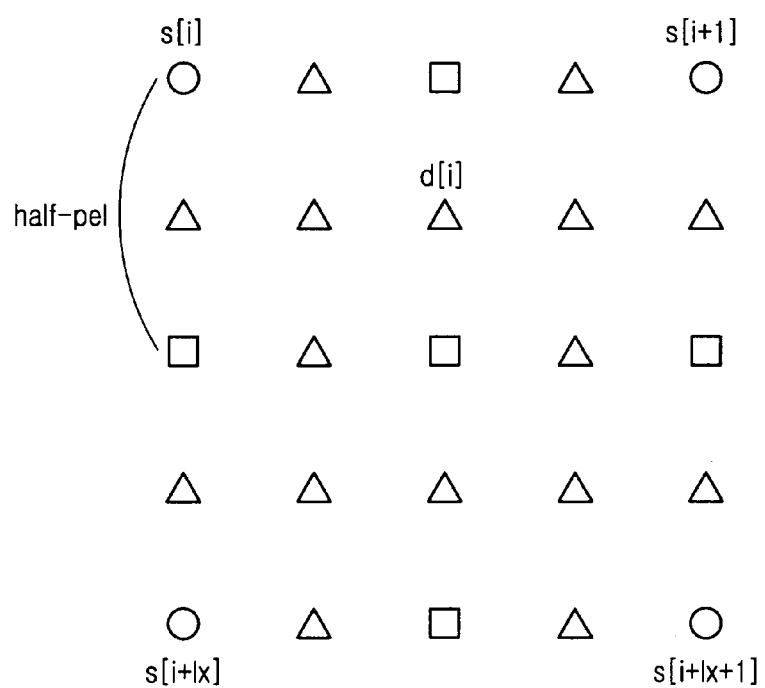

FIG. 14D illustrates an example of an interpolation for movement compensation to the quarter-pel resolution. If the half-pel bits are Xh and Yh and the quarter-pel bits are Xq and Yq, the locations from the left uppermost integer pixel are: Xdist=0.5*Xh+0.25*Xq; and Ydist=0.5*Yh+0.25 Yq. When the movement compensation is performed at the quarter-pel resolution level, the pixel d[I] located at the quarter-pel position is spaced Xdist and Ydist from the left uppermost integer pixel. Therefore, the weights are 1-Xdist and 1-Ydist, respectively. Therefore, the bi-linear interpolation d[i] can be defined by Table 11 below.

TABLE 11 d[i] = xweight * (yweight * s[i] + ydist * s[i + 1x]) +
xdist * (yweight * s[i + 1] + ydist * s[i + 1x + 1])

According to a preferred embodiment of the present invention, the video decoder 230 resizes and decodes the coded image by using the resizing factors as shown in Table 5. From among the resizing factors shown in Table 5, the display size (SD: full size; CIF: half size; and QCIF: quarter size) and the display quality (decoding quality) can be set up by a user, the scan type (image scan or block scan) can be determined according to the received digital broadcast signal, and the decoding speed can be determined by the communication environment of the portable terminal. Therefore, when a digital broadcast receiver having the construction as illustrated in FIG. 1 receives a signal and displays an image of the signal on the display unit 150, the user selects a display size and display quality for the image to be displayed. In this case, the display size may be one of the full size (SD: 720*526 pixels), half size (CIF: 360*288 pixels) and quarter size (QCIF: 180*244 pixels) as described above, and the decoding quality may be a high quality or a normal quality.

Further, the video decoder 230 analyzes the scan type from the header of the received video ES, thereby determining the resizing factors. The scan type may be the progressive scanning or the interlace scanning for the image scanning (screen display type) and may be the zigzag scanning or the alternate scanning for the block scanning. The present embodiment discusses only the zigzag scanning for the block scanning.

Further, the control unit 100 determines the decoding quality based on the communication environment, e.g., the speed at which the digital broadcast signal is received. That is, when the portable terminal is in a good environment for digital broadcast reception, the portable terminal has a high communication quality, and the video decoder 230 can decode the signal with a high decoding quality. However, when the portable terminal is in a bad environment for digital broadcast reception, the decoding quality of the received signal is degraded.

In regard to the resizing size of the video decoder 230 as described above, the coded image can be resized based on only one or more resizing factors from among the resizing factors shown in Table 5. That is, the resizing can be performed based on only the display size from among the resizing factors. In this case, the resizing by the video decoder 230 may be performed to a size of 8*8, 4*4, or 2*2.

Further, when the resizing is performed based on only the display size and the image scan from among the resizing factors, the resized size may be one of 8*8, 4*4, and 2*2 for the progressive scanning and may be one of 8*4, 4*2, and 4*2 (modified) for the interlace scanning. That is, the video decoder 230 may perform the resizing based on at least one of the resizing factors shown in Table 5.

The following description about the embodiments of the present invention is based on an assumption that the video decoder 230 performs the resizing based on all of the resizing factors shown in Table 5.

Figure 15A:
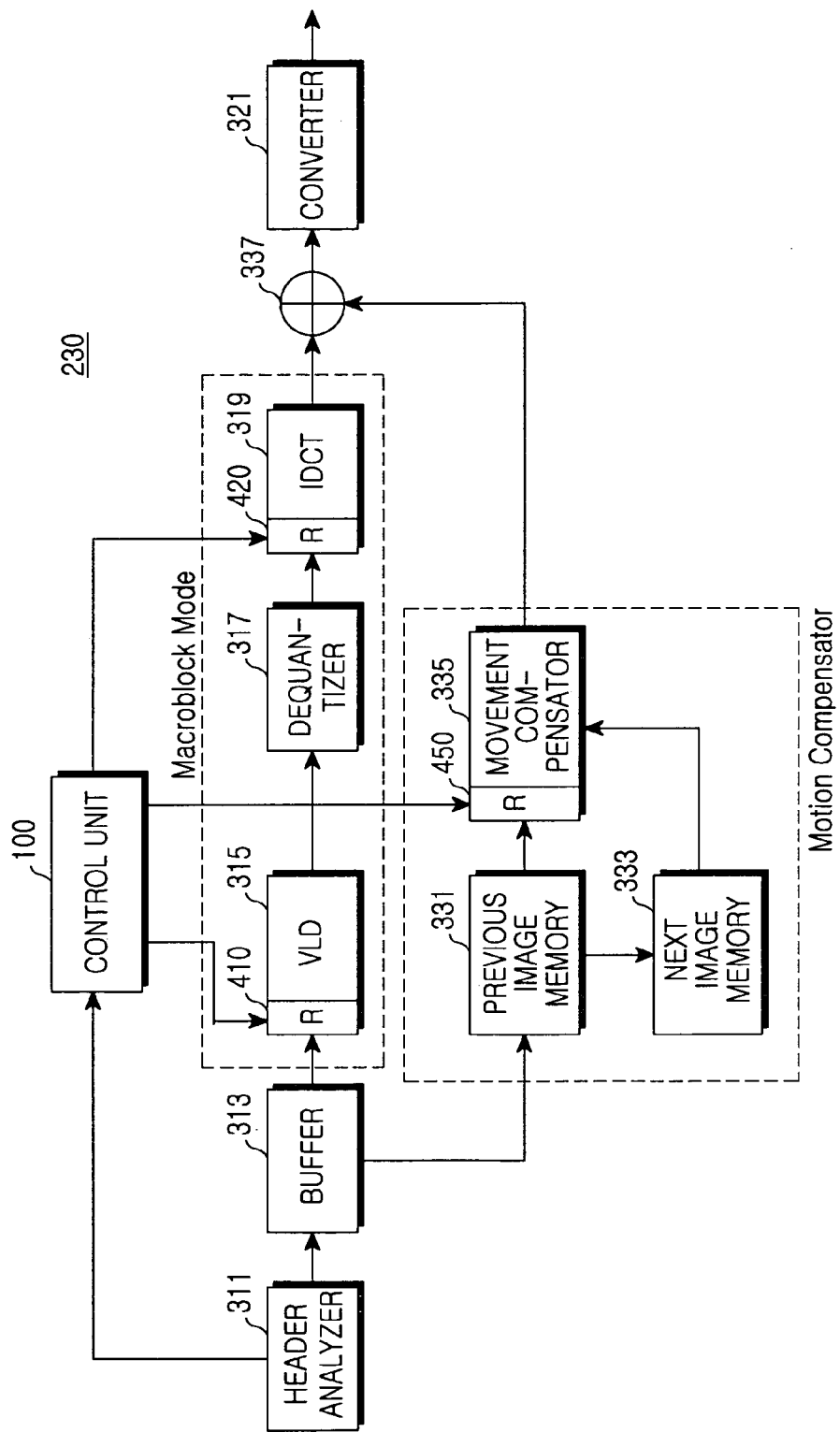
FIGS. 15A and 15B are block diagrams illustrating video decoders for resizing and decoding a coded image according to embodiments of the present invention.
Figure 15B:
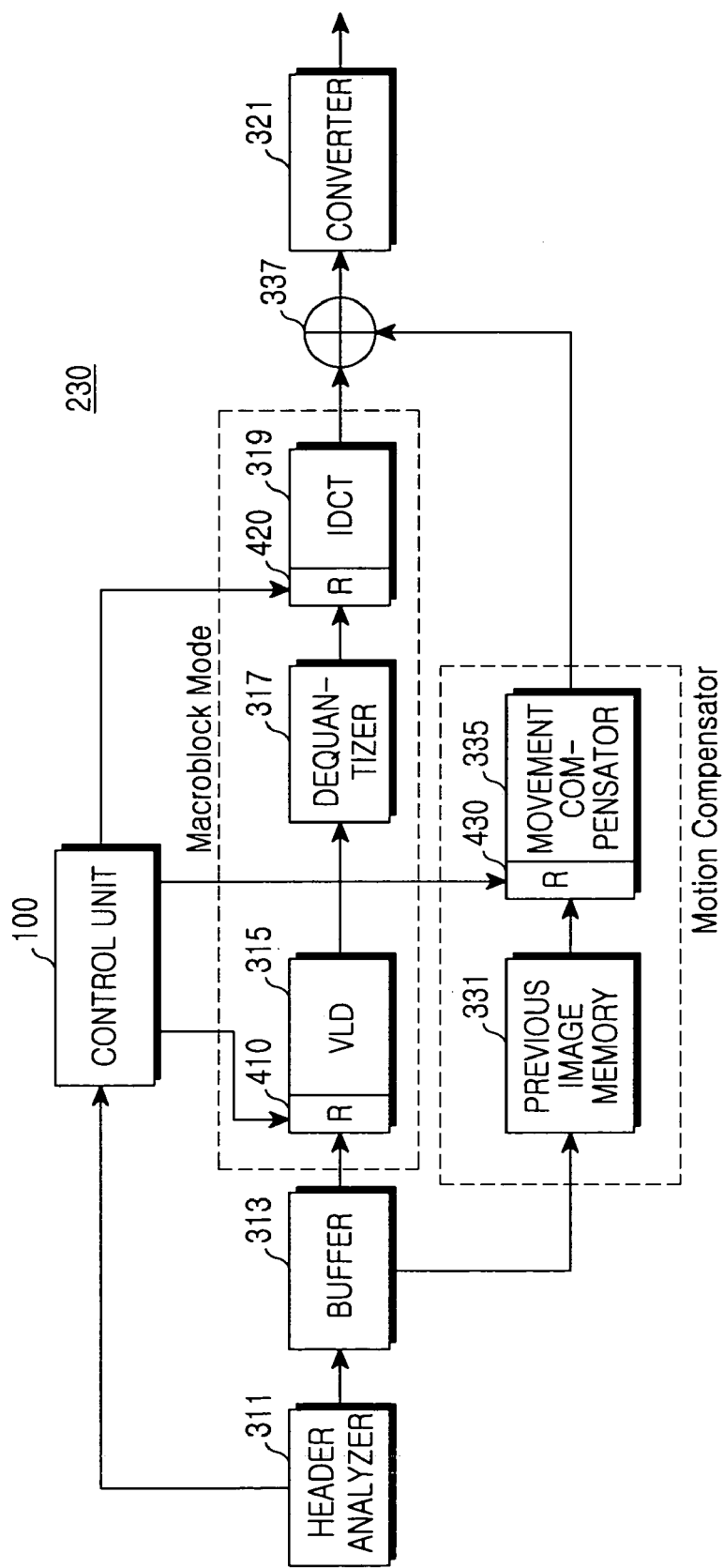

FIGS. 15A and 15B are block diagrams illustrating video decoders 230 for resizing and decoding a coded image according to embodiments of the present invention. In FIGS. 15A and 15B, the letter 'R' marked on each of the variable length decoder 315, the IDCT unit 319, and the movement compensator unit 335 implies a resizer of each corresponding element, which plays a corresponding part in the resizing. The video decoder 230 illustrated in FIG. 15A has a construction capable of decoding images including I, B, and P frames, and the video decoder 230 illustrated in FIG. 15B has a construction capable of decoding images including I and B frames.

Figure 16:
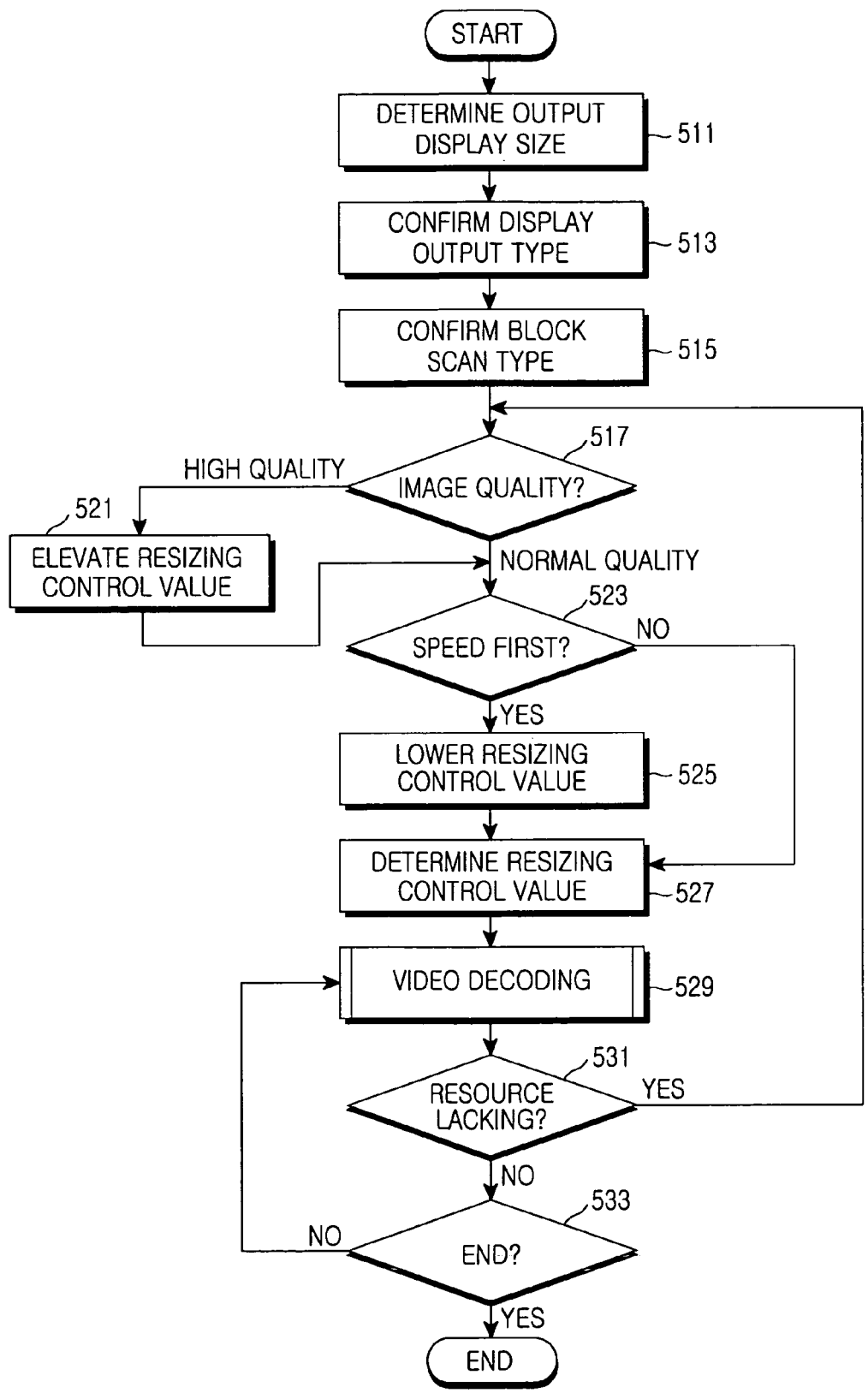
FIG. 16 is a flowchart of a process for determining resizing factors in order to control the resizing of the video decoder.

FIG. 16 is a flowchart of a process for determining resizing factors in order to control resizing of the video decoder 230. In the process illustrated in FIG. 16, the control unit 100 analyzes the resizing factors and controls the image resizing of the video decoder 230 based on the analysis.

Referring to FIG. 16, when a broadcast reception mode has been set up, the control unit 100 analyzes the resizing factors and controls the video decoder 230. The resizing factors may be any combination of the five factors shown in Table 5.

In step 511, the control unit 110 determines the display size based on the size of the display screen. The size of the display screen may be determined either manually by a user input or automatically according to the size of the display unit 150 by the control unit 100. The display unit 150 may have different sizes depending on the type of portable terminal. More specifically, European portable terminals usually have a display unit with a size of 176*208, and Korean portable terminals usually have a display unit with a size of 176*200. The following description about the embodiments of the present invention is based on an assumption that the control unit 100 automatically determines the size of the display screen based on the size of the display unit 150 of the portable terminal.

The control unit 100 checks the display type (image scan type). The information of the image scan type is inserted in the header of the video image. Therefore, the header analyzer 311 of the video decoder 230 extracts the image scan information from the header of the received image and transmits it to the control unit 100. Then, the control unit 100 can confirm the image scan type of the currently received image signal in step 513. The image scan type may be the progressive scanning as illustrated in FIG. 9A or the interlace scanning as illustrated in FIGS. 9B and 9C.

The control unit 100 checks the block scan type. The information of the block scan type is inserted in the header of the video image. Therefore, the header analyzer 311 of the video decoder 230 extracts the block scan information from the header of the received image and transmits it to the control unit 100. In step 515, the control unit 100 can confirm the block scan type of the currently received image signal. The block scan type may be the zigzag scanning as illustrated in FIG. 10A or the alternate scanning as illustrated in FIG. 10B.

Also, the decoding quality of the video decoder 230 may be selected by the user. The decoding quality may have an influence on the resolution of the screen. Although the decoding quality may have various levels, the following description is based on an assumption that the decoding quality has only two levels, i.e. the high quality or the normal quality. Therefore, when the decoding quality has been determined, the control unit 100 confirms the selected decoding quality in step 517 and elevates the resizing control value in step 521, when the selected decoding quality is the high quality. When the selected decoding quality is the normal quality, the control unit 100 proceeds to step 523 without changing the resizing control value.

Further, the control unit 100 determines the decoding speed by analyzing the environments of the portable terminal. When it is necessary to consider the speed to be most important in the decoding in step 523, the control unit 100 proceeds to step 525 in which the control unit 100 reduces the resizing control value. However, when it is unnecessary to consider the speed to be most important in the decoding in step 523, the control unit 100 does not change the resizing control value. When the speed is considered to be most important in the decoding, it is possible to decode a large number of data frames.

In step 527, the control unit 100 determines the resizing control value based on the resizing factors and transmits the determined resizing control value to the resizers 410, 420, and 450 of the variable length decoder 315, the IDCT unit 319, and the movement compensator unit 335, respectively.

In step 529, the control unit 100 controls the video decoder 230 to decode the video signal of the received digital broadcast. The video decoder 230 decodes and outputs the video signal of the received digital broadcast on the display unit 150 according to the resizing control.

In step 531, the control unit 100 determines if it lacks resources for decoding the video signal of the currently received digital broadcast. The resources have influence on the decoding speed of the video decoder 230. That is, when the resources (operation capability) are lacking because the portable terminal is performing another application while performing the digital broadcast service, or because the decoding information is insufficient in the digital broadcast reception environment, e.g. broadcast reception capability is degraded due to degradation of the communication environment for the portable terminal, the decoding speed is degraded. Therefore, the control unit 100 checks the current status of the portable terminal, thereby determining if the resources are lacking in step 531. When the resources or the decoding information is lacking, the control unit 100 reduces the resizing control value in step 525.

When the resources and decoding information is sufficient, the control unit 100 maintains the current resizing control value while controlling the decoder to keep on decoding, until the end is determined in step 533.

According to the above-described process for the resizing control based on the resizing factors, the display size is first determined by the user selection or according to the size of the display unit 150, the image scan type and the block scan type are determined according to the stream type of the received digital broadcast signal, and the decoding quality is determined by the user in consideration of quality factors. Further, when the control unit determines that it is necessary to consider the decoding speed to be most important, the control unit may reduce the resizing control value in order to increase the decoding speed.

The control unit 100 determines the resizing control value by analyzing the resizing control values as described above. Tables 7A, 7B, 6, and 8 show the resizing control values of the variable length decoder 315, the IDCT unit 319 and the movement compensator unit 335, respectively.

According to an example of a process for determining the resizing control value of the IDCT unit 319 with reference to Table 6, when the display size is CIF, the image scanning type is progressive scanning, the decoding speed is the normal speed, and the decoding quality is high quality, the control unit 100 determines the resizing control value to be 4*4 as shown in Table 6. Further, when the display size is CIF, the image scanning type is the interlace scanning, the decoding speed is normal, and the decoding quality is high, the control unit 100 determines the resizing control value to be 8*4 as shown in Table 6.

The resizing values of the IDCT unit 319 as described above are applied in the same way to the variable length decoder 315. The resizing control value of the movement compensator unit 335 is determined by the display size, the decoding quality and the decoding speed. That is, when the display size is QCIF and the decoding quality is high, the control unit 100 outputs a quarter-pel control signal as the resizing control value of the movement compensator unit 335. When the display size is QCIF, the decoding quality is normal, and the decoding speed is normal, the control unit 100 outputs a half-pel control signal as the resizing control value of the movement compensator unit 335.

FIGS. 15A and 15B are block diagrams illustrating structures of video decoders 230 for resizing and decoding a coded image according to embodiments of the present invention. As described above, the video decoder 230 illustrated in FIG. 15A has a construction capable of decoding images including I, B, and P frames, and the video decoder 230 illustrated in FIG. 15B has a construction capable of decoding images including I and B frames.

Referring to FIG. 15A, the header analyzer 311 extracts and analyzes the header information of the received image signal and transfers the information to the control unit 100. The control unit 100 determines the resizing control values by performing the process as illustrated in FIG. 16 and then applies these values to the resizers 410, 420, and 450 of the variable length decoder 315, the IDCT unit 319 and the movement compensator unit 335, respectively.

Figure 17:
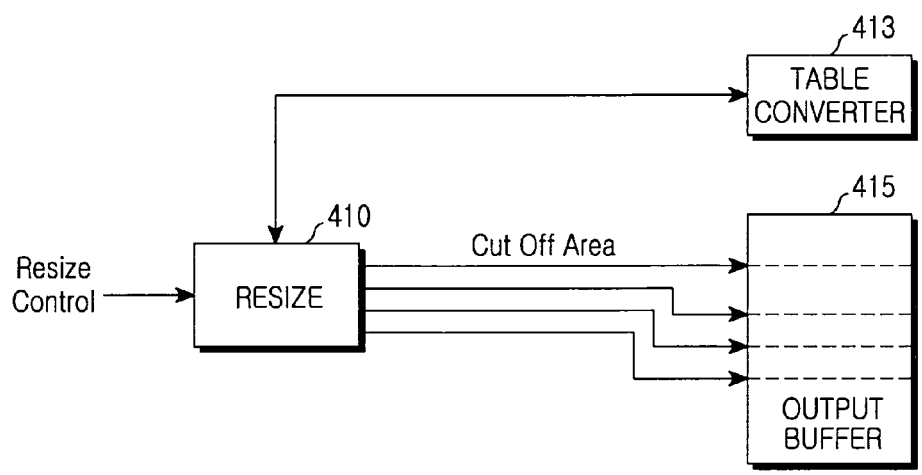
FIG. 17 is a block diagram illustrating a variable length decoder.

FIG. 17 is a block diagram illustrating the variable length decoder 315. Referring to FIG. 17, the VLD resizer 410 receives the resizing control value from the control unit 100, controls the operation of the table converter 413 based on the resizing control value, and outputs the output of the table converter 413 to the output buffer 415. The table converter 413 includes a table for variable length decoding, receives the image data output from the buffer 313, converts the image input data coded with a variable length into the original data, and then outputs the converted data. The operation of the table converter 413 is controlled by the resizer 410. Under the control of the resizer 410, the output buffer 415 buffers and outputs the original data decoded by the table converter 413.

Referring to FIG. 17, the decoding operation of the variable length decoder 230 is controlled based on the resizing control values output from the control unit 100. The resizing control values may be the values as shown in Tables 7A and 7B, which include information about the block scan type. For example, when the resizing control value indicates a 4*4 zigzag scan type, the resizer 410 controls the table converter 413 to decode the variable length coded data up to the $24^{th}$ pixel data, and controls the output buffer 415 to store the $0^{th}$, $1^{st}$, $2^{nd}$, $3^{rd}$, $4^{th}$, $5^{th}$, $6^{th}$, $7^{th}$, $8^{th}$, $9^{th}$, $11^{th}$, $12^{th}$, $13^{th}$, $17^{th}$, $18^{th}$, and $24^{th}$ 16 pixel data. Further, when the resizing control value indicates a 4*4 alternate scan type, the resizer 410 controls the table converter 413 to decode the variable length coded data up to the $25^{th}$ pixel data, and controls the output buffer 415 to store the $0^{th}$, $1^{st}$, $2^{nd}$, $3^{rd}$, $4^{th}$, $5^{th}$, $6^{th}$, $7^{th}$, $8^{th}$, $9^{th}$, $18^{th}$, $19^{th}$, $10^{th}$, $21^{st}$, $24^{th}$, and $25^{th}$ 16 pixel data.

When the resizing control value indicates a 4*2 zigzag scan type, the resizer 410 controls the table converter 413 to decode the variable length coded data up to the $11^{th}$ pixel data and controls the output buffer 415 to store the $0^{th}$, $1^{st}$, $2^{nd}$, $3^{rd}$, $4^{th}$, $8^{th}$, $9^{th}$, and $11^{th}$ 8 pixel data. Further, when the resizing control value indicates a 4*2 alternate scan type, the resizer 410 controls the table converter 413 to decode the variable length coded data up to the $9^{th}$ pixel data, and controls the output buffer 415 to store the $0^{th}$, $1^{st}$, $2^{nd}$, $3^{rd}$, $4^{th}$, $5^{th}$, $8^{th}$, and $9^{th}$ 8 pixel data.

As described above, it is sufficient for the variable length decoder 315 to perform the variable length decoding only in a predetermined area set up by the resizing control value and confirm the result. Therefore, while the variable length decoder initially performs the VLD and output the result of the VLD to the output buffer 415, when the result goes beyond the range limited by the resizing control values, the variable length decoder 315 bypasses the input stream and ends the variable length decoding. Because the bypassed data is not used in the decoding, no problem occurs even when the data is not provided with a proper variable length decoding value. When the resizing control value has been set up, the variable length decoder 230 performs the decoding up to the last pixel data of the setup resizing control value. The last pixel data of the corresponding resizing control value is different according to the scan type (the zigzag scanning or the alternate scanning). As noted from Table 7B, the resizing largely reduces the quantity of decoding calculation of the variable length decoder 230.

Figure 18:
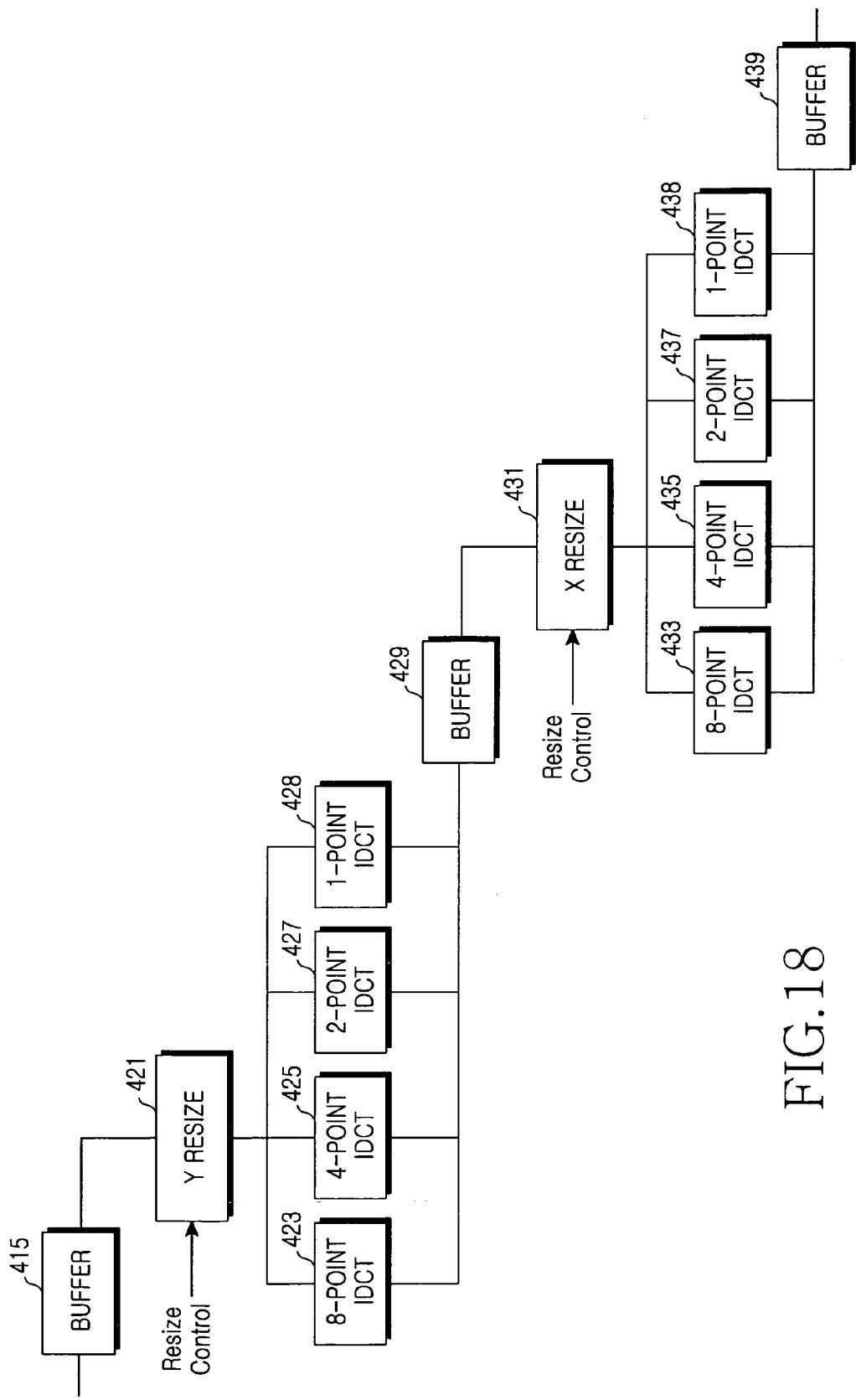
FIG. 18 is a block diagram illustrating an IDCT unit of a video decoder.

FIG. 18 is a block diagram illustrating the IDCT unit 319 of the video decoder 230. Referring to FIG. 18, the buffer 421 may be the output buffer 415 of the variable length decoder 315. The IDCT unit 319 performs DCT for the Y axis pixels and then performs DCT for the X axis pixels. Therefore, the IDCT unit 319 includes a Y axis resizer (Y resizer) 421 and an X axis resizer (X resizer) 431, each of which has a scan area determined by the zonal filter. First, the Y resizer 421 confirms the Y axis resizing control value from the resizing control values, and then transfers the data output from the buffer 415 to a corresponding IDCT from among the IDCTs 423 through 427. The corresponding IDCT unit performs IDCT for the data output from the buffer 415 and then stores the data in the buffer 429. Then, the second X resizer 531 confirms the X axis resizing control value from the resizing control values and then transfers the data output from the buffer 429 to a corresponding IDCT unit from among the IDCTs 433 through 438. Then, the corresponding IDCT unit performs IDCT for the data output from the buffer 429 and then stores the data in the buffer 439. By performing IDCT for the X axis data, the results of the Y axis and X axis IDCT are stored in the buffer 429.

FIG. 18 illustrates when an IDCT unit selected by a Y axis resizing control value first performs an IDCT operation, and an IDCT unit selected by an X axis resizing control value then performs an IDCT operation. However, the same effect can be expected in the case in which an IDCT unit selected by an X axis resizing control value first performs an IDCT operation, and an IDCT unit selected by a Y axis resizing control value then performs an IDCT operation.

The resizing control value of the IDCT unit 319 is determined, as shown in Table 6 described above. Therefore, when the IDCT resizing control value is 8*4, the Y resizer 421 transfers the data stored in the buffer 415 to the 8-point IDCT unit 423, and the 8-point IDCT unit 423 performs IDCT on the 8-point Y axis pixel data transferred from the 8-point IDCT unit 423 and then stores the processed data in the buffer 429.

Further, the X resizer 431 transfers the data stored in the buffer 429 to the 4-point IDCT unit 435, and the 4-point IDCT unit 435 performs IDCT on the 4-point X axis pixel data (the data having been subjected to the Y axis IDCT) output from the buffer 432 and then stores the processed data in the buffer 439. In the same manner, when the IDCT resizing control value is 4*2, the Y resizer 421 transfers data to the 4-point IDCT unit 425 and the X resizer 441 transfers data to the 3-point IDCT unit 437.

The IDCT unit as described above performs Y axis and X axis operations according to the resizing control values such as 8*8, 8*4, 8*2, 4*4, 4*2, 2*2, 4*1, 2*1, and 1*1. In this case, because the 8-point, 4-point, and 2-point IDCT equations are the same, the Y resizer 421 and the X resizer 431 serve to transfer the IDCT coefficient according to the resizing control values. In this case, as illustrated in FIG. 12, the IDCT unit 319 extracts only a partial area determined by the resizing control value and performs the Y axis and X axis IDCT on the extracted area without performing the IDCT on the other area by using a zonal filter. Therefore, in the resizing of the IDCT unit 319, a Y axis IDCT is first performed and an X axis IDCT is then performed for the area set up by the resizing control values without performing the IDCT on the pixels of the other area, as shown in FIGS. 13A through 13C.

Table 6 shows the IDCT resizing control values and their effects.

Figure 19:
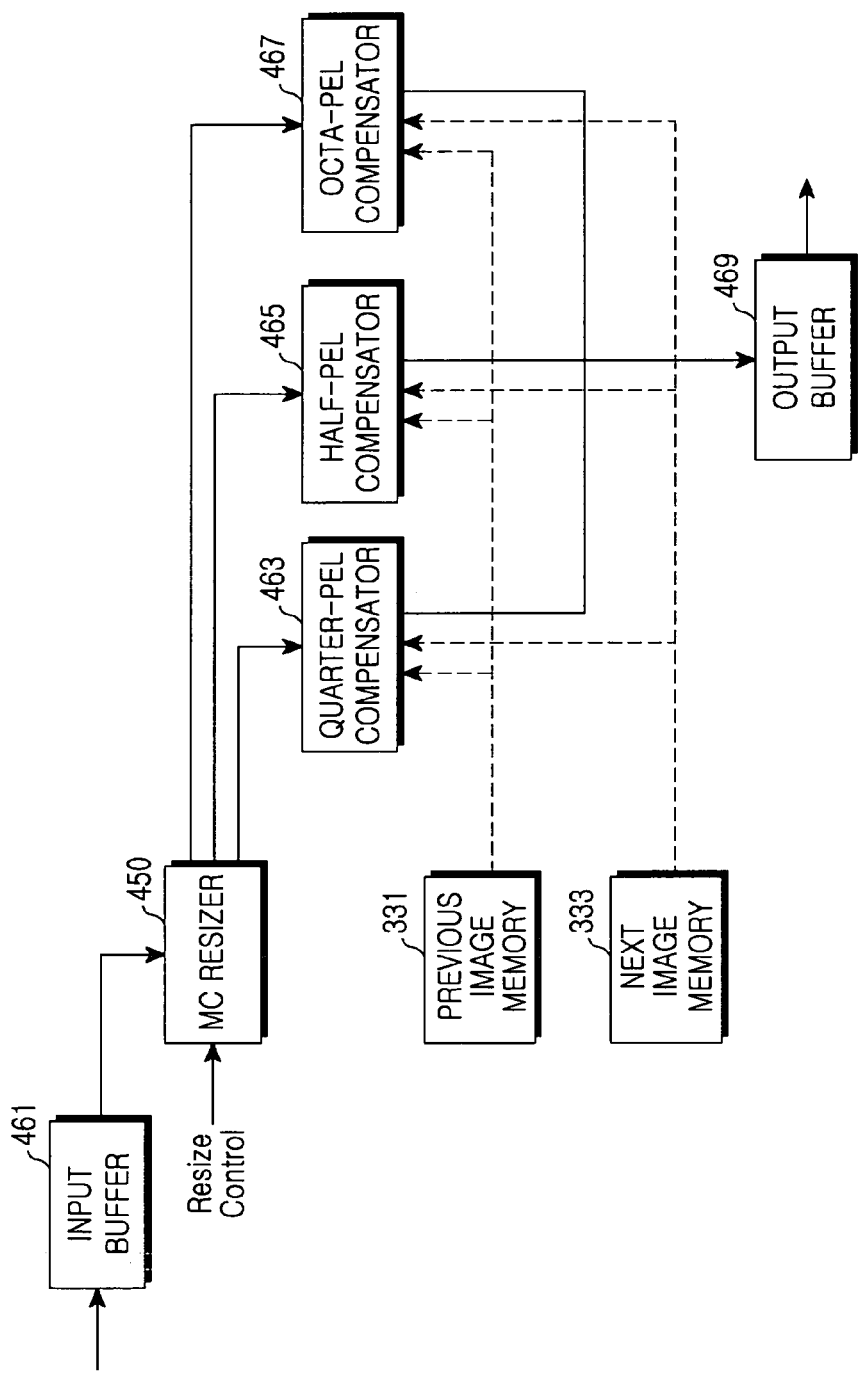
FIG. 19 is a block diagram illustrating a movement compensator unit of a video decoder.

FIG. 19 is a block diagram illustrating the movement compensator unit 335 of the video decoder 230. Referring to FIG. 19, the input buffer 461 receives and buffers the movement vector of the received video data. The MC resizer 450 selects a corresponding movement compensator based on the resizing control signal, and transfers the movement vector of the input buffer 461. The movement compensators may include a quarter-pel compensator 463, a half-pel compensator 465, and an octa-pel compensator 467. The movement compensators compensate for the movement by using the movement vector of the current frame selected and input by the resizer 450 and the movement vector of the previous or next frame. The output buffer 469 buffers and outputs the movement-compensated output of the quarter-pel compensator 463, half-pel compensator 465, and octa-pel compensator 467.

In the operation of the movement compensator unit 335, the resizing control of the movement compensator unit 335 is determined by the display size, decoding quality, and decoding speed as shown in Table 8.

When the movement compensator is fixed to the half-pel compensator in the movement compensator unit 335, the movement compensation may have an influence on the decoding quality. For example, if the movement compensation is performed to the 1.5 pixel position in a 8*8 screen, the movement compensation must be performed to the 0.75 pixel position in a 4*4 or 8*4 screen. When the movement compensation is performed in the 4*4 or 8*4 screen in the half-pel scheme, the movement is compensated by the 0.5 pixel position, such that the decoding efficiency can be degraded. Therefore, it possible to improve the efficiency in the movement compensation by using the quarter-pel scheme for X axis movement compensation of the 8*4 screen, Y axis and X axis movement compensation of the 4*4 screen, and Y axis movement compensation of the 4*2 screen. Accordingly, in the 4*4, 8*4, and 4*2 screens, it is preferred to use the half-pel scheme when the decoding speed is most important, and it is preferred to use the quarter-pel or octa-pel scheme when the decoding quality is most important.

Further, in the 4*2, 8*2, and 2*2 screens, it is preferred to use the half-pel or quarter-pel scheme when the decoding speed is most important, and it is preferred to use the octa-pel scheme when the decoding quality is most important. Further, even a video decoder basically using the quarter-pel scheme, such as the H.264, can use the octa-pel scheme when it resizes an image having a size such as 8*4, 4*4, and 4*2 to a ½ size.

The video decoder 230 may be implemented by software. Step 529 in FIG. 16 may be replaced by a process as illustrated in FIG. 20, which is a flowchart of a process for video decoding according to a preferred embodiment of the present invention.

Figure 20:
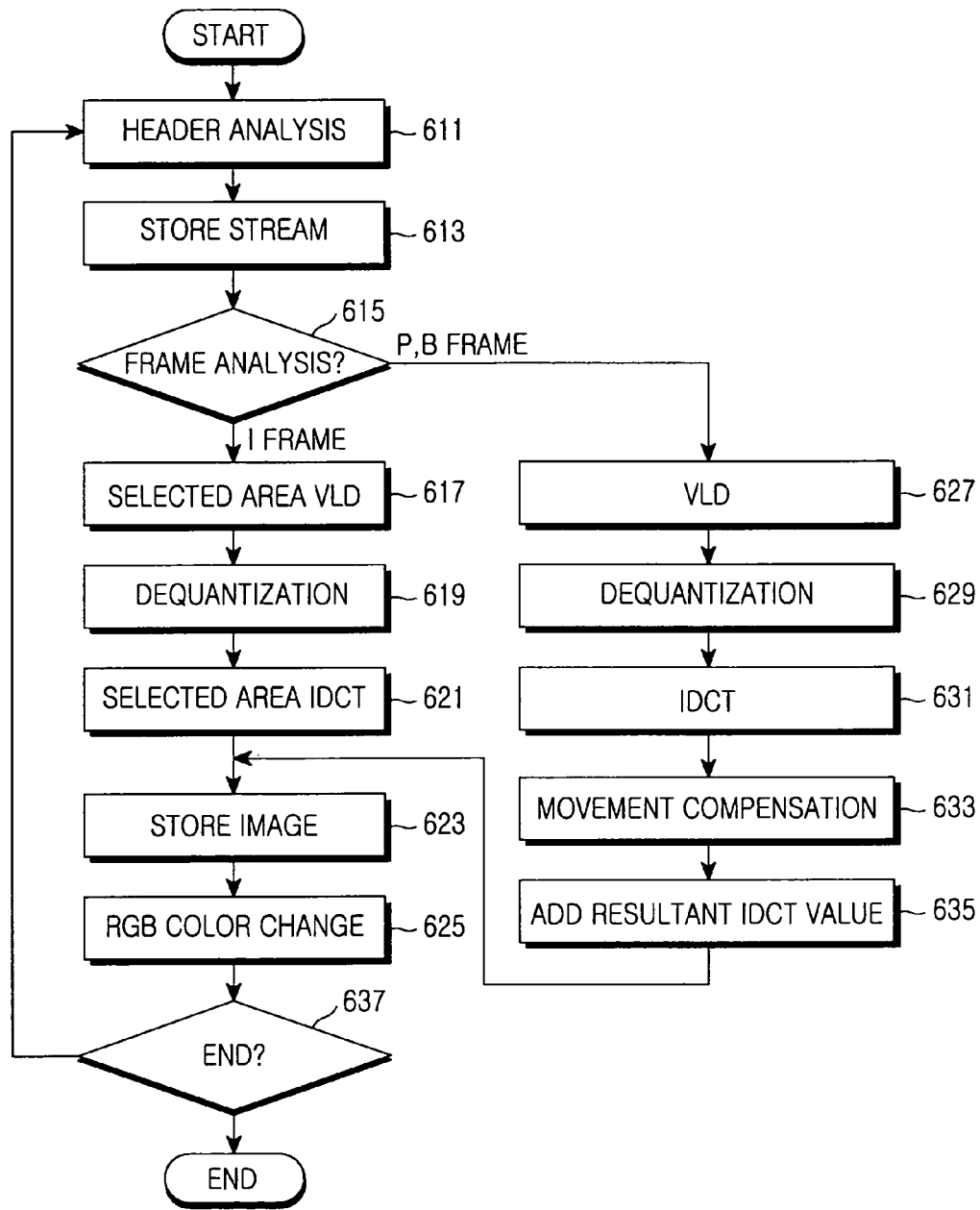
FIG. 20 is a flowchart of a process for video decoding according to a preferred embodiment of the present invention.

Referring to FIG. 20, the control unit 100 determines the resizing control values of the variable length decoder 315, the IDCT unit 319 and the movement compensator 335 while performing the process as shown in FIG. 16. When a coded video data has been received, the control unit 100 analyzes the header of the received video stream in step 611, stores the received video data in the buffer in step 613, and then analyzes the frame in step 615.

When the frame image is the I frame image, the control unit 100 resizes the decoding area of the received video data based on the determined VLD resizing control value and decodes the Variable Length coded (VL-coded) pixel data in the resizing area into the original data by referring to the VLD table in step 617. Then, the control unit 100 dequantizes the VL decoded video data, thereby extracting the DC coefficient in step 619.

After performing the dequantization, the control unit 100 resizes the dequantized video data according to the determined IDCT resizing control value and performs IDCT on the resized Y axis and X axis video data in step 621. In the resizing of the IDCT unit 319, the resizing areas of the Y axis and X axis may be either the same or different from each other. Therefore, the IDCT is performed by using an IDCT with points the number of which corresponds to the number of the resized Y axis and X axis pixels.

After performing the IDCT, the control unit 100 stores the result of the IDCT in step 623.

The operation of steps 617 through 623 is performed for each block (8*8) as shown in (f) of FIG. 8. Therefore, the variable length decoding, dequantization and IDCT are performed for each block of image data, and each block of decoded data is stored in step 623. The control unit 100 repeats the decoding as described above until decoding of one frame of video data is completed in step 637.

The control unit detects such completion of decoding for one frame of video data in step 623 and then converts the one frame of decoded video data into an RGB data in step 625. That is, because the input data is YUV data, the control unit 100 converts the input data into the RGB data, which can be displayed on the display unit 150. If the received video data is an RGB data, step 625 can be omitted.

However, in step 615, when the frame image is the P or B frame image, the control unit 100 performs the variable length decoding, dequantization, and IDCT in the same manner as in steps 617 through 621, in step 627 through 631. Then, the control unit 100 compensates for the movement of the currently received frame data in step 633, adds the movement-compensated video data to the decoded video data in step 635, and then stores the resultant data in step 623.

As is in steps 617 through 623, the operation in steps 627 through 635 is performed for each block (8*8) as shown in (f) of FIG. 8. Therefore, the variable length decoding, dequantization, and IDCT are performed for each block of image data, and each block of movement-compensated video data is added to the IDCT data and is then stored. The control unit 100 repeats the decoding as described above until decoding of one frame of video data is completed in step 637.

The control unit detects such completion of decoding for one frame of video data in step 623 and then converts the one frame of decoded video data into data that can be displayed on the display unit 150, e.g., an RGB data, in step 625.

In the movement compensation, when the received data is P frame data, the P frame data is compared with the previous data and the compensation is performed based on the movement difference. When the received data is B frame data, the B frame data is compared with the previous and next data and the compensation is performed based on the movement difference.

As described above, the video decoder 230 may be implemented either by hardware as illustrated in FIGS. 15A and 15B or by software in the control unit 100.

When a digital broadcast receiver according to an embodiment of the present invention is utilized in a portable terminal, the digital broadcast receiver resizes an input coded image data based on the size of a display unit of the portable terminal before decoding the data. The resizing of the input video data may be set up in various ways depending on at least one resizing factor. From among the resizing factors, the most important factor may be the display size of the display unit 150. Also, the other factors may have priorities in an order of the image scan type (interlace scanning or progressive scanning), block scan type (zigzag scanning or alternative scanning), decoding speed, and decoding quality.

Figure 21A:
FIGS. 21A through 21D illustrate examples of screens of the 8*8 video decoder and 4*4 video decoder according to an embodiment of the present invention.
Figure 21B:
Figure 21C:
Figure 21D:

FIGS. 21A through 21D illustrate examples of screens of the 8*8 video decoder and 4*4 video decoder according to an embodiment of the present invention. FIGS. 21A and 21B are digital broadcast news screens displayed after decoding by the 8*8 video decoder and 4*4 video decoder, respectively, and FIGS. 21C and 21D are commercial advertisement screens displayed after decoding by the 8*8 video decoder and 4*4 video decoder, respectively. In comparison between the 8*8 video decoder and 4*4 video decoder, the 4*4 video decoder includes VLD control and resize parts and uses the half-pel scheme for the movement compensation.

Figure 22A:
FIGS. 22A and 22B are examples of display screens of video decoders having movement compensators using half-pel and quarter-pel schemes according to embodiments of the present invention, respectively.
Figure 22A:
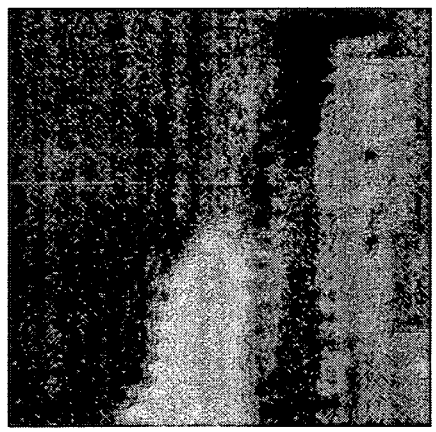
Figure 22B:
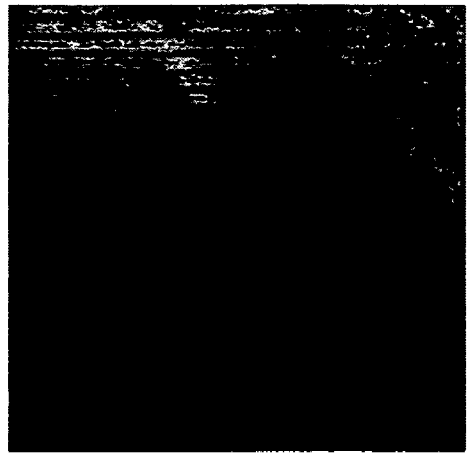
Figure 22B:
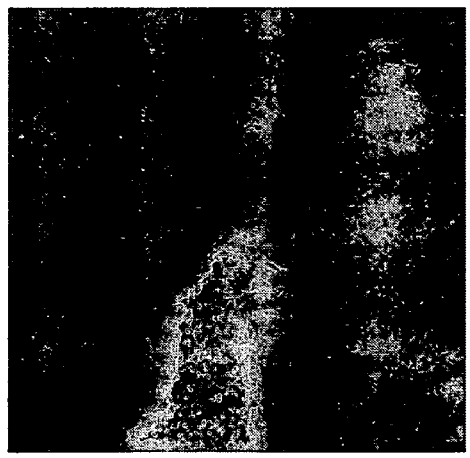

FIGS. 22A and 22B are examples of display screens of video decoders having movement compensators using the half-pel and quarter-pel schemes according to embodiments of the present invention, respectively. It is noted that the two screens of FIGS. 22A and 22B do not show a substantial difference.

Figure 23:
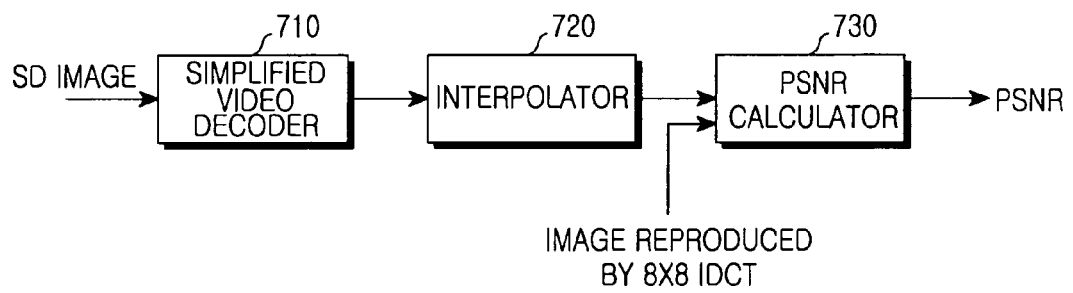
FIG. 23 illustrates a construction for measuring SNR of a video signal resized and decoded according to an embodiment of the present invention.

For the examples illustrated in FIGS. 21A through 22B, the screen qualities were objectively compared by measuring the Peak Signal Noise Ratio (PSNR) of the video decoder 230 by using the construction illustrated in FIG. 23. Referring to FIG. 23, the basic image has the resolution (full resolution) calculated based on the 8*8 IDCT, such that resizing to the 4*4 size may degrade the screen quality by at least 3~4 dB.

Figure 24A:
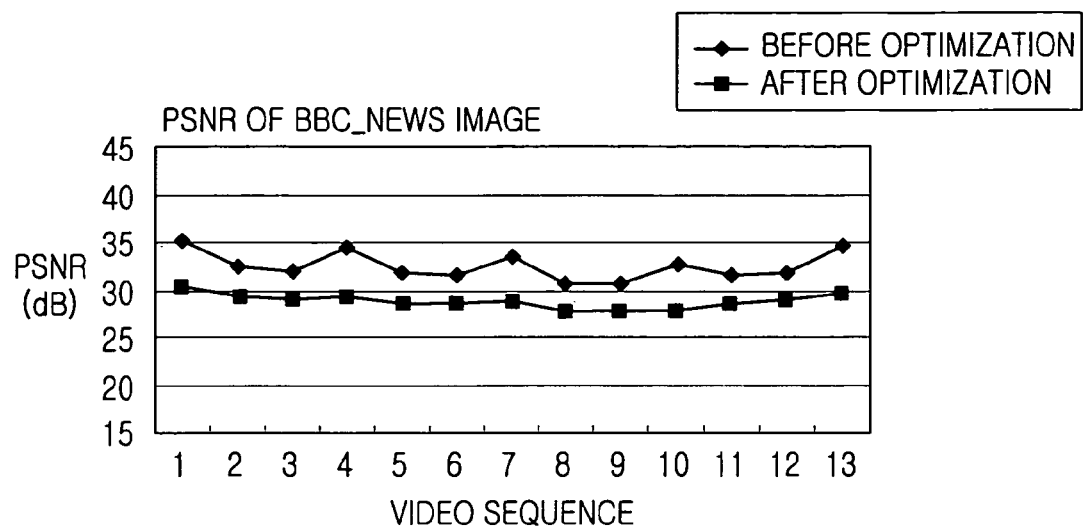
FIGS. 24A through 24D are graphs for PSNR comparison of resized video signals in a video decoder according to an embodiment of the present invention.
Figure 24B:
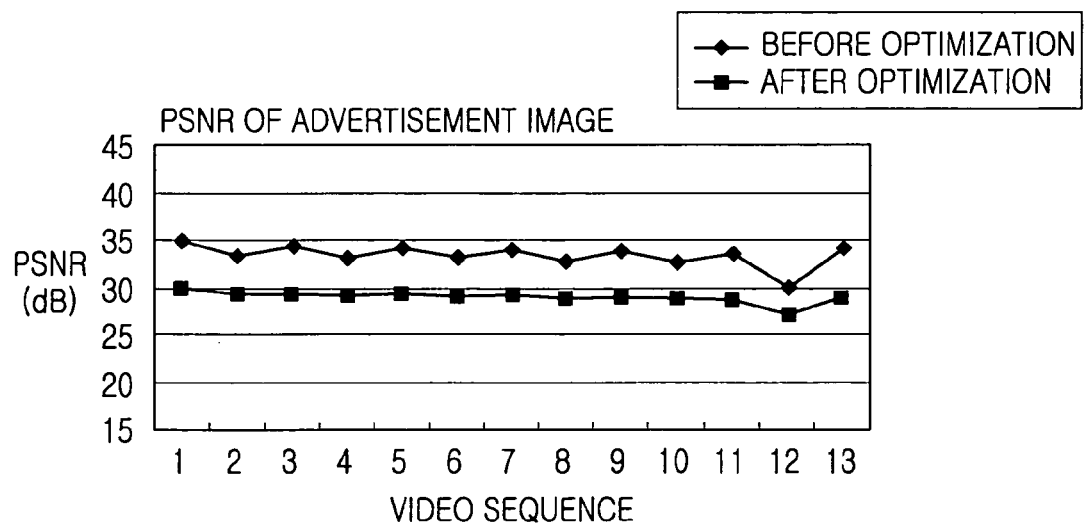

FIGS. 24A through 24D are graphs for PSNR comparison by taking such a point into consideration. FIG. 24A is a graph illustrating PNSR characteristics of digital broadcast news images by the 8*8 video decoder and 4*4 video decoder, and FIG. 24B is a graph illustrating PNSR characteristics of commercial advertisement images by the 8*8 video decoder and 4*4 video decoder.

FIGS. 24A and 24B illustrate the result of PSNR comparison between the 8*8 video decoder and the resized 4*4 video decoder according to the present invention. FIGS. 24A and 24B show almost no additional degradation other than the PSNR reduction due to the reduction of resolution.

Figure 24C:
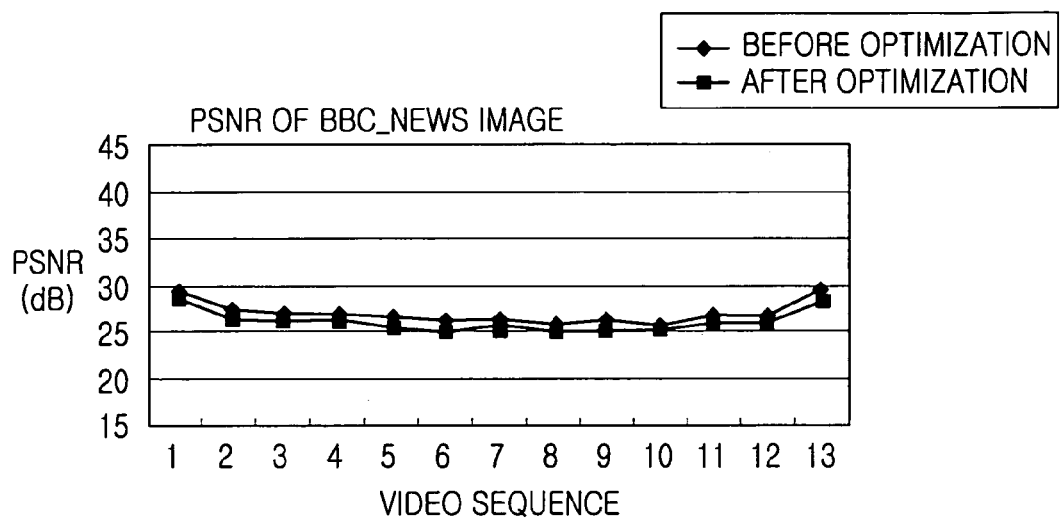
Figure 24D:
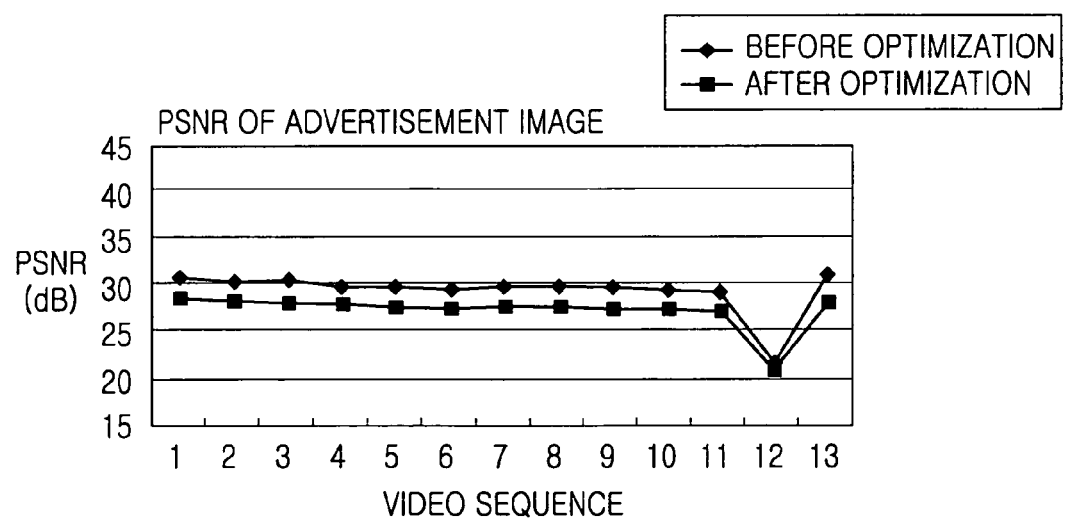

FIG. 24C is a graph illustrating PNSR characteristics of digital broadcast news images by the 4*4 video decoder and 4*2 video decoder, and FIG. 24D is a graph illustrating PNSR characteristics of commercial advertisement images by the 4*4 video decoder and 4*2 video decoder. As noted, in comparison with the 4*4 video decoder, the 4*2 video decoder employs a high speed algorithm capable of reducing a considerable amount of operation while causing nearly no degradation in display quality.

Tables 12 through 15 below show comparisons between the numbers of operations for resizing by the video decoder 230 according to an embodiment of the present invention. The operations by software can be briefly classified into shift, addition, multiplication, if, and for. Table 12 shows comparison between operations before and after optimization in the variable length decoder 315, Table 13 shows comparison between operations before and after optimization in the IDCT 319, Table 14 shows comparison between operations before and after optimization in the dequantizer 317, and Table 15 shows comparison between operations before and after optimization in the movement compensator 335.

TABLE 12

VLD Module

| Picture | 8 * 4 or 4 * 4 or 8 * 2 IDCT (before optimization) | | | | | 8 * 4 or 4 * 4 or 8 * 2 IDCT (after optimization) | | | | |
|---|---|---|---|---|---|---|---|---|---|---|
| type | Shift | Addition | Multiplication | If | For | Shift | Addition | Multiplication | If | For |
| I | 78831 | 162041 | 0 | 257506 | 0 | 30761 | 62575 | 0 | 257506 | 0 |
| P | 45981 | 78561 | 0 | 122015 | 0 | 18391 | 30638 | 0 | 122015 | 0 |
| P | 48983 | 84086 | 0 | 130496 | 0 | 18893 | 31627 | 0 | 130496 | 0 |
| P | 48711 | 83388 | 0 | 129882 | 0 | 19484 | 32521 | 0 | 129882 | 0 |

TABLE 13

IDCT Module

| Picture | 8 * 8 IDCT | | | | | 4 * 4 IDCT | | | | |
|---|---|---|---|---|---|---|---|---|---|---|
| type | Shift | Addition | Multiplication | If | For | Shift | Addition | Multiplication | If | For |
| I | 834236 | 269313 | 269313 | 269313 | 269313 | 269313 | 1276600 | 524680 | 52320 | 19440 |
| P | 770084 | 137240 | 137240 | 137240 | 137240 | 137240 | 833735 | 330080 | 49293 | 14410 |
| P | 768396 | 148716 | 148716 | 148716 | 148716 | 148716 | 892185 | 353388 | 52683 | 15420 |
| P | 769276 | 148115 | 148115 | 148115 | 148115 | 148115 | 893695 | 356712 | 52985 | 15464 |

TABLE 14

DQ Module

| Picture | 8 * 8 | | | | | 4 * 4 | | | | |
|---|---|---|---|---|---|---|---|---|---|---|
| type | Shift | Addition | Multiplication | If | For | Shift | Addition | Multiplication | If | For |
| I | 70150 | 43454 | 43454 | 43454 | 43454 | 43454 | 109633 | 83288 | 118557 | 9720 |
| P | 64723 | 23709 | 23709 | 23709 | 23709 | 23709 | 64034 | 36878 | 48553 | 7205 |
| P | 69706 | 26184 | 26184 | 26184 | 26184 | 26184 | 69067 | 40174 | 52762 | 7710 |
| P | 69398 | 25846 | 25846 | 25846 | 25846 | 25846 | 68437 | 39754 | 52221 | 7732 |

TABLE 15

Motion Compensation Module

| Picture | 8 * 8 | | | | | 4 * 4 | | | | |
|---|---|---|---|---|---|---|---|---|---|---|
| type | Shift | Addition | Multiplication | If | For | Shift | Addition | Multiplication | If | For |
| I | 0 | 0 | 0 | 0 | 0 | 0 | 0 | 0 | 0 | 0 |
| P | 540001 | 561772 | 561772 | 561772 | 561772 | 561772 | 1310662 | 11430 | 33326 | 55859 |
| P | 550747 | 559464 | 559464 | 559464 | 559464 | 559464 | 1330618 | 11538 | 34159 | 55753 |
| P | 558964 | 551922 | 551922 | 551922 | 551922 | 551922 | 1338636 | 11556 | 34566 | 55538 |

The decoding speed of the video decoder 230 is proportional to the quantity of operation.

Tables 16 through 18 show comparison between performances of the decoder implemented in actual computers and embedded systems. A high speed engine in the actual computers may yield a higher speed, and the embedded systems can provide further improvement in the performance. For the embedded systems, it is difficult to calculate exact frame rates, so approximate values are shown in the tables. In the embedded systems, the 2*2 video decoder shows 5~8 times better performance than the 8*8 video decoder.

TABLE 16

| IDCT Type | Motion Compensation | Frame Rate |
|---|---|---|
| 8 * 8 (Full) | Half-Pel | 53.93 |
| 4 * 4 | Quarter-Pel | 71.21 |
| | Half-Pel | 78.68 |
| 2 * 2 | Quarter-Pel | 85.42 |
| | Half-Pel | 90.16 |

TABLE 17

| IDCT Type | Motion Compensation | Frame Rate |
| --- | --- | --- |
| 8 * 8 (Full) | Half-Pel | 63.43 |
| 4 * 4 | Quarter-Pel | 81.15 |
|  | Half-Pel | 107.64 |
| 2 * 2 | Quarter-Pel | 128.44 |
|  | Half-Pel | 136.33 |

TABLE 18

| IDCT Type | Motion Compensation | Frame Rate |
| --- | --- | --- |
| 8 * 8 (Full) | Half-Pel | 3~5 Frame |
| 4 * 4 | Quarter-Pel | 8~10 Frame |
|  | Half-Pel | 10~12 Frame |
| 2 * 2 | Quarter-Pel | 15~20 Frame |
|  | Half-Pel | 25~28 Frame |

In general, standards for Digital Video Broadcasting (DVB) and Digital Multimedia Broadcasting (DMB) have been arranged for the digital broadcast for portable terminals. The DVB standards include DVB-T which is a terrestrial digital broadcasting standard and DVT-H which is a satellite broadcasting standard. The DMB and DVB may use MPEG type images and H.263 type images. Further, the MPEG scheme uses the Discrete Cosine Transform (DCT) and the H.263 scheme uses the Integer Transform (IT). Therefore, a portable terminal provided with a digital broadcast receiver must have an Inverse Discrete cosine Transform (IDCT) or Inverse Integer Transform (IIT) converter for inverse transform of an DCT-converted or IT-converted image. Therefore, it is preferred that, in portable terminal provided with a digital broadcast receiver, the video decoder 230 has a capability of decoding DCT type or IT type video data.

Further, it is preferred for the DMB and DVB to take the mobile environment into consideration. In the mobile environment, not only an SD class image (720*576) but also a CIF class image (355*288) is transmitted. Therefore, resizing is necessary in order to display the CIF class image on a display unit (e.g. LCD) of a portable terminal at a proper frame rate.

Figure 25A:
FIGS. 25A through 25C illustrate examples of resized results of a video data according to an embodiment of the present invention.
Figure 25B:
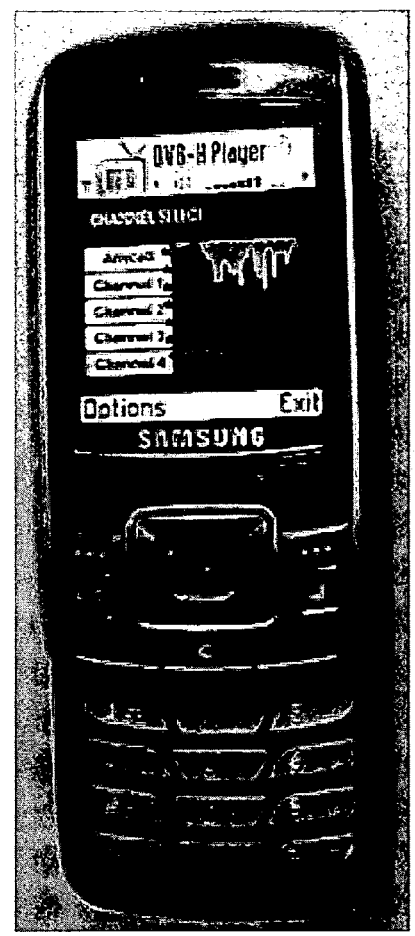
Figure 25C:

A typical portable terminal has a resolution of 176*208, so the typical portable terminal cannot display the CIF class image. Therefore, in a typical portable terminal, it is preferred to express the received image as a ½ resized image (176*144) and express the image for channel selection and Electronic Service Guide (ESG) as a ¼ resized image (88*72). The image surrounded by red dots in FIG. 25A is an image displayed on the display unit 150 when a CIF image for ESG has been resized to ¼, the image surrounded by red dots in FIG. 25B is an image displayed on the display unit 150 when a UI image for channel selection has been resized to ¼, and the image surrounded by a blue solid line in FIG. 25C is a ½ resized CIF image (176*144) displayed on the display unit 150. Because it is actually not a common case to efficiently use the display unit 150 by means of the menu UI and based on the reception status of the portable terminal, it may be preferable to use the resizing technique for other devices than the dedicated devices for processing digital image data, e.g., a digital broadcast receiver having a display unit capable of processing CIF class or higher images.

When the transmitter side of the digital broadcast transmits video data through a video coder using the DCT scheme, a video decoder 230 of a portable terminal for receiving the data may have the construction as shown in FIG. 15A or 15B. However, when the transmitter side of the digital broadcast transmits video data through a video coder using the IT scheme, a video decoder 230 of a portable terminal for receiving the data may have the construction as shown in FIG. 26A or 26B.

Figure 26A:
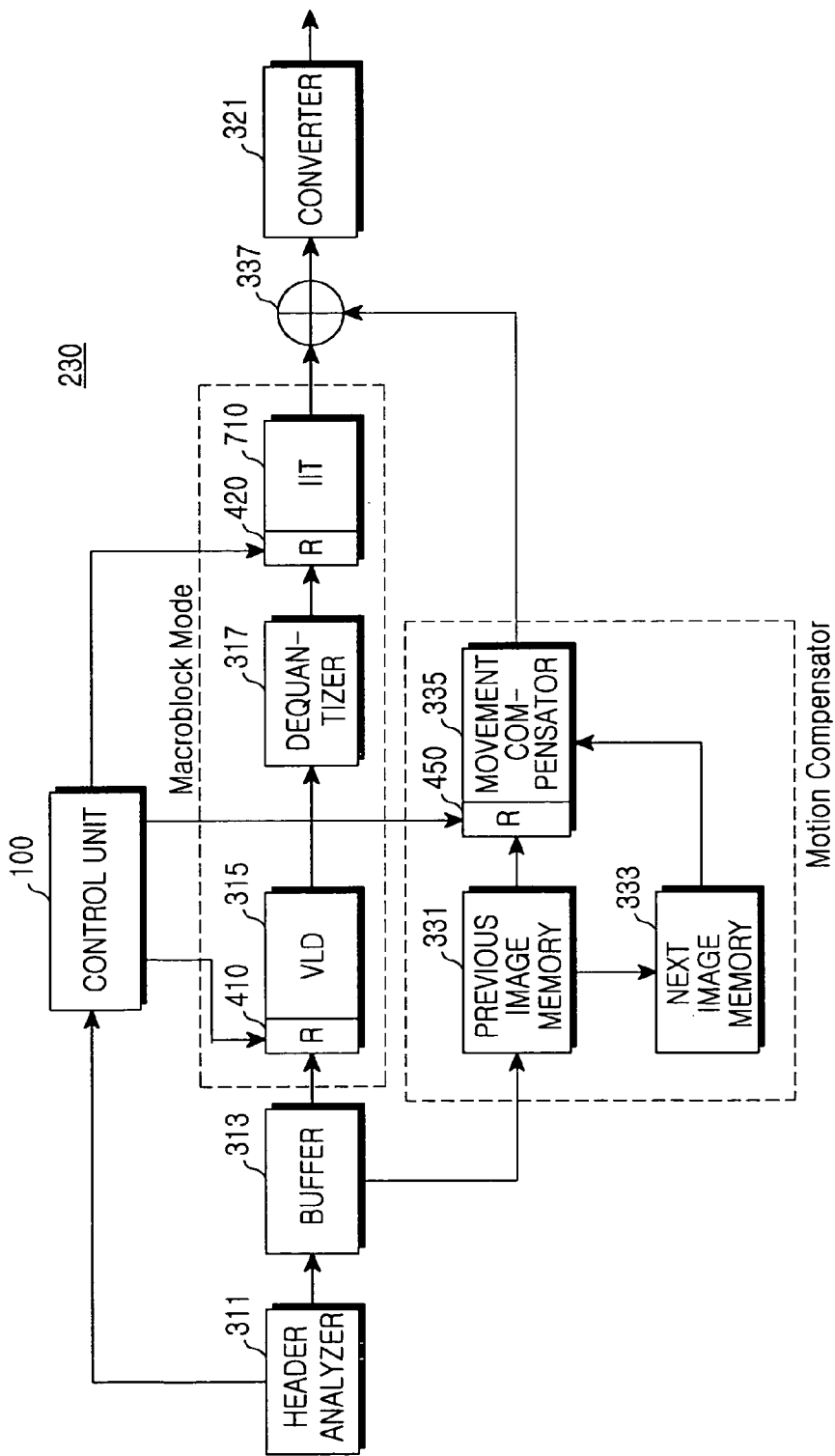
FIGS. 26A and 26B illustrate structures of video decoders performing the resizing by using an IIT unit according to an embodiment of the present invention.
Figure 26B:
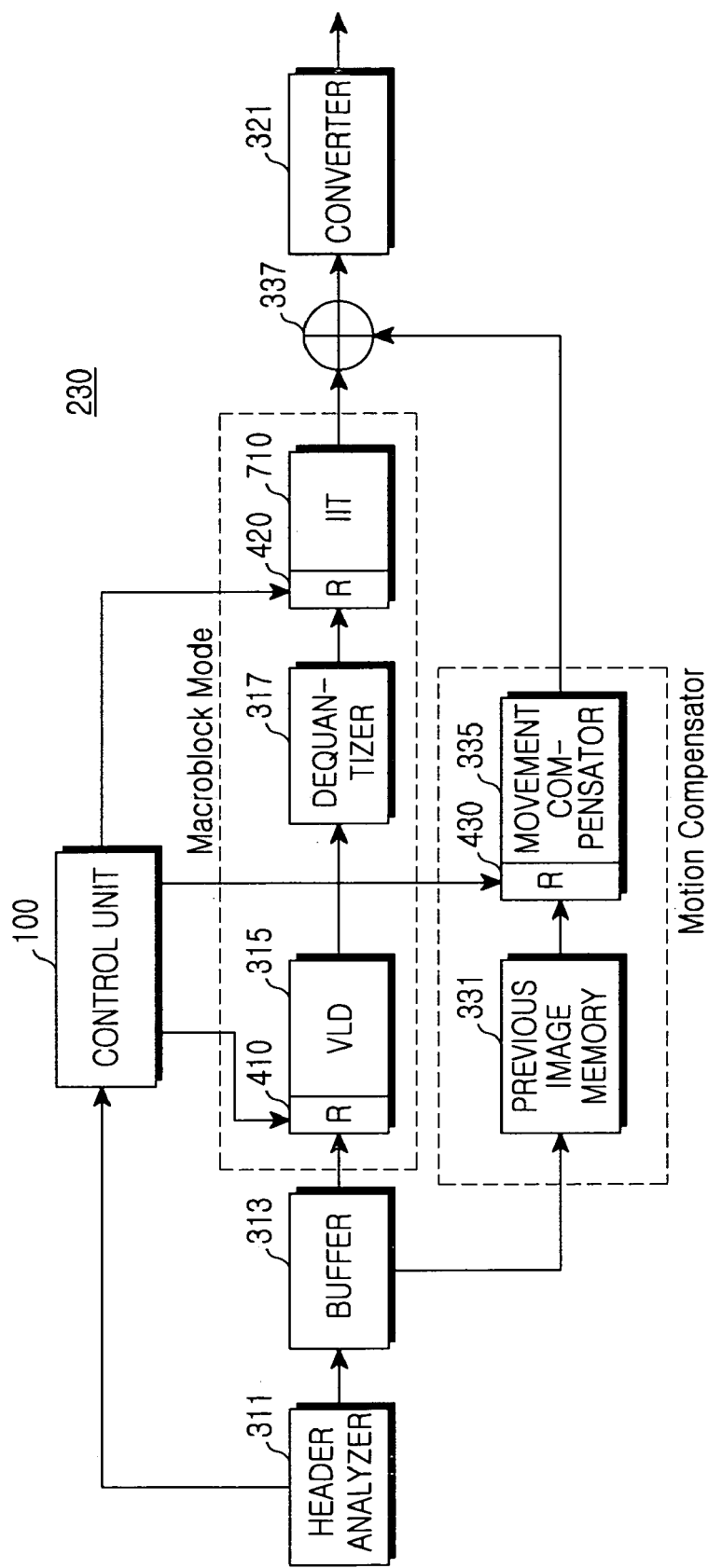

FIG. 26A or 26B are block diagrams illustrating video decoders for receiving and decoding a signal coded by using IT from an image signal, which includes an IIT unit 710 for decoding the IT signal to the original signal. However, before describing FIGS. 26A and 26B, the operation of the IIT unit 710 will be described first.

In general, mobile digital broadcasting, e.g., DVB-H, uses an image signal having a size below the CIF class, so a 4*4 converter can be used for the mobile digital broadcasting. In this case, the converter may employ either DCT or IT for its transform scheme. Hereinafter, a 4*4 converter will be described as an example.

First, the operation of a DCT converter will be discussed.

Equation (7) below illustrates an example of the 4*4 DCT, in which X denotes a spatial-domain image and Y denotes a frequency-domain image. That is, Equation (7) below corresponds to an example using a 4-point DCT converter, in which Y denotes the result of the DCT, X denotes the 4*4 input image, and transform matrix 1 and transform matrix 2 are disposed at left and right side of the input image X, respectively. Further, transform matrix 2 corresponds to a matrix obtained by diagonally transposing transform matrix 1.

$$Y = AXA^T = \begin{bmatrix} a & a & a & a \\ b & c & -c & -b \\ a & -a & -a & a \\ c & -b & b & -c \end{bmatrix} [X] \begin{bmatrix} a & b & a & c \\ a & c & -a & -b \\ a & -c & -a & b \\ a & -b & a & -c \end{bmatrix} \quad (7)$$

In Equation (7), IDCT coefficients of each matrix are defined as follows:

$$a = \frac{1}{2}, \quad b = \sqrt{\frac{1}{2}} \cos\left(\frac{\pi}{8}\right), \text{ and } c = \sqrt{\frac{1}{2}} \cos\left(\frac{3\pi}{8}\right).$$

Upon receiving the 4*4 DCT signal as in Equation (7), the IDCT unit 319 of the receiver inversely converts the received signal into a signal as defined by Equation (8) below.

$$X = A^T YA = \begin{bmatrix} a & b & a & c \\ a & c & -a & -b \\ a & -c & -a & b \\ a & -b & a & -c \end{bmatrix} [Y] \begin{bmatrix} a & a & a & a \\ b & c & -c & -b \\ a & -a & -a & a \\ c & -b & b & -c \end{bmatrix} \quad (8)$$

In Equation (8), coefficients of each matrix of the 4*4 IDCT unit are defined as follows:

$$a = \frac{1}{2}, \quad b = \sqrt{\frac{1}{2}} \cos\left(\frac{\pi}{8}\right), \text{ and } c = \sqrt{\frac{1}{2}} \cos\left(\frac{3\pi}{8}\right).$$

Equations (7) and (8) are based on the fact that a matrix obtained by transposing matrix A is equivalent to an inverse matrix of A: $A^T = \text{inv}(A)$.

If a signal Y as defined by Equation (9) below is input, X without resizing can be obtained by Equation (10) below.

$$Y = \begin{bmatrix} y11 & y12 & y13 & y14 \\ y21 & y22 & y23 & y24 \\ y31 & y32 & y33 & y34 \\ y41 & y42 & y43 & y44 \end{bmatrix} \quad (9)$$

$$X = \begin{bmatrix} a & b & a & c \\ a & c & -a & -b \\ a & -c & -a & b \\ a & -b & a & -c \end{bmatrix} \begin{bmatrix} y11 & y12 & y13 & y14 \\ y21 & y22 & y23 & y24 \\ y31 & y32 & y33 & y34 \\ y41 & y42 & y43 & y44 \end{bmatrix} \begin{bmatrix} a & a & a & a \\ b & c & -c & -b \\ a & -a & -a & a \\ c & -b & b & -c \end{bmatrix} \quad (10)$$

In the case of ½ resizing, a 2*2 scan area is set up in the 4*4 area of the matrix Y, so the resized X can be obtained by Equation (11) below.

$$X_{1/2} = \begin{bmatrix} a & b & a & c \\ a & c & -a & -b \\ a & -c & -a & b \\ a & -b & a & -c \end{bmatrix} \begin{bmatrix} y11 & y12 & 0 & 0 \\ y21 & y22 & 0 & 0 \\ 0 & 0 & 0 & 0 \\ 0 & 0 & 0 & 0 \end{bmatrix} \begin{bmatrix} a & a & a & a \\ b & c & -c & -b \\ a & -a & -a & a \\ c & -b & b & -c \end{bmatrix} \quad (11)$$

Equation (11) is identical to Equation (12) below. As noted from Equation (12), the quantity of operation is reduced to 25%.

$$X_{1/2} = \begin{bmatrix} a & b \\ a & c \\ a & -c \\ a & -b \end{bmatrix} \begin{bmatrix} y11 & y12 \\ y21 & y22 \end{bmatrix} \begin{bmatrix} a & a & a & a \\ b & c & -c & -b \end{bmatrix} \quad (12)$$

In the case of ¼ resizing, a 1*1 scan area is set up in the 4*4 area of the matrix Y, so the resized X can be obtained by Equation (13) below.

$$X_{1/4} = \begin{bmatrix} a & b & a & c \\ a & c & -a & -b \\ a & -c & -a & b \\ a & -b & a & -c \end{bmatrix} \begin{bmatrix} y11 & 0 & 0 & 0 \\ 0 & 0 & 0 & 0 \\ 0 & 0 & 0 & 0 \\ 0 & 0 & 0 & 0 \end{bmatrix} \begin{bmatrix} a & a & a & a \\ b & c & -c & -b \\ a & -a & -a & a \\ c & -b & b & -c \end{bmatrix} \quad (13)$$

Equation (13) is identical to Equation (14) below.

$$X_{1/4} = \begin{bmatrix} a \\ a \\ a \\ a \end{bmatrix} [y11] [a \; a \; a \; a] = a^2 \begin{bmatrix} y11 & y11 & y11 & y11 \\ y11 & y11 & y11 & y11 \\ y11 & y11 & y11 & y11 \\ y11 & y11 & y11 & y11 \end{bmatrix} \quad (14)$$

Next, the Integer Transform (IT) will be discussed.

The DCT and IDCT as described above are transform schemes used in MPEG coders and decoders. However, the H.264 may use the integer transform scheme and the inverse integer transform scheme. The integer transform scheme is a modified DCT scheme, which is similar to the DCT scheme but different coefficient values. Equation (15) below defines a 4*4 integer transform, which is similar to the DCT but which has different coefficients in each matrix. In Equation (15), X denotes a spatial-domain image and Y denotes a frequency-domain image. In Equation (15) below, Y denotes the result of the IT, X denotes the 4*4 input image, and transform matrix 1 and transform matrix 2 are disposed at the left and right side of the input image X, respectively. It is noted that the DCT scheme is converted to the IT scheme by replacing the coefficient a, b, and c with 1, 2, and 1, respectively (a=1, b=2 and c=3). Therefore, it is noted that the IT scheme is simpler than the DCT scheme.

$$Y = \begin{bmatrix} 1 & 1 & 1 & 1 \\ 2 & 1 & -1 & -2 \\ 1 & -1 & -1 & 1 \\ 1 & -2 & 2 & -1 \end{bmatrix} [X] \begin{bmatrix} 1 & 2 & 1 & 1 \\ 1 & 1 & -1 & -2 \\ 1 & -1 & -1 & 2 \\ 1 & -2 & 1 & -1 \end{bmatrix} \quad (15)$$

A video decoder receiving an IT type image data as defined by Equation (15) must perform the Inverse Integer Transform (IIT) for finding the original image signal X from Y. The IIT can be defined by Equation (16) below.

$$X' = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} [Y] \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix} \quad (16)$$

If a signal Y as defined by Equation (17) below is input, X' without resizing can be obtained by Equation (18) below.

$$Y = \begin{bmatrix} y11 & y12 & y13 & y14 \\ y21 & y22 & y23 & y24 \\ y31 & y32 & y33 & y34 \\ y41 & y42 & y43 & y44 \end{bmatrix} \quad (17)$$

$$X' = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \begin{bmatrix} y11 & y12 & y13 & y14 \\ y21 & y22 & y23 & y24 \\ y31 & y32 & y33 & y34 \\ y41 & y42 & y43 & y44 \end{bmatrix} \quad (18)$$

$$\begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

In the case of ½ resizing, a 2*2 scan area is set up in the 4*4 area of the matrix Y, so the resized X' can be obtained by Equation (19) below. That is, in the case of ½ resizing, a 2*2 zonal filter (y11, y12, y21 and y22) as shown in Equation (19) is used.

$$X'_{1/2} = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \begin{bmatrix} y11 & y12 & 0 & 0 \\ y21 & y22 & 0 & 0 \\ 0 & 0 & 0 & 0 \\ 0 & 0 & 0 & 0 \end{bmatrix} \quad (19)$$

$$\begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

Equation (19) is identical to Equation (20) below, except that in Equation (20), the quantity of operation is reduced to 25%.

$$X'_{1/2} = \begin{bmatrix} 1 & 1 \\ 1 & 1/2 \\ 1 & -1/2 \\ 1 & -1 \end{bmatrix} \begin{bmatrix} y11 & y12 \\ y21 & y22 \end{bmatrix} \begin{bmatrix} 1 & 1 & 1 & 1 \\ 1 & 1/2 & -1/2 & -1 \end{bmatrix} \quad (20)$$

In the case of ¼ resizing, a 1*1 scan area is set up in the 4*4 area of the matrix Y, so the resized X' can be obtained by Equation (21) below.

$$X'_{1/4} = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \begin{bmatrix} y11 & 0 & 0 & 0 \\ 0 & 0 & 0 & 0 \\ 0 & 0 & 0 & 0 \\ 0 & 0 & 0 & 0 \end{bmatrix} \quad (21)$$

$$\begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

Equation (21) is identical to equation (22) below.

$$X'_{1/4} = \begin{bmatrix} 1 \\ 1 \\ 1 \\ 1 \end{bmatrix} [y11][1 \ 1 \ 1 \ 1] = \begin{bmatrix} y11 & y11 & y11 & y11 \\ y11 & y11 & y11 & y11 \\ y11 & y11 & y11 & y11 \\ y11 & y11 & y11 & y11 \end{bmatrix} \quad (22)$$

As described above, the video decoder 230 has an IIT unit, which converts an image data of the two dimensional frequency domain to an image data of the two dimensional spatial domain. In the converting, the video decoder 230 may use an IDCT unit 319 or an IIT unit as described above. The present invention proposes use the IDCT or IIT unit as an inverse converter, each of which can perform resizing of an image data.

FIGS. 26A and 26B illustrate video decoders 230 performing the resizing by using an IIT unit 710. More specifically, FIG. 26A illustrates a video decoder 230 for decoding I, B, and P frame images and FIG. 26B shows a video decoder 230 for decoding I and P frame images. Except for IIT unit 710 in FIGS. 26A and 26B, all other elements are the same as those in FIGS. 15A and 15B.

Referring to FIG. 26A, the header analyzer 311 extracts and analyzes header information of a received image signal and then transfers it to the control unit 100. The control unit 100 determines resizing control values while performing the process as illustrated in FIG. 16 and then applies these values to the resizers 410, 420, and 450 of the variable length decoder 315, the IIT unit 710 and the movement compensator 335, respectively.

The variable length decoder 315 and the movement compensator 335 operate in the same way as do those shown in FIG. 15A. The IIT unit 710 of the video decoder 230 may have a construction similar to the construction illustrated in FIG. 18. The IIT unit 710 may have 4-point and 2-point IIT units for resizing Y axis pixels and 4-point and 2-point IIT units for resizing X axis pixels. The Y resizer of the IIT unit 710 confirms the Y axis resizing control values from the resizing control values and then transfers the VL-coded data to the IIT unit corresponding to the confirmed Y resizing control value. The IIT unit performs IIT on the data and stores the processed data. The X resizer of the IIT unit 710 confirms the X axis resizing control values from the resizing control values and then transfers the Y axis resized data to the IIT unit corresponding to the confirmed X resizing control value. The IIT unit performs IIT on the data and stores the processed data. When IIT has been performed for the X axis data as described above, the data has the same values as those obtained by performing Y axis and X axis IIT.

In the data inverse transformed by the IIT unit 710, the resized scan area is determined based on the resizing control values (zonal filter). As a result, the resultant image may be either maintained as the original image or a ¼ resized or 1/1 resized image.

A digital broadcast receiver according to an embodiment of the present invention may be implemented in a portable terminal.

Figure 27:
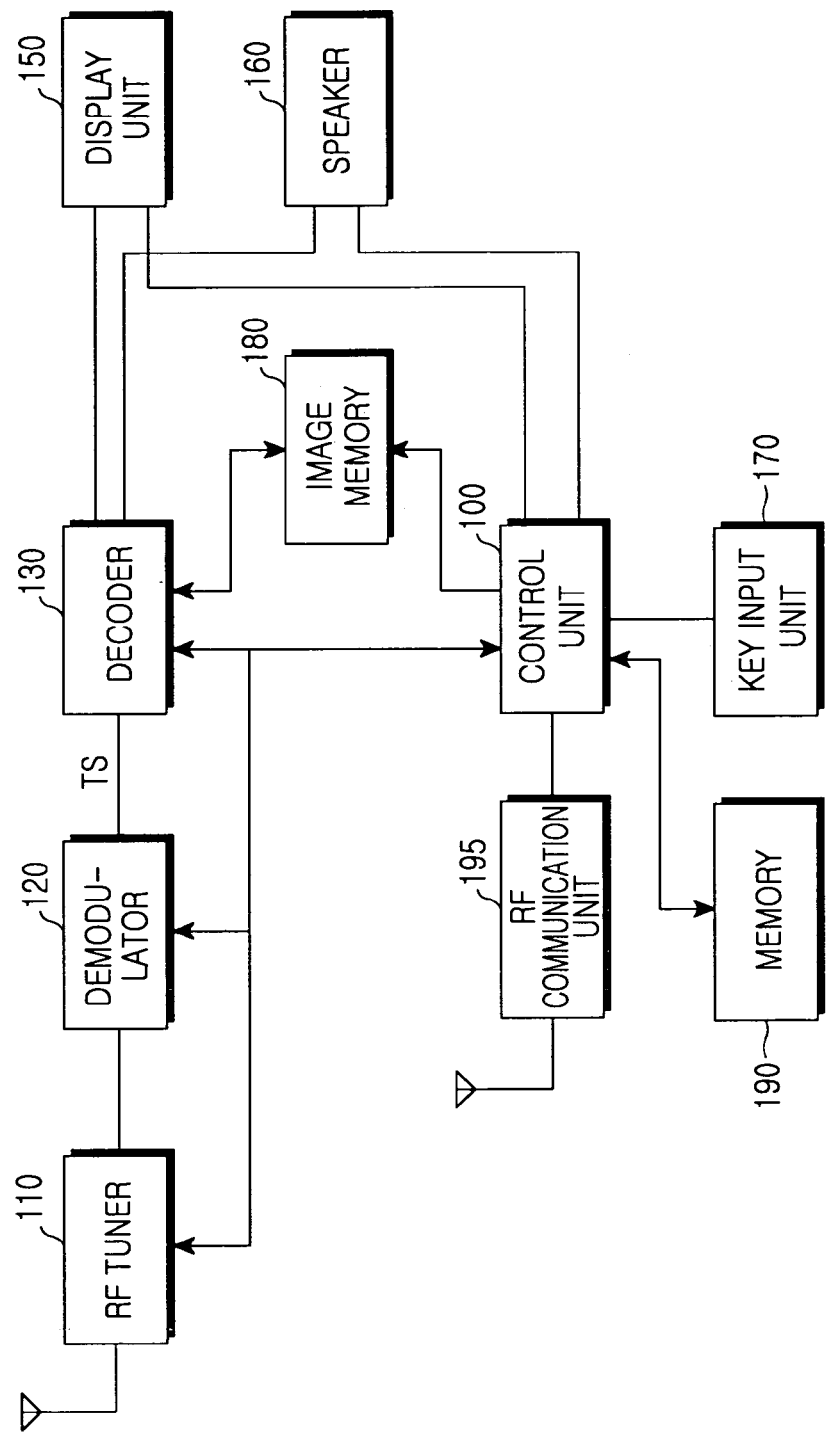
FIG. 27 illustrates a digital broadcast receiver in a portable terminal according to an embodiment of the present invention.

FIG. 27 illustrates a structure of a digital broadcast receiver in a portable terminal according to an embodiment of the present invention. Referring to FIG. 27, the portable terminal includes an RF tuber 110 for the digital broadcasting, a demodulator 120 and a decoder 130. The decoder 130 may be replaced by software in the control unit 100 of the portable terminal. The control unit 100 illustrated in FIG. 25 may be an MSM of the portable terminal, which has a modem function for modulation and demodulation and a codec function for coding and decoding as well as the function of general control of the portable terminal. Also, the portable terminal may have a Digital Signal Processor for performing the modem and codec functions, which is separated from the control unit 100.

When the portable terminal needs to have a dedicated multimedia processor, e.g., DM 270, for processing a multimedia data in addition to the MSM, the control unit 100 may serve as the multimedia processor. Further, when the portable terminal has a separate video decoder, a control unit of the video decoder itself can serve as the multimedia processor. The following description is based on an assumption that the portable terminal is a mobile phone and the control unit 100 is an MSM.

Referring to FIG. 27 the RF communication unit 195 performs the wireless communication function of the portable terminal. The RF communication unit 195 includes an RF transmitter for up-converting a frequency of a transmitted signal and amplifying the transmitted signal and an RF receiver for low noise amplifying a received signal and down-converting the frequency of the received signal.

The control unit 100 processes transmitted voice and data of the portable terminal and controls general operation of the portable terminal.

First, in order to process communication data, the control unit 100 may include a transmitter capable of coding and modulating a transmitted signal and a receiver capable of demodulating and decoding a received signal. The control unit 100 may has a separate data processor including the modem and codec as described above. The data processor can process channel data according to the CDMA scheme, UMTS scheme, or GSM scheme.

As described above, the key input unit 170 includes keys for input of numeral information or character information and function keys for setup of various functions. The function keys include keys for selecting functions such as channel selection for receiving digital broadcast, broadcast reception mode control, etc.

The memory 180 may include program memories and data memories. The program memory stores programs for broadcast reception of the digital broadcast receiver and programs according to embodiments of the present invention. The data memories may include a Non-Volatile Memory (NYM) for storing data requiring non-volatility, e.g., bitmap, font, phone book, and a Random Access Memory (RAM) for temporarily storing data occurring in the course of executing programs.

The display unit 150 displays an image signal of the digital broadcast receiver processed by the decoder 130 and information according to the operation of the portable terminal under the control of the control unit 100. An audio processor, which includes a speaker 160 and a microphone, is used as a handset of the portable terminal in the communication mode, and reproduces a broadcast audio signal in the digital broadcasting reception mode.

The RF tuner 110 generates a broadcast frequency signal of a digital broadcast channel selected based on the channel control data of the control unit 100 and down-converts the frequency of the broadcast signal of the selected channel to generate an intermediate frequency signal. The demodulator 120 demodulates the modulated digital broadcast signal into the original signal.

The decoder 130 divides the demodulated signal into an image signal and an audio signal and decodes and outputs the divided image and audio signals. The decoder 130 may have the construction as illustrated in FIG. 2. The video decoder 230 may have the construction as illustrated in FIG. 15A or 15B. Instead of the video decoder 230, the control unit 100 may have a video decoding program, in order to perform the video decoding by software.

The image memory 180 includes buffers for storing broadcast data and header information for decoding. Further, the image memory 180 has various tables for decoding received broadcast data. In a recording mode, the image memory 180 stores the broadcast signal output from the decoder 130 under the control of the control unit 100, and outputs a selected broadcast signal to the decoder 130 under the control of the control unit 100 in the reproduction mode.

In the construction illustrated in FIG. 27, the received digital broadcast signal of the portable terminal may be a signal of the VHF band (174 MHz~230 MHz; C5~C12) or UHF band (470 MHz~862 MHz; C21~C69). Otherwise, if necessary, it may be a signal of a higher band including an L-band (1 GHz~2.6 GHz) and an S-band (2.6 GHz~3.95 GHz).

When the user selects a broadcast channel, the control unit 100 outputs control data corresponding to the selected channel. The RF tuner 110 generates and mixes the RF frequency according to the control data, thereby generating an intermediate frequency signal of the selected channel. The Intermediate Frequency (IF) may be 36.17 MHz.

The analog IF signal is applied to the demodulator 120. Then, the demodulator 120 converts the analog signal to a digital signal, demodulates the digital signal according to a predetermined demodulation scheme, and outputs the demodulated signal. The digital broadcast receiver may use a Coded Orthogonal Frequency Division Multiplexing (CODFM) scheme as a modulation scheme.

According to a preferred embodiment of the present invention, the demodulator 120 may use MT352™ manufactured and sold by Zarlink Semiconductor Inc. The signal demodulated by the demodulator 120 is output as 8 bits of MPEG-2 TS data. That is, the demodulator 120 converts the signal of the selected channel output from the RF tuner 110 into digital data, which is controlled according to the number of carriers and additional symbols and loops along a Fast Fourier Transform (FFT) loop circuit. Further, the FFT signal is reproduced as a final signal through error-correction for reconstructing the order and interval of the signal and the final signal is output as MPEG-2 TS signal.

The MPEG-2 TS signal output from the demodulator 120 is applied to the decoder 130. The decoder 130 divides the received MPEG-2 TS signal into image and audio data, decodes them, and then outputs an image signal and a an audio signal. The image signal may be an RGB signal or YUV signal and the audio signal is output usually as Pulse Code Modulation (PCM) stereo sound. Further, the image signal output from the decoder 130 is output and displayed by the display unit 150 and the audio signal is applied to and reproduced by the speaker 160.

The control unit 100 determines resizing control values for resizing the video data of the video decoder of the decoder 130. In the resizing, at least one of the resizing control values for the video decoder 230 can be used. From among the resizing factors, the most important factor may be the display size of the display unit 150. Because the received digital broadcast signal usually has as large a resolution as can be displayed by a typical digital television, it is preferred to resize the received signal before decoding the signal, so that the signal can be properly display by the display unit 150. Even when an image is display with a proper resolution for a portable terminal, resizing may be necessary according to the decoding speed and quality, because the portable terminals may require different display resolutions.

In addition to the display size, the other resizing factors include the image scan type of the digital broadcast signal, block scan type, decoding speed of the decoder 230 and decoding quality according to the status of the portable terminal. The control unit 100 determines the resizing control values for the decoder 120 based on at least one of the above-described factors.

Thereafter, the decoder 130 resizes the coded digital broadcast signal based on the resizing control values output from the control unit 100, decodes the resized digital broadcast signal, and then displays the decoded signal on the displayed unit 150.

A digital broadcast receiver according to present invention resizes the received image signal according to the display size. Therefore, the present invention can largely reduce the time for image processing and can simplify the construction of the receiver. More specifically, the present invention can provide an efficient digital broadcast receiver for a portable terminal, which decodes a coded video data after resizing a decoding area of the video data according to the display size of the portable terminal. Further, before decoding a video data, a digital broadcast receiver or a portable terminal having a digital broadcast receiver according to present invention resizes the video data according to not only the display size of the portable terminal but also scan type (image scanning or block scanning) of the received broadcast signal, the decoding quality and decoding speed for the decoded image, etc. Therefore, the present invention can adaptively miniaturize the video decoder while maintaining the performance of the video decoder, thereby promoting the speed of signal processing.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A video decoder of a digital broadcast receiver, comprising:
   a resizing control unit for generating a resizing control signal for resizing a received video data;
   a header analyzer for analyzing header information from a decoded video stream and separating and outputting video data;

a variable length decoder for decoding the video data output from the header analyzer into an original pixel data with an original data size using a variable length table;

a dequantizer for dequantizing the decoded video data;

an Inverse Discrete Cosine Transform (IDCT) unit for resizing and converting the dequantized frequency-domain video data into a two dimensional spatial domain video data using the resizing control signal; and a movement compensator unit for compensating for movement of a movement compensation data corresponding to one of the inverse-transformed video data and the separated video data, wherein the IDCT unit comprises:

a Y axis resizer for selecting an N point inverse discrete cosine transformer using a Y axis control signal of the resizing control signal;

an N number of Y axis inverse discrete cosine transformers including the selected N point inverse discrete cosine transformer for inverse discrete cosine transforming Y axis video data in a resized area;

an X axis resizer for selecting an M point inverse discrete cosine transformer using an X axis control signal of the resizing control signal; and an M number of X axis inverse discrete cosine transformers including the selected M point inverse discrete cosine transformer for inverse discrete cosine transforming X axis video data in a resizing area, the X axis video data being stored in a Y buffer.

2. The video decoder as claimed in claim 1, wherein the resizing control unit determines the resizing control value based on a display size of the digital broadcast receiver.

3. The video decoder as claimed in claim 1, wherein the resizing control unit determines the resizing control value based on a display size of the digital broadcast receiver and an image scan type analyzed by the header analyzer.

4. The video decoder as claimed in claim 1, wherein the resizing control unit determines the resizing control value based on a display size of the digital broadcast receiver, and an image scan type and a block scan type analyzed by the header analyzer.

5. The video decoder as claimed in claim 1, wherein the resizing control unit determines the resizing control value based on a display size of the digital broadcast receiver, an image scan type and a block scan type analyzed by the header analyzer, and a decoding speed selected by a user.

6. The video decoder as claimed in claim 1, wherein the resizing control unit determines the resizing control value based on a display size of the digital broadcast receiver, an image scan type and a block scan type analyzed by the header analyzer, a decoding speed selected by a user, and a decoding speed of the digital broadcast receiver.

7. A video decoder of a digital broadcast receiver, comprising:

a resizing control unit for generating a resizing control signal for resizing a received video data;

a header analyzer for analyzing header information from a decoded video stream and separating and outputting video data;

a variable length decoder for decoding the video data output from the header analyzer into an original pixel data with an original data size using a variable length table;

a dequantizer for dequantizing the decoded video data;

an Inverse Transform (IT) unit for resizing and converting the dequantized frequency-domain video data into a two dimensional spatial domain video data using the resizing control signal; and a movement compensator unit for compensating for movement of a movement compensation data corresponding to one of the inverse-transformed video data and the separated video data, wherein the variable length decoder comprises:

a resizer for resizing the separated video data based on the resizing control signal;

a table converter for decoding the received variable length coded video data into a video data with the original size; and a buffer for storing the video data decoded by the table converter, wherein the resizer controls the table converter to decode data in blocks included in a resizing area set by the resizing control signal and controls the buffer to store the video data in the resizing area.

8. A video decoder of a digital broadcast receiver, comprising:

a resizing control unit for generating a resizing control signal for resizing a received video data;

a header analyzer for analyzing header information from a decoded video stream and separating and outputting video data;

a variable length decoder for decoding the video data output from the header analyzer into an original pixel data with an original data size using a variable length table;

a dequantizer for dequantizing the decoded video data;

an Inverse Transform (IT) unit for resizing and converting the dequantized frequency-domain video data into a two dimensional spatial domain video data using the resizing control signal; and a movement compensator unit for compensating for movement of a movement compensation data corresponding to one of the inverse-transformed video data and the separated video data, wherein the movement compensator unit comprises:

a buffer for storing a received movement compensation vector value;

a previous image memory for storing a previous image in order to compare the movement compensation vector value;

a next image memory for storing a next image in order to compare the movement compensation vector value;

a plurality of movement compensators for receiving the movement compensation vector value and outputting of the previous image memory and the next image memory, wherein the movement compensators are operated by a movement compensation selection signal to perform a half-pel, quarter-pel, or octa-pel movement compensation; and a resizer for selecting one of the movement compensators based on the resizing control signal.

9. A video decoder of a digital broadcast receiver, comprising:

a resizing control unit for generating a resizing control signal for resizing a received video data;

a header analyzer for analyzing header information from a decoded video stream and separating and outputting video data;

a variable length decoder for decoding the video data output from the header analyzer into an original pixel data with an original data size using a variable length table;

a dequantizer for dequantizing the decoded video data;

an Inverse Integer Transform (IIT) unit for resizing and converting the dequantized frequency-domain video data into a two dimensional spatial domain video data using the resizing control signal; and a movement compensator unit for compensating for movement of a movement compensation data corresponding to one of the inverse-transformed video data and the separated video data, wherein the IIT unit comprises:

a Y axis resizer for selecting an N point inverse integer transformer using a Y axis control signal of the resizing control signal;

an N number of Y axis inverse integer transformers including the selected N point inverse integer transformer for inverse integer transforming Y axis video data in a resized area;

an X axis resizer for selecting an M point inverse integer transformer using an X axis control signal of the resizing control signal;

an M number of X axis inverse integer transformers including the selected M point inverse integer transformer for inverse integer transforming X axis video data in a resizing area, the X axis video data being stored in a Y buffer.

10. The video decoder as claimed in claim 9, wherein the variable length decoder comprises:

a resizer for resizing the separated video data based on the resizing control signal;

a table converter for decoding the received variable length coded video data into video data with the original size; and a buffer for storing the video data decoded by the table converter, wherein the resizer controls the table converter to decode data in blocks included in the resizing area set by the resizing control signal and controls the buffer to store the video data in the resizing area.

11. The video decoder as claimed in claim 10, wherein the movement compensator unit comprises:

a buffer for storing a received movement compensation vector value;

a previous image memory for storing a previous image in order to compare the movement compensation vector value;

a next image memory for storing a next image in order to compare the movement compensation vector value;

a plurality of movement compensators for receiving the movement compensation vector value and outputting of the previous image memory and the next image memory, wherein the movement compensators are operated by a movement compensation selection signal to perform one of a half-pel, quarter-pel, and octa-pel movement compensation; and a resizer for selecting one of the movement compensators based on the resizing control signal.

12. The video decoder as claimed in claim 11, wherein the resizing control unit determines the resizing control value based on a display size of the digital broadcast receiver.

13. The video decoder as claimed in claim 11, wherein the resizing control unit determines the resizing control value based on a display size of the digital broadcast receiver and an image scan type analyzed by the header analyzer.

14. The video decoder as claimed in claim 11, wherein the resizing control unit determines the resizing control value based on a display size of the digital broadcast receiver, an image scan type and a block scan type analyzed by the header analyzer, and a decoding speed selected by a user.

15. The video decoder as claimed in claim 11, wherein the resizing control unit determines the resizing control value based on a display size of the digital broadcast receiver, an image scan type and a block scan type analyzed by the header analyzer, a decoding speed selected by a user, and a decoding speed of the digital broadcast receiver.

16. A digital broadcast receiver comprising:

a control unit for generating a channel selection signal using a user selection and generating a resizing control signal for resizing received video data;

a tuner for selecting a channel of a received digital broadcast signal according to the channel selection signal;

a demodulator for demodulating the selected digital broadcast signal;

a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;

a display unit for displaying the decoded video data; and a memory for storing the digital broadcast signal output from the demodulator in a record mode, the memory including buffers for temporarily storing data processed by the decoder, wherein the video decoder comprises:

a header analyzer for analyzing header information from the decoded video stream and for separating and outputting a video data;

a variable length decoder for resizing the separated video data based on the resizing control signal, and decoding the resized video data into a pixel data with an original pixel data size using a variable length table;

a dequantizer for dequantizing the decoded video data;

an Inverse Discrete Cosine Transform (IDCT) unit for resizing and converting the dequantized frequency-domain video data into a two dimensional spatial domain video data by the resizing control signal;

a movement compensator unit for compensating for movement of the pixel data by a predetermined pixel interval based on the resizing control signal;

an adder for adding outputs of the inverse transform unit and the movement compensator unit; and a color converter for converting a video data output from the adder into display data for the display unit, and wherein the IDCT unit comprises:

a Y axis resizer for selecting an N point inverse discrete cosine transformer using a Y axis control signal of the resizing control signal;

an N number of Y axis inverse discrete cosine transformers including the selected N point inverse discrete cosine transformer for inverse discrete cosine transforming Y axis video data in a resized area;

an X axis resizer for selecting an M point inverse discrete cosine transformer using an X axis control signal of the resizing control signal; and an M number of X axis inverse discrete cosine transformers including the selected M point inverse discrete cosine transformer for inverse discrete cosine transforming X axis video data in a resizing area, the X axis video data being stored in a Y buffer.

17. The digital broadcast receiver as claimed in claim 16, wherein the control unit determines the resizing control value based on a display size of the digital broadcast receiver.

18. The digital broadcast receiver as claimed in claim 16, wherein the control unit determines the resizing control value based on a display size of the digital broadcast receiver and an image scan type analyzed by the header analyzer.

19. The digital broadcast receiver as claimed in claim 16, wherein the control unit determines the resizing control value based on a display size of the digital broadcast receiver, an image scan type and a block scan type analyzed by the header analyzer, a decoding speed selected by a user, and a decoding speed of the digital broadcast receiver.

20. A digital broadcast receiver comprising:
   a control unit for generating a channel selection signal using a user selection and generating a resizing control signal for resizing received video data;
   a tuner for selecting a channel of a received digital broadcast signal according to the channel selection signal;
   a demodulator for demodulating the selected digital broadcast signal;
   a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;
   a display unit for displaying the decoded video data; and
   a memory for storing the digital broadcast signal output from the demodulator in a record mode, the memory including buffers for temporarily storing data processed by the decoder,
   wherein the video decoder comprises:
      a header analyzer for analyzing header information from the decoded video stream and for separating and outputting a video data;
      a variable length decoder for resizing the separated video data based on the resizing control signal, and decoding the resized video data into a pixel data with an original pixel data size using a variable length table;
      a dequantizer for dequantizing the decoded video data;
      an Inverse Integer Transform (IIT) unit for resizing and converting the dequantized frequency-domain video data into a two dimensional spatial domain video data by the resizing control signal;
      a movement compensator unit for compensating for movement of the pixel data by a predetermined pixel interval based on the resizing control signal;
      an adder for adding outputs of the inverse transform unit and the movement compensator unit; and
      a color converter for converting a video data output from the adder into display data for the display unit, and
   wherein the IIT unit comprises:
      a Y axis resizer for selecting an N point inverse integer transformer using a Y axis control signal of the resizing control signal;
      an N number of Y axis inverse integer transformers including the selected N point inverse integer transformer for inverse integer transforming Y axis video data in a resized area;
      an X axis resizer for selecting an M point inverse integer transformer using an X axis control signal of the resizing control signal; and
      an M number of X axis inverse integer transformers including the selected M point inverse integer transformer for inverse integer transforming X axis video data in a resizing area, the X axis video data being stored in a Y buffer.

21. A digital broadcast receiver comprising:
   a control unit for generating a channel selection signal using a user selection and generating a resizing control signal for resizing received video data;
   a tuner for selecting a channel of a received digital broadcast signal according to the channel selection signal;
   a demodulator for demodulating the selected digital broadcast signal;
   a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;
   a display unit for displaying the decoded video data; and
   a memory for storing the digital broadcast signal output from the demodulator in a record mode, the memory including buffers for temporarily storing data processed by the decoder,
   wherein the video decoder comprises:
      a header analyzer for analyzing header information from the decoded video stream and for separating and outputting a video data;
      a variable length decoder for resizing the separated video data based on the resizing control signal, and decoding the resized video data into a pixel data with an original pixel data size using a variable length table;
      a dequantizer for dequantizing the decoded video data;
      an Inverse Transform (IT) unit for resizing and converting the dequantized frequency-domain video data into a two dimensional spatial domain video data by the resizing control signal;
      a movement compensator unit for compensating for movement of the pixel data by a predetermined pixel interval based on the resizing control signal;
      an adder for adding outputs of the inverse transform unit and the movement compensator unit; and
      a color converter for converting a video data output from the adder into display data for the display unit, and
   wherein the variable length decoder comprises:
      a resizer for resizing the separated video data based on the resizing control signal;
      a table converter for decoding the received variable length coded video data into video data with the original size; and
      a buffer for storing the video data decoded by the table converter;
      wherein the resizer controls the table converter to decode data in blocks included in a resizing area set by the resizing control signal and controls the buffer to store the video data in the resizing area.

22. A digital broadcast receiver comprising:
   a control unit for generating a channel selection signal using a user selection and generating a resizing control signal for resizing received video data;
   a tuner for selecting a channel of a received digital broadcast signal according to the channel selection signal;
   a demodulator for demodulating the selected digital broadcast signal;
   a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;

a display unit for displaying the decoded video data; and a memory for storing the digital broadcast signal output from the demodulator in a record mode, the memory including buffers for temporarily storing data processed by the decoder, wherein the video decoder comprises:
- a header analyzer for analyzing header information from the decoded video stream and for separating and outputting a video data;
- a variable length decoder for resizing the separated video data based on the resizing control signal, and decoding the resized video data into a pixel data with an original pixel data size using a variable length table;
- a dequantizer for dequantizing the decoded video data;
- an Inverse Transform (IT) unit for resizing and converting the dequantized frequency-domain video data into a two dimensional spatial domain video data by the resizing control signal;
- a movement compensator unit for compensating for movement of the pixel data by a predetermined pixel interval based on the resizing control signal;
- an adder for adding outputs of the inverse transform unit and the movement compensator unit; and a color converter for converting a video data output from the adder into display data for the display unit, and wherein the movement compensator unit comprises:
- a buffer for storing a received movement compensation vector value;
- a previous image memory for storing a previous image in order to compare the movement compensation vector value;
- a next image memory for storing a next image in order to compare the movement compensation vector value;
- a plurality of movement compensators for receiving the movement compensation vector value and outputting of the previous image memory and the next image memory, wherein the movement compensators are operated by a movement compensation selection signal to perform one of a half-pel, quarter-pel, and octa-pel movement compensation; and
- a resizer for selecting one of the movement compensators based on the resizing control signal.

23. A digital broadcast receiver of a portable terminal that includes an RF communication unit for up-converting a transmitted signal to a signal of an RF band and down-converting a received RF signal into a baseband signal and a data processor for demodulating and the decoding the baseband signal, the digital broadcast receiver comprising:

a control unit for generating a channel selection signal by a user selection and generating a resizing control signal for resizing a received video data based on a display size of the portable terminal;

a tuner for selecting a channel of a received digital broadcast signal according to channel selection signal generated by the control unit;

a demodulator for demodulating the selected digital broadcast signal;

a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;

a display unit for displaying the decoded video data; and a memory for storing the digital broadcast signal output from the demodulator in a record mode, wherein the memory includes buffers for temporarily storing data processed by the decoder, wherein the video decoder comprises:
- a header analyzer for analyzing header information from the decoded video stream and separating and outputting video data;
- a variable length decoder for decoding the video data output from the header analyzer into an original pixel data with an original data size by using a variable length table, the variable length decoder including a resizer, a table converter, and a buffer, the resizer controlling the table converter to decode data in blocks included in the resizing area set by the resizing control signal and controlling the buffer to store the video data in the resizing area;
- a dequantizer for dequantizing the decoded video data;
- an Inverse Transform (IT) unit for resizing and converting the dequantized frequency-domain video data into two dimensional spatial domain video data by the resizing control signal;
- a movement compensator unit including movement compensators, one of which is selected by the resizing control signal, the selected movement compensator compensating for movement of a movement compensation data corresponding to one of the inverse-transformed video data and the separated video data; and
- a color converter for converting outputs of the inverse transform unit and the movement compensator unit into display data, and wherein the IT unit is an Inverse Discrete Cosine Transform (IDCT) unit, comprising:
- a Y axis resizer for selecting an N point inverse discrete cosine transformer using a Y axis control signal of the resizing control signal;
- an N number of Y axis inverse discrete cosine transformers including the selected N point inverse discrete cosine transformer for inverse discrete cosine transforming Y axis video data in a resized area;
- an X axis resizer for selecting an M point inverse discrete cosine transformer using an X axis control signal of the resizing control signal; and
- an M number of X axis inverse discrete cosine transformers including the selected M point inverse discrete cosine transformer for inverse discrete cosine transforming X axis video data in a resizing area, the X axis video data being stored in a Y buffer.

24. The digital broadcast receiver as claimed in claim 23, wherein the control unit determines the resizing control value based on a display size of the digital broadcast receiver.

25. The digital broadcast receiver as claimed in claim 23, wherein the control unit determines the resizing control value based on a display size of the digital broadcast receiver and an image scan type analyzed by the header analyzer.

26. The digital broadcast receiver as claimed in claim 23, wherein the control unit determines the resizing control value based on a display size of the digital broadcast receiver, an image scan type and a block scan type analyzed by the header analyzer, a decoding speed selected by a user, and a decoding speed of the digital broadcast receiver.

27. A digital broadcast receiver of a portable terminal that includes an RF communication unit for up-converting a transmitted signal to a signal of an RF band and down-converting a received RF signal into a baseband signal and a data processor for demodulating and the decoding the baseband signal, the digital broadcast receiver comprising:
- a control unit for generating a channel selection signal by a user selection and generating a resizing control signal for resizing a received video data based on a display size of the portable terminal;
- a tuner for selecting a channel of a received digital broadcast signal according to channel selection signal generated by the control unit;
- a demodulator for demodulating the selected digital broadcast signal;
- a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;
- a display unit for displaying the decoded video data; and
- a memory for storing the digital broadcast signal output from the demodulator in a record mode,
- wherein the memory includes buffers for temporarily storing data processed by the decoder,
- wherein the video decoder comprises:
  - a header analyzer for analyzing header information from the decoded video stream and separating and outputting video data;
  - a variable length decoder for decoding the video data output from the header analyzer into an original pixel data with an original data size by using a variable length table, the variable length decoder including a resizer, a table converter, and a buffer, the resizer controlling the table converter to decode data in blocks included in the resizing area set by the resizing control signal and controlling the buffer to store the video data in the resizing area;
  - a dequantizer for dequantizing the decoded video data;
  - an Inverse Transform (IT) unit for resizing and converting the dequantized frequency-domain video data into two dimensional spatial domain video data by the resizing control signal;
  - a movement compensator unit including movement compensators, one of which is selected by the resizing control signal, the selected movement compensator compensating for movement of a movement compensation data corresponding to one of the inverse-transformed video data and the separated video data; and
  - a color converter for converting outputs of the inverse transform unit and the movement compensator unit into display data, and
- wherein the IT unit is an Inverse Integer Transform (IIT) unit comprising:
  - a Y axis resizer for selecting an N point inverse integer transformer using a Y axis control signal of the resizing control signal;
  - an N number of Y axis inverse integer transformers including the selected N point inverse integer transformer for inverse integer transforming Y axis video data in a resized area;
  - an X axis resizer for selecting an M point inverse integer transformer using an X axis control signal of the resizing control signal; and
  - an M number of X axis inverse integer transformers including the selected M point inverse integer transformer for inverse integer transforming X axis video data in a resizing area, the X axis video data being stored in a Y buffer.

28. A digital broadcast receiver of a portable terminal that includes an RF communication unit for up-converting a transmitted signal to a signal of an RF band and down-converting a received RF signal into a baseband signal and a data processor for demodulating and the decoding the baseband signal, the digital broadcast receiver comprising:
- a control unit for generating a channel selection signal by a user selection and generating a resizing control signal for resizing a received video data based on a display size of the portable terminal;
- a tuner for selecting a channel of a received digital broadcast signal according to channel selection signal generated by the control unit;
- a demodulator for demodulating the selected digital broadcast signal;
- a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;
- a display unit for displaying the decoded video data; and
- a memory for storing the digital broadcast signal output from the demodulator in a record mode,
- wherein the memory includes buffers for temporarily storing data processed by the decoder,
- wherein the video decoder comprises:
  - a header analyzer for analyzing header information from the decoded video stream and separating and outputting video data;
  - a variable length decoder for decoding the video data output from the header analyzer into an original pixel data with an original data size by using a variable length table, the variable length decoder including a resizer, a table converter, and a buffer, the resizer controlling the table converter to decode data in blocks included in the resizing area set by the resizing control signal and controlling the buffer to store the video data in the resizing area;
  - a dequantizer for dequantizing the decoded video data;
  - an Inverse Transform (IT) unit for resizing and converting the dequantized frequency-domain video data into two dimensional spatial domain video data by the resizing control signal;
  - a movement compensator unit including movement compensators, one of which is selected by the resizing control signal, the selected movement compensator compensating for movement of a movement compensation data corresponding to one of the inverse-transformed video data and the separated video data; and
  - a color converter for converting outputs of the inverse transform unit and the movement compensator unit into display data, and
- wherein the variable length decoder comprises:
  - a resizer for resizing the separated video data based on the resizing control signal;

a table converter for decoding the received variable length coded video data into video data with the original size; and a buffer for storing the video data decoded by the table converter;

wherein the resizer controls the table converter to decode data in blocks included in a resizing area set by the resizing control signal and controls the buffer to store the video data in the resizing area.

29. A digital broadcast receiver of a portable terminal that includes an RF communication unit for up-converting a transmitted signal to a signal of an RF band and down-converting a received RF signal into a baseband signal and a data processor for demodulating and the decoding the baseband signal, the digital broadcast receiver comprising:

a control unit for generating a channel selection signal by a user selection and generating a resizing control signal for resizing a received video data based on a display size of the portable terminal;

a tuner for selecting a channel of a received digital broadcast signal according to channel selection signal generated by the control unit;

a demodulator for demodulating the selected digital broadcast signal;

a decoder including a demultiplexer for separating an audio stream and a video stream from the demodulated digital broadcast signal, a video decoder for decoding data of the separated video stream, and an audio decoder for decoding data of the separated audio stream, the video decoder resizing a decoding area of the received video data based on the resizing control signal output from the control unit and decoding the video data in the resizing area;

a display unit for displaying the decoded video data; and a memory for storing the digital broadcast signal output from the demodulator in a record mode, wherein the memory includes buffers for temporarily storing data processed by the decoder, wherein the video decoder comprises:

a header analyzer for analyzing header information from the decoded video stream and separating and outputting video data;

a variable length decoder for decoding the video data output from the header analyzer into an original pixel data with an original data size by using a variable length table, the variable length decoder including a resizer, a table converter, and a buffer, the resizer controlling the table converter to decode data in blocks included in the resizing area set by the resizing control signal and controlling the buffer to store the video data in the resizing area;

a dequantizer for dequantizing the decoded video data;

an Inverse Transform (IT) unit for resizing and converting the dequantized frequency-domain video data into two dimensional spatial domain video data by the resizing control signal;

a movement compensator unit including movement compensators, one of which is selected by the resizing control signal, the selected movement compensator compensating for movement of a movement compensation data corresponding to one of the inverse-transformed video data and the separated video data; and a color converter for converting outputs of the inverse transform unit and the movement compensator unit into display data, and wherein the movement compensator unit comprises:

a buffer for storing a received movement compensation vector value;

a previous image memory for storing a previous image in order to compare the movement compensation vector value;

a next image memory for storing a next image in order to compare the movement compensation vector value;

a plurality of movement compensators for receiving the movement compensation vector value and outputting of the previous image memory and the next image memory, wherein the movement compensators are operated by a movement compensation selection signal to perform one of a half-pel, quarter-pel, and octa-pel movement compensation; and a resizer for selecting one of the movement compensators based on the resizing control signal.

30. A method for decoding a coded video data in a digital broadcast receiver, the method comprising the steps of:

determining a resizing control signal for resizing a received video data;

analyzing header information from a decoded video stream;

separating and outputting a video data;

resizing the separated video data using the resizing control signal;

decoding the resized video data into an original pixel data with an original data size using a variable length table;

dequantizing the decoded video data;

resizing and converting the dequantized frequency-domain video data into two dimensional spatial domain video data by the resizing control signal;

movement compensating for movement of a movement compensation data corresponding to one of the inverse-transformed video data and the separated video data; and converting the two dimensional spatial domain video data and the movement compensated data into display data for a display unit, wherein the steps of resizing and decoding the resized video data comprise the steps of:

decoding the received variable length coded video data into a video data with the original size;

storing the decoded data;

interrupting decoding of other data until all pixel data included in a predetermined resizing area set by the resizing control signal is decoded; and outputting the decoded video data in the resizing area from among the stored decoded data.

31. The method as claimed in claim 30, wherein a scan area is setup for a Y matrix by the resizing control signal, and data of the setup scan area is inverse discrete cosine transformed.

32. The method as claimed in claim 30, wherein a scan area is setup for a Y matrix by the resizing control signal, and data of the setup scan area is inverse integer transformed.

33. The method as claimed in claim 30, wherein the resizing control signal indicates an area including pixel data with a size corresponding to the display size of the display unit.

34. The method as claimed in claim 30, wherein the resizing control signal is determined based on a display size of the digital broadcast receiver, an image scan type and a block scan type included in header information, a decoding speed selected by a user, and a decoding speed of the digital broadcast receiver.

35. A method for decoding a coded video data in a digital broadcast receiver, the method comprising the steps of:
- determining a resizing control signal for resizing a received video data;
- analyzing header information from a decoded video stream;
- separating and outputting a video data;
- resizing the separated video data using the resizing control signal;
- decoding the resized video data into an original pixel data with an original data size using a variable length table;
- dequantizing the decoded video data;
- resizing and converting the dequantized frequency-domain video data into two dimensional spatial domain video data by the resizing control signal;
- movement compensating for movement of a movement compensation data corresponding to one of the inverse-transformed video data and the separated video data; and
- converting the two dimensional spatial domain video data and the movement compensated data into display data for a display unit, wherein the step movement compensating comprises the steps of:
- storing a received movement compensation vector value, a previous image, and a next image, in order to compare the movement compensation vector value; and
- performing movement compensation for the movement compensation vector value, the previous image, and the next image by a movement compensator selected based on the resizing control signal.

36. A method for processing an image in a digital broadcast receiver, the method comprising the steps of:
- generating a channel selection signal according to a user selection;
- generating a resizing control signal for resizing a received video data;
- selecting a channel of a received digital broadcast signal by channel selection of a control unit;
- demodulating the selected digital broadcast signal;
- separating an audio stream and a video stream from the decoded digital broadcast signal;
- decoding data of the separated audio stream and video stream; and
- reproducing and displaying the decoded video and audio data, wherein a decoding area for the video data is resized based on the resizing control signal and the video data in the resized area is then decoded, wherein decoding the data of the separated video stream comprises:
- analyzing header information from a decoded video stream;
- separating and outputting a video data;
- resizing the separated video data based on the resizing control signal;
- decoding the resized video data into a pixel data with an original pixel data size using a variable length table;
- dequantizing the decoded video data;
- resizing and converting the dequantized frequency-domain video data into a two dimensional spatial domain video data by the resizing control signal;
- compensating for movement of the pixel data by a predetermined pixel interval based on the resizing control signal;
- adding outputs of the inverse transform unit and the movement compensator unit; and
- converting a video data output from the adder into display data, wherein resizing and converting the dequantized frequency-domain video data into the two dimensional spatial domain video data by the resizing control signal comprises:
- selecting an N point inverse discrete cosine transformer using a Y axis control signal of the resizing control signal;
- inverse discrete cosine transforming Y axis video data in a resized area;
- selecting an M point inverse discrete cosine transformer using an X axis control signal of the resizing control signal; and
- inverse discrete cosine transforming X axis video data in a resizing area, the X axis video data being stored in a Y buffer.

37. A method for processing a broadcast signal of a portable terminal having a wireless communication unit for wireless communication, the method comprising the steps of:
- generating a channel selection signal according to a user selection;
- generating a resizing control signal for resizing a received digital broadcast signal based on a display size of the portable terminal;
- selecting a channel of a received digital broadcast signal by channel selection of the control unit;
- demodulating the selected digital broadcast signal;
- separating an audio stream and a video stream from the decoded digital broadcast signal;
- decoding data of the separated audio stream and video stream; and
- reproducing and displaying the decoded video and audio data, wherein a decoding area for the video data is resized based on the resizing control signal and the video data in the resized area is then decoded, wherein decoding the data of the separated video stream comprises:
- analyzing header information from the decoded video stream;
- separating and outputting video data;
- decoding the output video data into an original pixel data with an original data size by using a variable length table, the variable length decoder including a resizer, a table converter, and a buffer, the resizer controlling the table converter to decode data in blocks included in the resizing area set by the resizing control signal and controlling the buffer to store the video data in the resizing area;
- dequantizing the decoded video data;
- resizing and converting the dequantized frequency-domain video data into two dimensional spatial domain video data by the resizing control signal;
- compensating for movement of a movement compensation data corresponding to one of the inverse-transformed video data and the separated video data; and converting outputs of the inverse transform unit and the movement compensator unit into display data, and wherein resizing and converting the dequantized frequency-domain video data into the two dimensional spatial domain video data by the resizing control signal comprises:

selecting an N point inverse discrete cosine transformer using a Y axis control signal of the resizing control signal;

inverse discrete cosine transforming Y axis video data in a resized area;

selecting an M point inverse discrete cosine transformer using an X axis control signal of the resizing control signal; and inverse discrete cosine transforming X axis video data in a resizing area, the X axis video data being stored in a Y buffer.

* * * * *